US012604240B2

(12) United States Patent
Khalid et al.

(10) Patent No.: US 12,604,240 B2
(45) Date of Patent: Apr. 14, 2026

(54) NEIGHBOR RELATIONS FOR DISPROPORTIONAL/DISSIMILAR BANDWIDTH/CARRIER ALLOCATION

(71) Applicant: Charter Communications Operating, LLC, St. Louis, MO (US)

(72) Inventors: Saran Khalid, Denver, CO (US); Mohammedyusuf Shaikh, Aurora, CO (US); Perwaiz Akhtar, Aurora, CO (US); Syed M. Abid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 293 days.

(21) Appl. No.: 18/195,682

(22) Filed: May 10, 2023

(65) Prior Publication Data

US 2024/0381191 A1 Nov. 14, 2024

(51) Int. Cl.
*H04W 36/00* (2009.01)
*H04W 72/0453* (2023.01)

(52) U.S. Cl.
CPC ... *H04W 36/0061* (2013.01); *H04W 72/0453* (2013.01)

(58) Field of Classification Search
CPC ..................... H04W 36/0061; H04W 72/0453
See application file for complete search history.

(56) References Cited

U.S. PATENT DOCUMENTS

| | | | |
|---|---|---|---|
| 2018/0063844 A1* | 3/2018 | Khoshnevisan | ...... H04W 72/56 |
| 2020/0112950 A1* | 4/2020 | Chen | ................. H04W 36/0061 |
| 2021/0014870 A1* | 1/2021 | Kim | ........................ H04W 24/08 |
| 2021/0185541 A1* | 6/2021 | Potharaju | .............. H04W 24/02 |
| 2021/0306911 A1* | 9/2021 | Nekoui | ................. H04W 28/20 |
| 2024/0114352 A1* | 4/2024 | Bandyopadhyay | ... H04W 16/14 |
| 2024/0147320 A1* | 5/2024 | Lang | ................. H04W 36/0072 |

* cited by examiner

*Primary Examiner* — Yu-Wen Chang
(74) *Attorney, Agent, or Firm* — Straub & Straub; Michael P. Straub; Stephen T. Straub

(57) ABSTRACT

Methods and apparatus for supporting handover via efficiently updating neighbor tables in response to a detected dissimilar channel assignment, e.g., a temporary PAL channel assignment to one or more cells in a network, are described. In various cases the newly assigned temporary PAL channel has a different bandwidth and/or a different carrier frequency than the original PAL channel. The content of neighbor tables is supplemented to reflect the temporary dissimilar assignment. After the temporary assignment ends the original neighbor tables are restored.

20 Claims, 32 Drawing Sheets

| FIGURE 5A |
| FIGURE 5B |
| FIGURE 5C |
| FIGURE 5D |
| FIGURE 5E |
| FIGURE 5F |
| FIGURE 5G |
| FIGURE 5H |
| FIGURE 5I |
| FIGURE 5J |

FIGURE 5

EXAMPLE : CBRS CELL: NYC_1_1 TEMPORARILY REASSIGNED FROM CH2 TO CH4

1000 / 1002

ORIGINAL NEIGHBOR TABLE FOR CBRS CELL: NYC_1_1 ON CHANNEL 2 (E.G., PAL CH 2) AND FREQUENCY 2 (GAA)

1004 / 1006 / 1008

| CELL | NEIGHBORS ON CHANNEL 2 (E.G., PAL CH 2 WITH CARRIER FREQ $_{PAL-CH2}$ AND BANDWIDTH $_{PAL-CH2}$) | NEIGHBORS ON FREQUENCY 2 (E.G. A GAA FREQUENCY WITH A CORRESPONDING BANDWIDTH) |
|---|---|---|
| NYC_1_1 | NYC_2_1 | NYC_2_1 |
| NYC_1_1 | NYC_1_2 | NYC_1_2 |
| NYC_1_1 | NYC_3_1 | NYC_3_1 |
| NYC_1_1 | NYC_4_2 | NYC_4_2 |
| NYC_1_1 | NYC_4_1 | NYC_4_1 |
| NYC_1_1 | NYC_5_1 | NYC_5_1 |
| NYC_1_1 | NYC_5_2 | NYC_5_1 |
| NYC_1_1 | NYC_6_2 | NYC_6_2 |

NEW NEIGHBOR TABLE FOR CBRS CELL: NYC_1_1 ON TEMPORARILY ASSIGNED CHANNEL 4 (E.G., PAL CH 4 WITH CARRIER FREQ $_{PAL-CH4}$ AND BANDWIDTH $_{PAL-CH4}$)) AND FREQUENCY 2 (GAA) (E.G., WHERE AT LEAST ONE OF THE CARRIER FREQUENCY OR THE BW ARE DIFFERENT BETWEEN CH 2 AND CH 4)

1052

1054 / 1056 / 1058 / 1060

| CELL | NEIGHBORS ON CHANNEL 2 (E.G., PAL CH 2 WITH CARRIER FREQ $_{PAL-CH2}$ AND BANDWIDTH $_{PAL-CH2}$) | NEIGHBORS ON FREQUENCY 2 (E.G. A GAA FREQUENCY WITH A CORRESPONDING BANDWIDTH) | NEIGHBORS ON CHANNEL 4 (IF ANY) (E.G., PAL CH 4 WITH CARRIER FREQ $_{PAL-CH4}$ AND BANDWIDTH $_{PAL-CH4}$) |
|---|---|---|---|
| NYC_1_1 | NYC_2_1 | NYC_2_1 | |
| NYC_1_1 | NYC_1_2 | NYC_1_2 | |
| NYC_1_1 | NYC_3_1 | NYC_3_1 | |
| NYC_1_1 | NYC_4_2 | NYC_4_2 | |
| NYC_1_1 | NYC_4_1 | NYC_4_1 | |
| NYC_1_1 | NYC_5_1 | NYC_5_1 | |
| NYC_1_1 | NYC_5_2 | NYC_5_1 | |
| NYC_1_1 | NYC_6_2 | NYC_6_2 | |

FIGURE 6

EXAMPLE : CBRS CELL: NYC_1_1 TEMPORARILY REASSIGNED FROM CH2 TO CH4

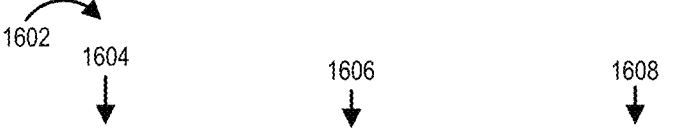

1602    1604        1606        1608

| CELL | NEIGHBORS ON CHANNEL 2 (E.G., PAL CH 2 WITH CARRIER FREQ $_{PAL-CH2}$ AND BANDWIDTH$_{PAL-CH2}$ ) | NEIGHBORS ON FREQUENCY 2 (E.G. A GAA FREQUENCY WITH A CORRESPONDING BANDWIDTH) |
|---|---|---|
| NYC_1_1 | NYC_2_1 | NYC_2_1 |
| NYC_1_1 | NYC_1_2 | NYC_1_2 |
| NYC_1_1 | NYC_3_1 | NYC_3_1 |
| NYC_1_1 | NYC_4_2 | NYC_4_2 |
| NYC_1_1 | NYC_4_1 | NYC_4_1 |
| NYC_1_1 | NYC_5_1 | NYC_5_1 |
| NYC_1_1 | NYC_5_2 | NYC_5_2 |
| NYC_1_1 | NYC_6_2 | NYC_6_2 |

ORIGINAL NEIGHBOR TABLE FOR CBRS CELL: NYC_1_1 ON CHANNEL 2 (E.G., PAL CH 2) AND FREQUENCY 2 (GAA)

FIGURE 12

EXAMPLE (CONTINUED) : CBRS CELL: NYC_1_1 TEMPORARILY REASSIGNED FROM CH2 TO CH4

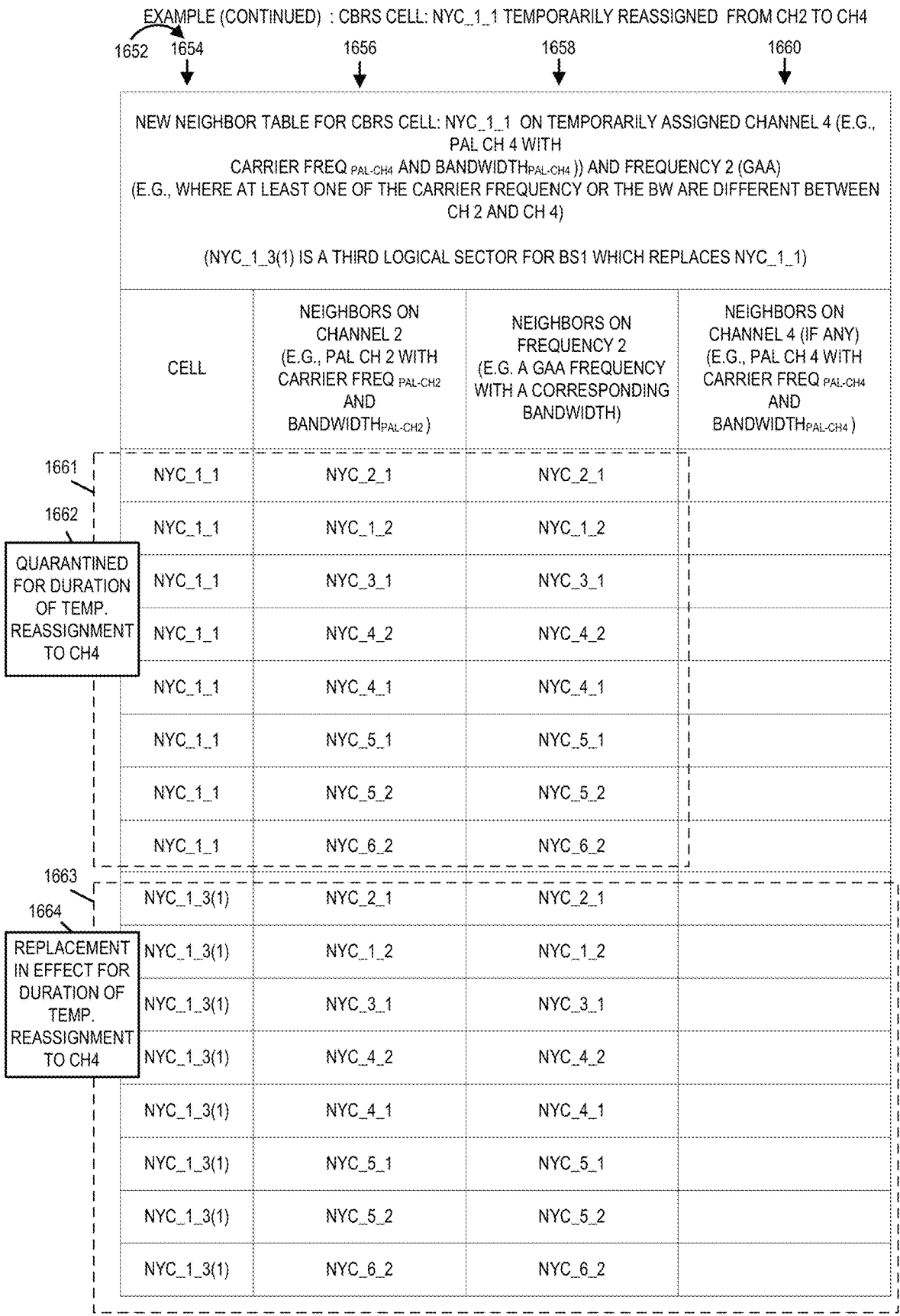

NEW NEIGHBOR TABLE FOR CBRS CELL: NYC_1_1 ON TEMPORARILY ASSIGNED CHANNEL 4 (E.G., PAL CH 4 WITH
CARRIER FREQ $_{PAL-CH4}$ AND BANDWIDTH$_{PAL-CH4}$ )) AND FREQUENCY 2 (GAA)
(E.G., WHERE AT LEAST ONE OF THE CARRIER FREQUENCY OR THE BW ARE DIFFERENT BETWEEN
CH 2 AND CH 4)

(NYC_1_3(1) IS A THIRD LOGICAL SECTOR FOR BS1 WHICH REPLACES NYC_1_1)

| CELL | NEIGHBORS ON CHANNEL 2 (E.G., PAL CH 2 WITH CARRIER FREQ $_{PAL-CH2}$ AND BANDWIDTH$_{PAL-CH2}$ ) | NEIGHBORS ON FREQUENCY 2 (E.G. A GAA FREQUENCY WITH A CORRESPONDING BANDWIDTH) | NEIGHBORS ON CHANNEL 4 (IF ANY) (E.G. PAL CH 4 WITH CARRIER FREQ $_{PAL-CH4}$ AND BANDWIDTH$_{PAL-CH4}$ ) |
|---|---|---|---|
| NYC_1_1 | NYC_2_1 | NYC_2_1 | |
| NYC_1_1 | NYC_1_2 | NYC_1_2 | |
| NYC_1_1 | NYC_3_1 | NYC_3_1 | |
| NYC_1_1 | NYC_4_2 | NYC_4_2 | |
| NYC_1_1 | NYC_4_1 | NYC_4_1 | |
| NYC_1_1 | NYC_5_1 | NYC_5_1 | |
| NYC_1_1 | NYC_5_2 | NYC_5_2 | |
| NYC_1_1 | NYC_6_2 | NYC_6_2 | |
| NYC_1_3(1) | NYC_2_1 | NYC_2_1 | |
| NYC_1_3(1) | NYC_1_2 | NYC_1_2 | |
| NYC_1_3(1) | NYC_3_1 | NYC_3_1 | |
| NYC_1_3(1) | NYC_4_2 | NYC_4_2 | |
| NYC_1_3(1) | NYC_4_1 | NYC_4_1 | |
| NYC_1_3(1) | NYC_5_1 | NYC_5_1 | |
| NYC_1_3(1) | NYC_5_2 | NYC_5_2 | |
| NYC_1_3(1) | NYC_6_2 | NYC_6_2 | |

1652   1654   1656   1658   1660

1661

1662
QUARANTINED FOR DURATION OF TEMP. REASSIGNMENT TO CH4

1663

1664
REPLACEMENT IN EFFECT FOR DURATION OF TEMP. REASSIGNMENT TO CH4

FIGURE 13

EXAMPLE (CONTINUED) : CBRS CELL: NYC_1_1 TEMPORARILY REASSIGNED  FROM CH2 TO CH4

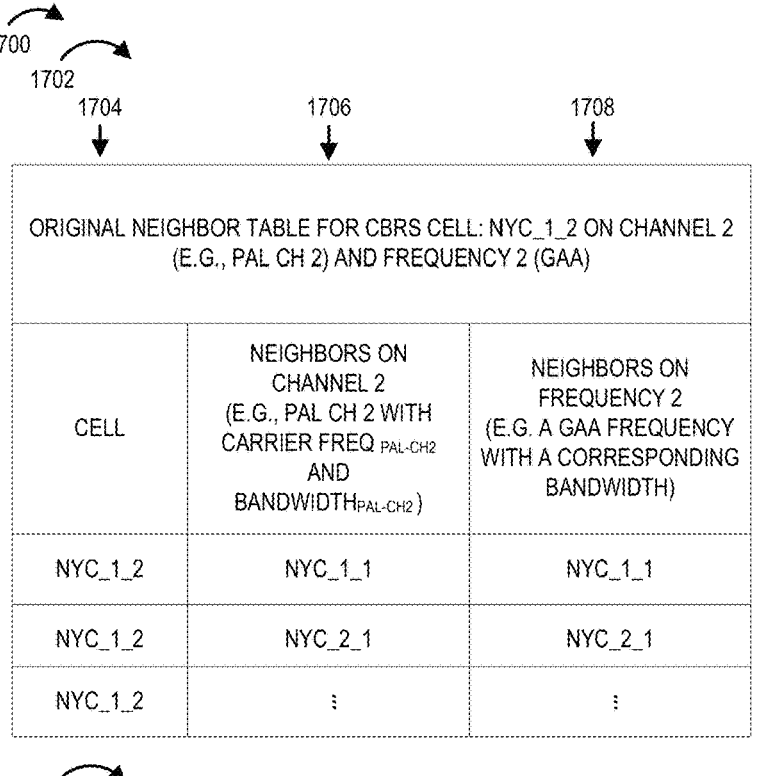

| CELL | NEIGHBORS ON CHANNEL 2 (E.G., PAL CH 2 WITH CARRIER FREQ $_{PAL-CH2}$ AND BANDWIDTH$_{PAL-CH2}$) | NEIGHBORS ON FREQUENCY 2 (E.G. A GAA FREQUENCY WITH A CORRESPONDING BANDWIDTH) |
|------|------|------|
| NYC_1_2 | NYC_1_1 | NYC_1_1 |
| NYC_1_2 | NYC_2_1 | NYC_2_1 |
| NYC_1_2 | ⋮ | ⋮ |

NEW NEIGHBOR TABLE FOR CBRS CELL:  NYC_1_2 ON CHANNEL 2 (E.G., PAL CH 2 WITH CARRIER FREQ $_{PAL-CH2}$ AND BANDWIDTH$_{PAL-CH2}$)) AND FREQUENCY 2 (GAA) (IN RESPONSE TO NYC_1_1 TEMPORARY REASSIGNMENT TO CHANNEL 4)

| CELL | NEIGHBORS ON CHANNEL 2 (E.G., PAL CH 2 WITH CARRIER FREQ $_{PAL-CH2}$ AND BANDWIDTH$_{PAL-CH2}$) | NEIGHBORS ON FREQUENCY 2 (E.G. A GAA FREQUENCY WITH A CORRESPONDING BANDWIDTH) | NEIGHBORS ON CHANNEL 4 (E.G., PAL CH 4 WITH CARRIER FREQ $_{PAL-CH4}$ AND BANDWIDTH$_{PAL-CH4}$) |
|------|------|------|------|
| NYC_1_2 | NYC_1_1 | NYC_1_1 | NYC_1_3(1) |
| NYC_1_2 | NYC_2_1 | NYC_2_1 | |
| NYC_1_2 | ⋮ | ⋮ | |

ENTRY QUARANTINED FOR DURATION OF TEMP. REASSIGNMENT TO CH4

1762

REPLACEMENT ENTRY IN EFFECT FOR DURATION OF TEMP. REASSIGNMENT TO CH4

EXAMPLE (CONTINUED) : CBRS CELL: NYC_1_1 TEMPORARILY REASSIGNED FROM CH2 TO CH4

EXAMPLE : CBRS CELLS: NYC_1_1 AND NYC_2_1 BOTH TEMPORARILY REASSIGNED  FROM CH2 TO CH4

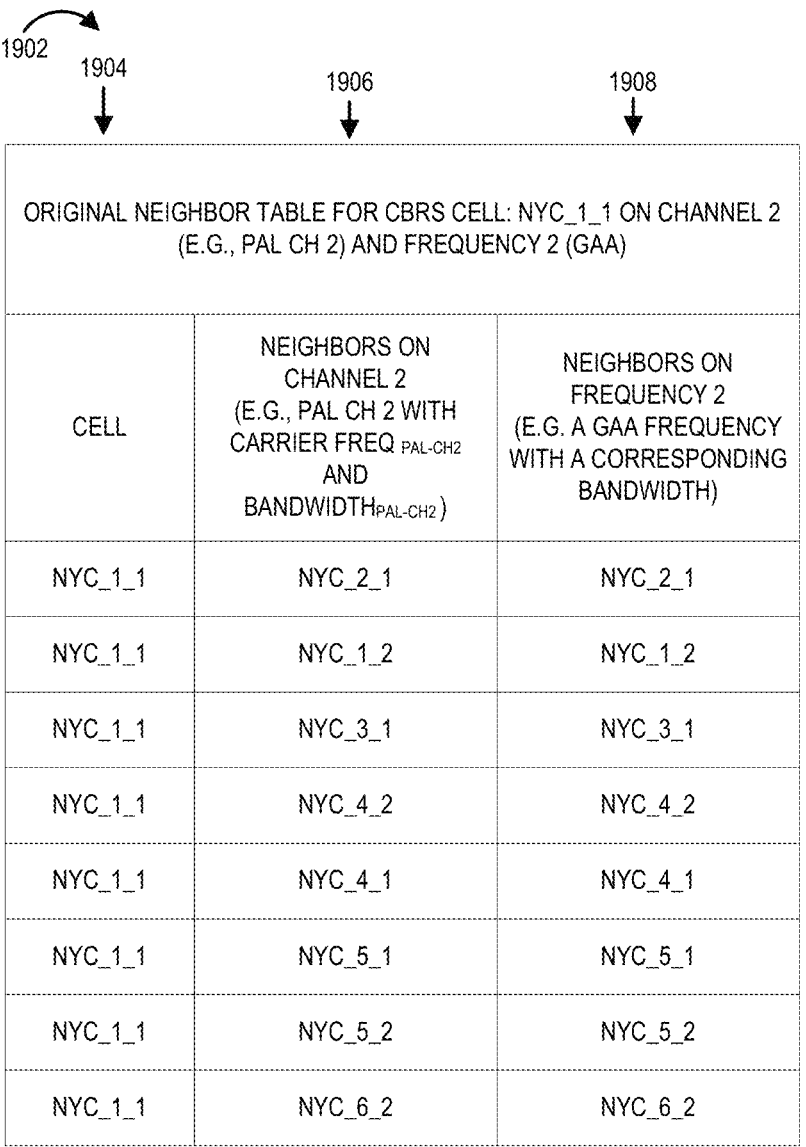

| CELL | NEIGHBORS ON CHANNEL 2 (E.G., PAL CH 2 WITH CARRIER FREQ $_{PAL-CH2}$ AND BANDWIDTH$_{PAL-CH2}$ ) | NEIGHBORS ON FREQUENCY 2 (E.G. A GAA FREQUENCY WITH A CORRESPONDING BANDWIDTH) |
|---|---|---|
| NYC_1_1 | NYC_2_1 | NYC_2_1 |
| NYC_1_1 | NYC_1_2 | NYC_1_2 |
| NYC_1_1 | NYC_3_1 | NYC_3_1 |
| NYC_1_1 | NYC_4_2 | NYC_4_2 |
| NYC_1_1 | NYC_4_1 | NYC_4_1 |
| NYC_1_1 | NYC_5_1 | NYC_5_1 |
| NYC_1_1 | NYC_5_2 | NYC_5_2 |
| NYC_1_1 | NYC_6_2 | NYC_6_2 |

ORIGINAL NEIGHBOR TABLE FOR CBRS CELL: NYC_1_1 ON CHANNEL 2 (E.G., PAL CH 2) AND FREQUENCY 2 (GAA)

FIGURE 16

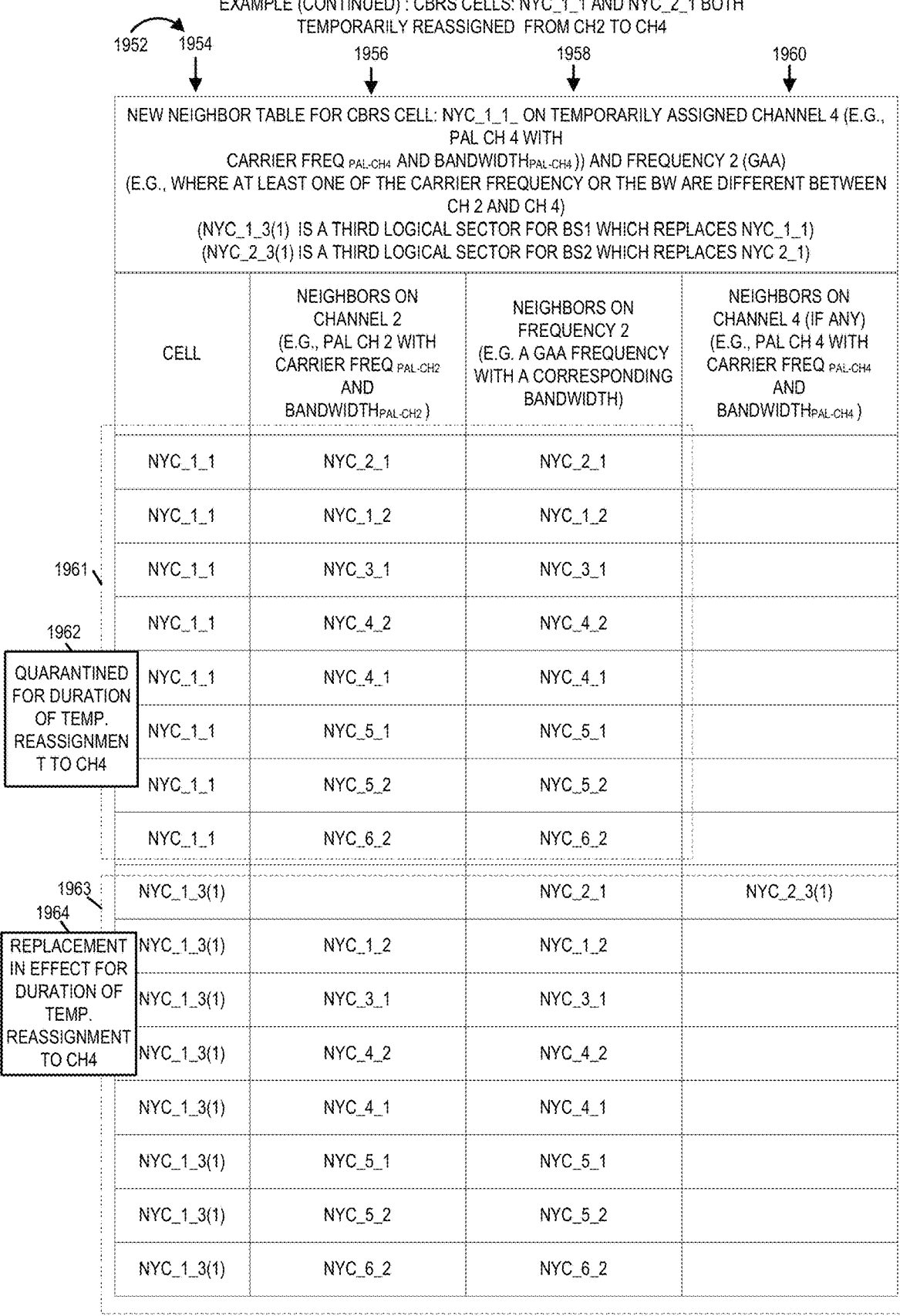

EXAMPLE (CONTINUED) : CBRS CELLS: NYC_1_1 AND NYC_2_1 BOTH
TEMPORARILY REASSIGNED FROM CH2 TO CH4

1952  1954     1956          1958          1960

NEW NEIGHBOR TABLE FOR CBRS CELL: NYC_1_1_ ON TEMPORARILY ASSIGNED CHANNEL 4 (E.G.,
PAL CH 4 WITH
CARRIER FREQ $_{PAL-CH4}$ AND BANDWIDTH$_{PAL-CH4}$)) AND FREQUENCY 2 (GAA)
(E.G., WHERE AT LEAST ONE OF THE CARRIER FREQUENCY OR THE BW ARE DIFFERENT BETWEEN
CH 2 AND CH 4)
(NYC_1_3(1) IS A THIRD LOGICAL SECTOR FOR BS1 WHICH REPLACES NYC_1_1)
(NYC_2_3(1) IS A THIRD LOGICAL SECTOR FOR BS2 WHICH REPLACES NYC 2_1)

| CELL | NEIGHBORS ON CHANNEL 2 (E.G., PAL CH 2 WITH CARRIER FREQ $_{PAL-CH2}$ AND BANDWIDTH$_{PAL-CH2}$) | NEIGHBORS ON FREQUENCY 2 (E.G. A GAA FREQUENCY WITH A CORRESPONDING BANDWIDTH) | NEIGHBORS ON CHANNEL 4 (IF ANY) (E.G., PAL CH 4 WITH CARRIER FREQ $_{PAL-CH4}$ AND BANDWIDTH$_{PAL-CH4}$) |
|---|---|---|---|
| NYC_1_1 | NYC_2_1 | NYC_2_1 | |
| NYC_1_1 | NYC_1_2 | NYC_1_2 | |
| NYC_1_1 | NYC_3_1 | NYC_3_1 | |
| NYC_1_1 | NYC_4_2 | NYC_4_2 | |
| NYC_1_1 | NYC_4_1 | NYC_4_1 | |
| NYC_1_1 | NYC_5_1 | NYC_5_1 | |
| NYC_1_1 | NYC_5_2 | NYC_5_2 | |
| NYC_1_1 | NYC_6_2 | NYC_6_2 | |
| NYC_1_3(1) | | NYC_2_1 | NYC_2_3(1) |
| NYC_1_3(1) | NYC_1_2 | NYC_1_2 | |
| NYC_1_3(1) | NYC_3_1 | NYC_3_1 | |
| NYC_1_3(1) | NYC_4_2 | NYC_4_2 | |
| NYC_1_3(1) | NYC_4_1 | NYC_4_1 | |
| NYC_1_3(1) | NYC_5_1 | NYC_5_1 | |
| NYC_1_3(1) | NYC_5_2 | NYC_5_2 | |
| NYC_1_3(1) | NYC_6_2 | NYC_6_2 | |

1961

1962

QUARANTINED
FOR DURATION
OF TEMP.
REASSIGNMENT
TO CH4

1963
1964

REPLACEMENT
IN EFFECT FOR
DURATION OF
TEMP.
REASSIGNMENT
TO CH4

FIGURE 17

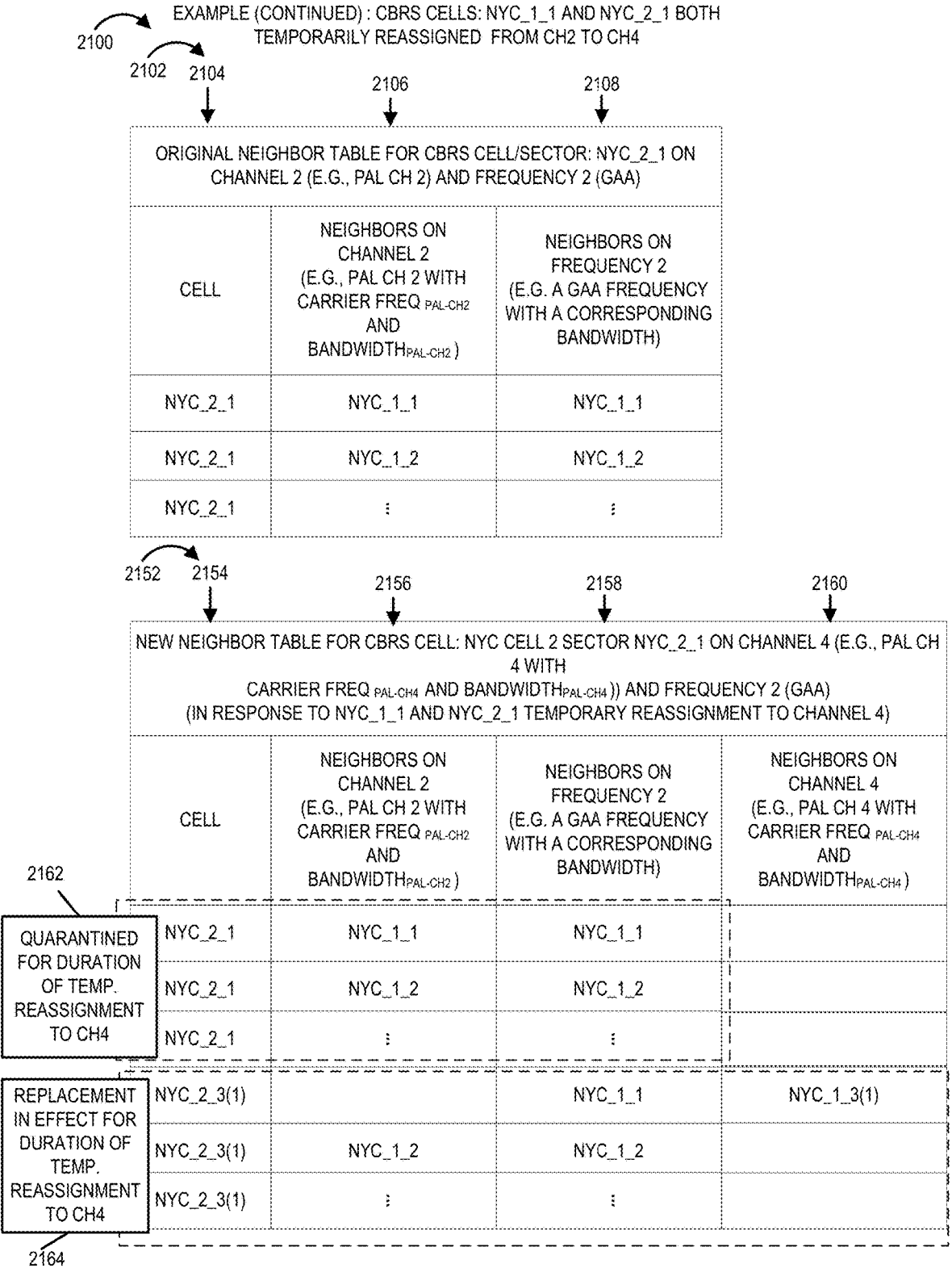

EXAMPLE (CONTINUED) : CBRS CELLS: NYC_1_1 AND NYC_2_1 BOTH TEMPORARILY REASSIGNED FROM CH2 TO CH4

2100  2102  2104  2106  2108

| ORIGINAL NEIGHBOR TABLE FOR CBRS CELL/SECTOR: NYC_2_1 ON CHANNEL 2 (E.G., PAL CH 2) AND FREQUENCY 2 (GAA) | | |
|---|---|---|
| CELL | NEIGHBORS ON CHANNEL 2 (E.G., PAL CH 2 WITH CARRIER FREQ $_{PAL-CH2}$ AND BANDWIDTH$_{PAL-CH2}$ ) | NEIGHBORS ON FREQUENCY 2 (E.G. A GAA FREQUENCY WITH A CORRESPONDING BANDWIDTH) |
| NYC_2_1 | NYC_1_1 | NYC_1_1 |
| NYC_2_1 | NYC_1_2 | NYC_1_2 |
| NYC_2_1 | ⋮ | ⋮ |

2152  2154  2156  2158  2160

| NEW NEIGHBOR TABLE FOR CBRS CELL: NYC CELL 2 SECTOR NYC_2_1 ON CHANNEL 4 (E.G., PAL CH 4 WITH CARRIER FREQ $_{PAL-CH4}$ AND BANDWIDTH$_{PAL-CH4}$ )) AND FREQUENCY 2 (GAA) (IN RESPONSE TO NYC_1_1 AND NYC_2_1 TEMPORARY REASSIGNMENT TO CHANNEL 4) | | | |
|---|---|---|---|
| CELL | NEIGHBORS ON CHANNEL 2 (E.G., PAL CH 2 WITH CARRIER FREQ $_{PAL-CH2}$ AND BANDWIDTH$_{PAL-CH2}$ ) | NEIGHBORS ON FREQUENCY 2 (E.G. A GAA FREQUENCY WITH A CORRESPONDING BANDWIDTH) | NEIGHBORS ON CHANNEL 4 (E.G., PAL CH 4 WITH CARRIER FREQ $_{PAL-CH4}$ AND BANDWIDTH$_{PAL-CH4}$ ) |
| NYC_2_1 | NYC_1_1 | NYC_1_1 | |
| NYC_2_1 | NYC_1_2 | NYC_1_2 | |
| NYC_2_1 | ⋮ | ⋮ | |
| NYC_2_3(1) | | NYC_1_1 | NYC_1_3(1) |
| NYC_2_3(1) | NYC_1_2 | NYC_1_2 | |
| NYC_2_3(1) | ⋮ | ⋮ | |

2162 QUARANTINED FOR DURATION OF TEMP. REASSIGNMENT TO CH4

REPLACEMENT IN EFFECT FOR DURATION OF TEMP. REASSIGNMENT TO CH4
2164

FIGURE 19

NEIGHBOR RELATIONS FOR DISPROPORTIONAL/DISSIMILAR BANDWIDTH/CARRIER ALLOCATION

FIELD

The present invention relates to communications systems and, more particularly, to methods and apparatus for supporting handover via efficiently updating neighbor tables in response to a detected dissimilar channel assignment, e.g., a temporary PAL channel assignment to one or more cells in a network in which the newly assigned temporary PAL channel has a different bandwidth and/or a different carrier frequency than the original PAL channel.

BACKGROUND

In a mobile/cellular network, several small cells and/or several large cells are typically placed in a bee-hive like pattern to provide coverage in an area. FIG. 1 is a drawing 100 illustrating an example of a plurality of base stations (102, 104, 106, 108, 110, 112, 114, 116, 118, 120, 122, 124) and corresponding cells (103, 105, 107, 109, 111, 113, 116, 117, 119, 121, 123, 125), respectively, which provide wireless coverage in an area. Drawing 100 of FIG. 1 also illustrates an exemplary user equipment (UE) 126, e.g., a wireless cell phone, which may move throughout the network. UE 126 is located within cell 105 and near the boundaries with cell 103 and cell 109. The distance between UE 126 and base station 102 is d0 128. The distance between UE 126 and base station 108 is distance dm 130. The UE 126 may be connected to BS 104 and desire to handoff to one of base station 102 and base station 108.

In order to cater to high demand in a given area cells are usually split into multiple sectors. This is shown in drawing 200 of FIG. 2, i.e., a cell's coverage is split by a two-sector cell design. This approach of two-sector small cells allows for more capacity, in some embodiments, as each individual sector of a small cell, in some embodiments, is capable of hosting the same number of UEs as a 1 sector small cell. Similarly, at a given site multiple sectors can be defined by splitting the cell to accommodate for higher demand as shown in FIG. 1, which illustrates exemplary 3 sector cell 117 corresponding to base station 116, which includes sector 1 126, sector 2 128 and sector 3 130.

For a spectrum access system (SAS), individual sectors are considered as individual cells and must be registered separately and also get allocation of channels from SAS separately, i.e., two sectors may get different channels and channels of different bandwidth.

This creates a problem for the operator/vendor as a UE would not handover from one small cell to another small cell unless the neighbors are defined for each sector and carrier. Currently, this cannot be done for SAS assignment of different channels dynamically or different bandwidth changes due to various limitations that exist for different radio providers.

FIG. 3 is a drawing 300 which illustrates a plurality of base stations (302, 304, 306, 308), each with a corresponding cellular coverage area (303, 305, 307, 309), respectively, and an exemplary UE 310. The cells may be split into sectors. It is possible that UE 310 is transferring from one cell/sector, e.g., cell A, of a first site to another cell/sector of another site, e.g., cell B, as indicated by arrow 312. This exemplary scenario is shown in drawing 300 of FIG. 3, where UE 310 needs to be handed off, from one site to another cell/sector of another site. However, a problem arises if the two sites/sectors are on different channels (different carriers and/or different bandwidths).

As an example, consider that Cell A is on 3650-3670 MHz and Cell B is on 3660-3680 MHz (dissimilar channels). This is possible in a CBRS network if SAS provides such assignments to cells. However, operators would normally want to keep the same channel across the market. This handoff is possible with current technology. However, due to the dynamic nature of SAS's channel assignment, this assignment can randomly change (e.g., due to dynamic protection area (DPA) activity) for one or more cells and not for the entire network.

Traditionally, this handover will not work because handoff for carriers is defined per carrier for each cell, i.e., 3650-3670 MHz to 3650-3670 MHz (20 MHz) or 3650-3660 MHz to 3650-3660 MHz (10 MHz) etc. For instance, if within the CBRS band (3550-3700 MHz) different channels of different bandwidths are assigned, the handoff will not take place, i.e., a 3650-3670 MHz to 3650-3680 MHz (dissimilar channel bandwidth) handoff will not take place because the neighbor is not defined specifically for handoff in the system.

This dissimilar channel and dissimilar channel bandwidth assignment will require that new neighbors be defined for each event (event causing re-assignment). This is not possible in existing systems and the handoff will not happen causing call drops.

Based on the above discussion, there is a need for new methods and apparatus for identifying dissimilar channel assignments and performing operations to facilitate handover during the time during which the dissimilar channel assignment remains in effect.

SUMMARY

Methods and apparatus for supporting efficient communications and handover between cells in a communications system, in which one or more cells may be temporarily reassigned to a new channel, which is dissimilar in one or both of: bandwidth or carrier frequency, compared to an original channel being used by a set of cells in the network, are described. The methods and apparatus of the present invention are well suited for use in communications systems in which CBRS spectrum is being used and one or more CBRS base stations in a network may be, and sometimes are, temporarily reassigned, e.g. in response to detected DPA activity, from a static PAL channel being used by the network (e.g., entire network) to a different (new temporary) PAL channel, which is dissimilar from the original PAL channel in one or both of bandwidth and carrier frequency. A new function, e.g., an asymmetric bandwidth neighbor generator (ABNG) function, monitors for and detects dissimilar channel assignments. In response to a detected dissimilar channel assignment, the ABNG function device acquires the neighbor list of the cell to which the dissimilar channel assignment was directed and the neighbor lists of each of the neighbors of the cell to which the dissimilar channel assignment was directed. The ABNG device generates supplemental neighbor list information corresponding to the new channel for one or more cells. Generated supplemental neighbor list information is used to update the original neighbor lists. Some information in the original neighbor lists is quarantined and replaced by the new supplementary neighbor information for the duration of the temporary reassignment. The updated neighbor lists are communicated to the base stations in which the cells are located. The updated neighbor lists allow cells, which are operating on the new temporary channel, to identify other neighbor cells, which are also operating on the new temporary channel, which are suitable handover candidates. The updated neighbor lists also allow cells, which have not been transitioned to the temporary new channel, to recognize which of its neighbor cells are now operating on the new channel and are thus not suitable as handover candidates. When the temporary reassignment of the one or more cells to the new channel is determined to be over, the base stations are instructed to delete the supplemental neighbor list information and restore the original neighbor lists. The use of supplemental neighbor list information facilitates a speedy and efficient transitions, in response to dynamic channel reassignments.

An exemplary method of supporting spectrum allocations, in accordance with some embodiments, comprises: receiving first channel assignment information indicating a first channel assignment to a first cell, said first channel assignment being an assignment to a new channel: checking the first channel assignment information to determine if the first channel assignment is a dissimilar channel assignment which differs from a previous channel assignment in at least one of bandwidth or carrier frequency; and in response to said checking determining that the first channel assignment is a dissimilar channel assignment, requesting existing neighbor list information corresponding to the first cell with the dissimilar channel assignment.

Numerous variations on the described methods and apparatus are possible and, while several embodiments are described in detail, it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 5 comprises the combination of FIG. 5A, FIG. 5B, FIG. 5C, FIG. 5D, FIG. 5E, FIG. 5E, FIG. 5G, FIG. 5H, FIG. 5I, and FIG. 5J.

FIG. 6 is a drawing of an exemplary original neighbor table for CBRS cell: NYC_1_1 and an exemplary new neighbor table for CBRS cell: NYC_1_1, in accordance with an exemplary embodiment, for an example in which an exemplary CBRS cell: NYC_1_1 is temporarily reassigned from channel 2 to channel 4.

FIG. 12 is a drawing of an exemplary original neighbor table for CBRS cell: NYC_1_1 for an example in which exemplary CBRS cell: NYC_1_1 is temporarily reassigned from channel 2 to channel 4.

FIG. 13 is a drawing of an exemplary new neighbor table for exemplary CBRS cell: NYC_1_1, in accordance with an exemplary embodiment, for an example in which exemplary CBRS cell: NYC_1_1 is temporarily reassigned from channel 2 to channel 4.

FIG. 14 is a drawing of an exemplary original neighbor table for CBRS cell: NYC_1_2 and an exemplary new neighbor table for CBRS cell: NYC_1_2, in accordance with an exemplary embodiment, for an example in which an exemplary CBRS cell: NYC_1_1 is temporarily reassigned from channel 2 to channel 4.

FIG. 16 is a drawing of an exemplary original neighbor table for CBRS cell: NYC_1_1 for an example in which exemplary CBRS cell: NYC_1_1 and exemplary CBRS cell: NYC_2_1 are both temporarily reassigned from channel 2 to channel 4.

FIG. 17 is a drawing of an exemplary new neighbor table for exemplary CBRS cell: NYC_1_1, in accordance with an exemplary embodiment, for an example in which exemplary CBRS cell: NYC_1_1 and exemplary CBRS cell: NYC_2_1 are both temporarily reassigned from channel 2 to channel 4.

FIG. 19 is a drawing of an exemplary original neighbor table for CBRS cell: NYC_2_1 and an exemplary new neighbor table for CBRS cell: NYC_2_1, in accordance with an exemplary embodiment, for an example in which exemplary CBRS cell: NYC_1_1 and exemplary CBRS cell: NYC_2_1 are both temporarily reassigned from channel 2 to channel 4.

DETAILED DESCRIPTION

Figure 1:
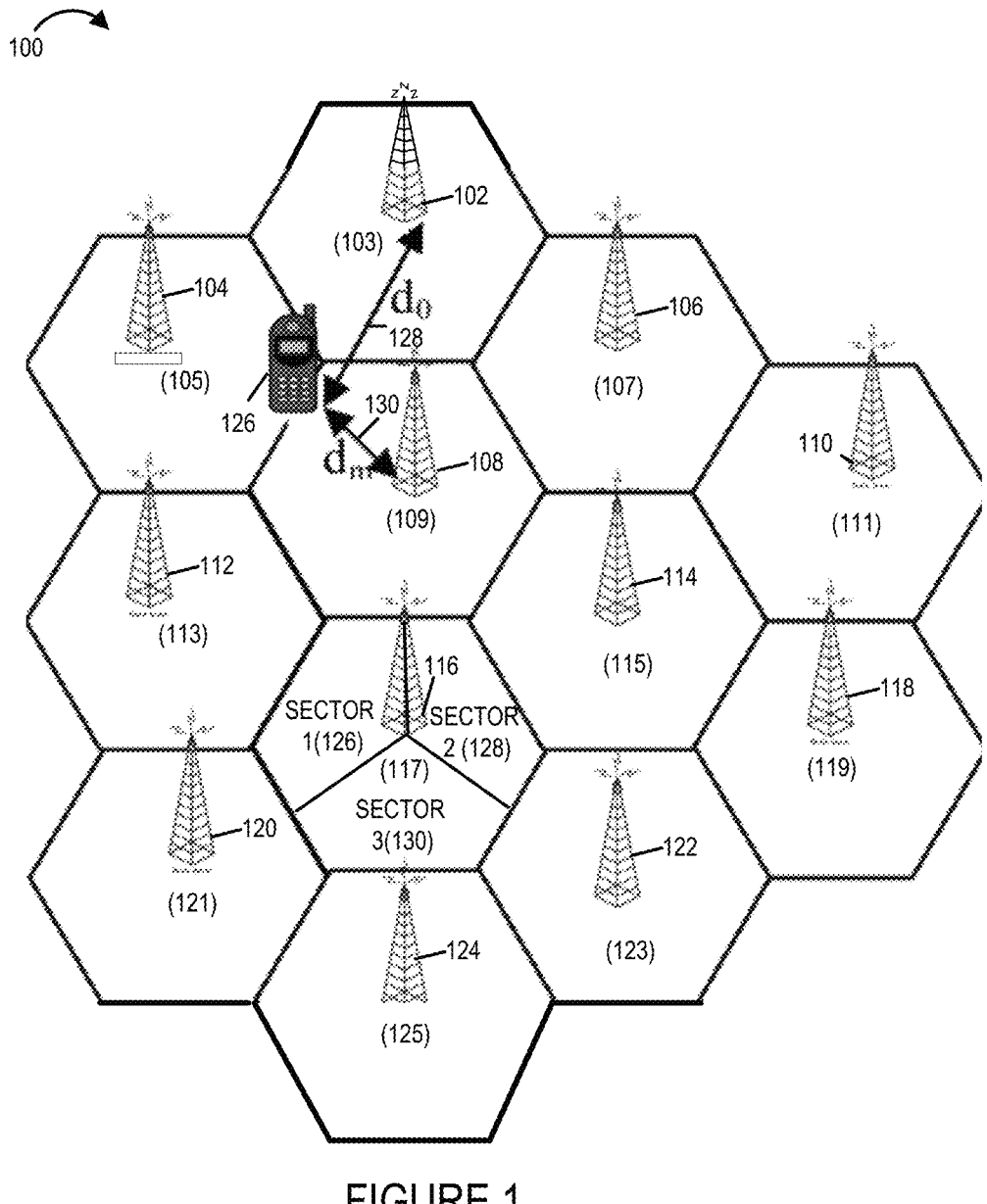
FIG. 1 is a drawing illustrating an example of a plurality of base stations and corresponding cells, which provide wireless coverage in an area.
Figure 2:
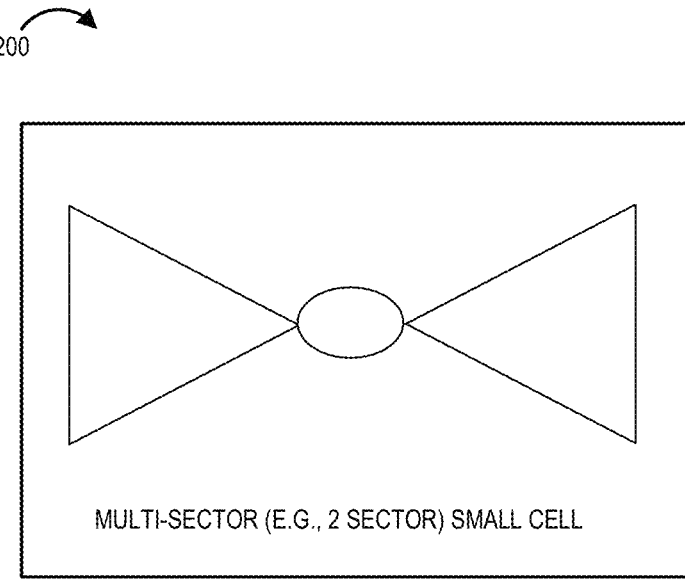
FIG. 2 illustrates a multi-sector base station which is a two-sector base station.
Figure 3:
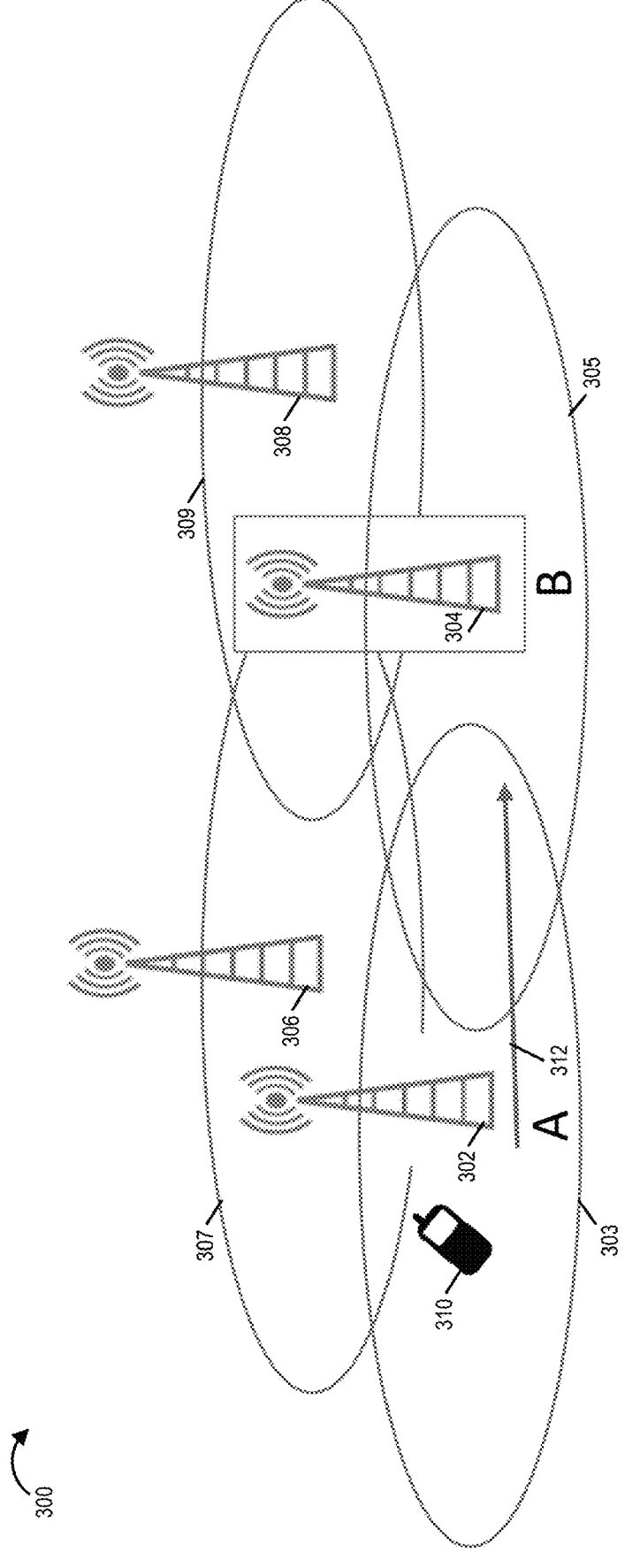
FIG. 3 is a drawing which illustrates a plurality of base stations, each with a corresponding cellular coverage area, and an exemplary user equipment which is being handed off between neighbor cells.
Figure 4:
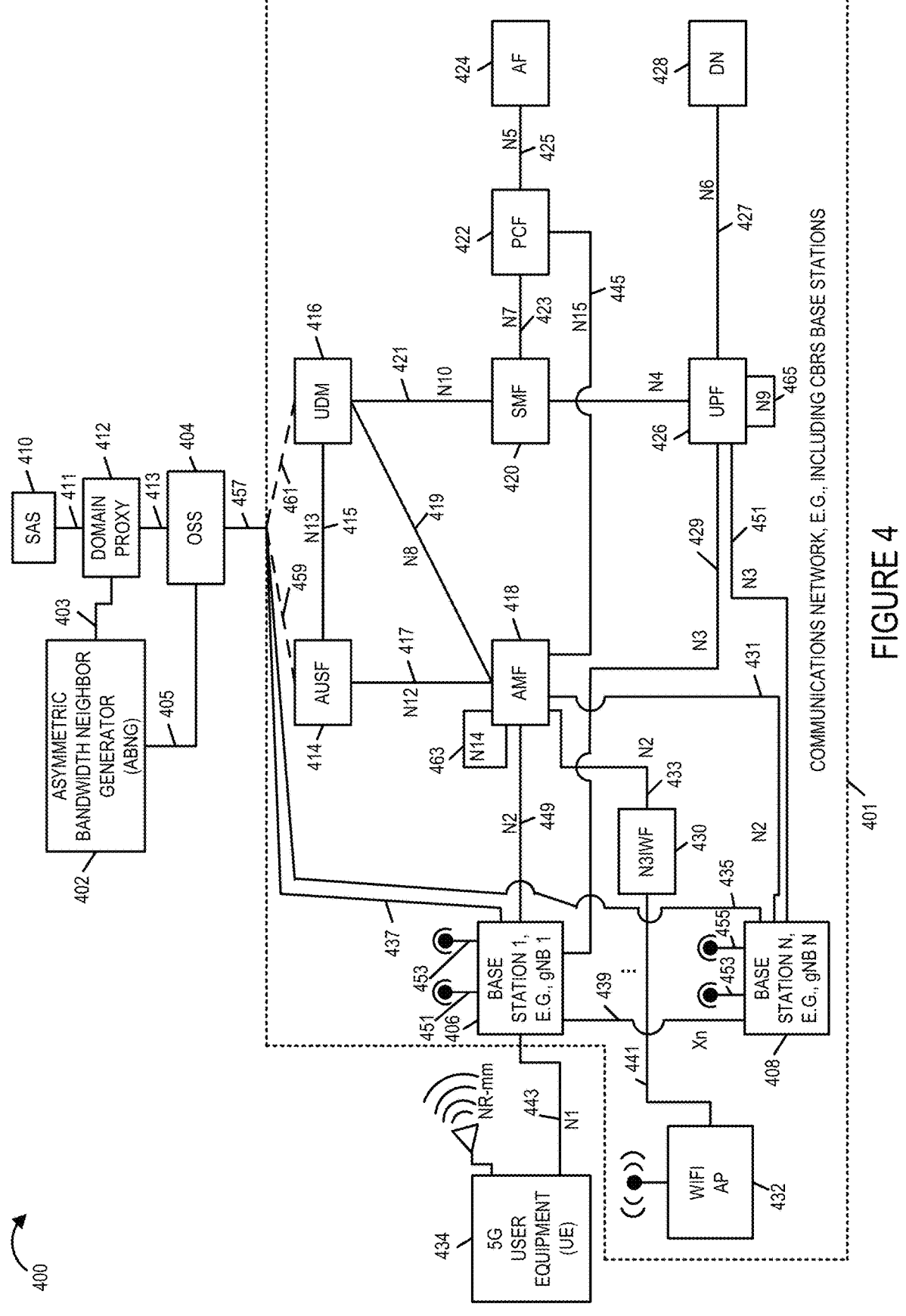
FIG. 4 is a drawing of an exemplary communications system in accordance with an exemplary embodiment.
Figure 5A:
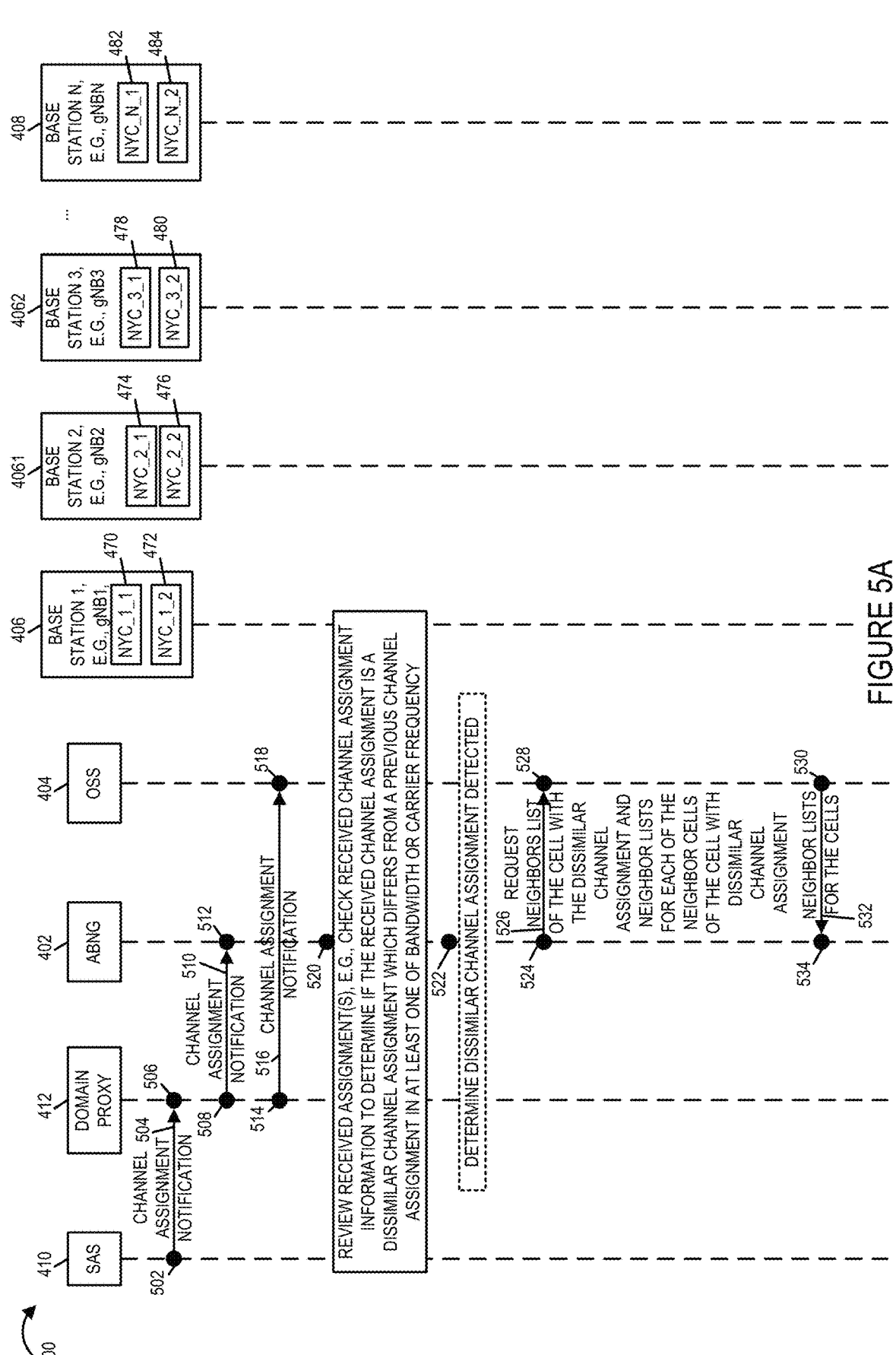
FIG. 5A is a first part of signaling diagram illustrating an exemplary method of operating a communications system in accordance with an exemplary embodiment, said exemplary method including operations supporting spectrum allocations including dissimilar channel assignments.
Figure 5B:
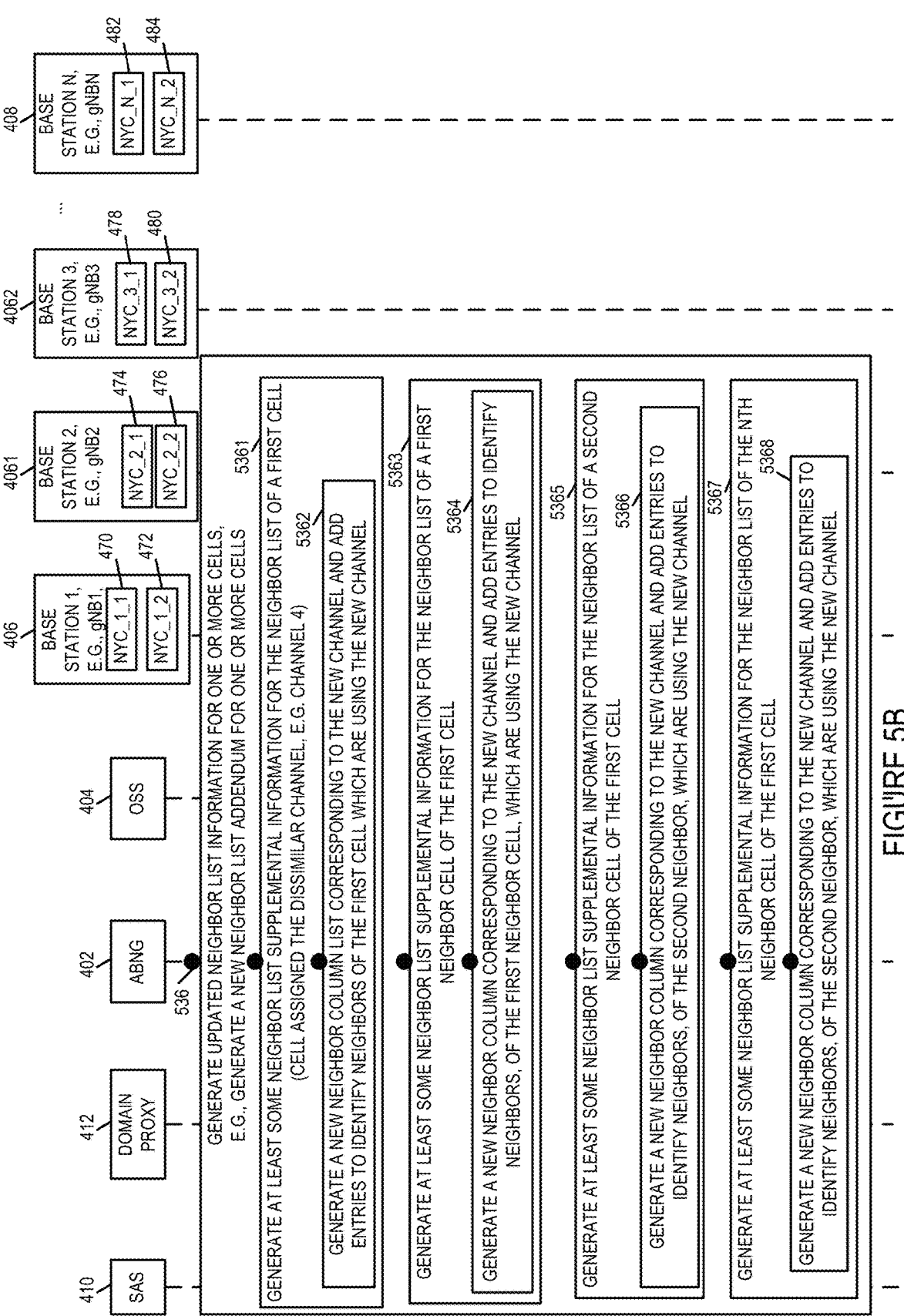
FIG. 5B is a second part of signaling diagram illustrating an exemplary method of operating a communications system in accordance with an exemplary embodiment, said exemplary method including operations supporting spectrum allocations including dissimilar channel assignments.
Figure 5C:
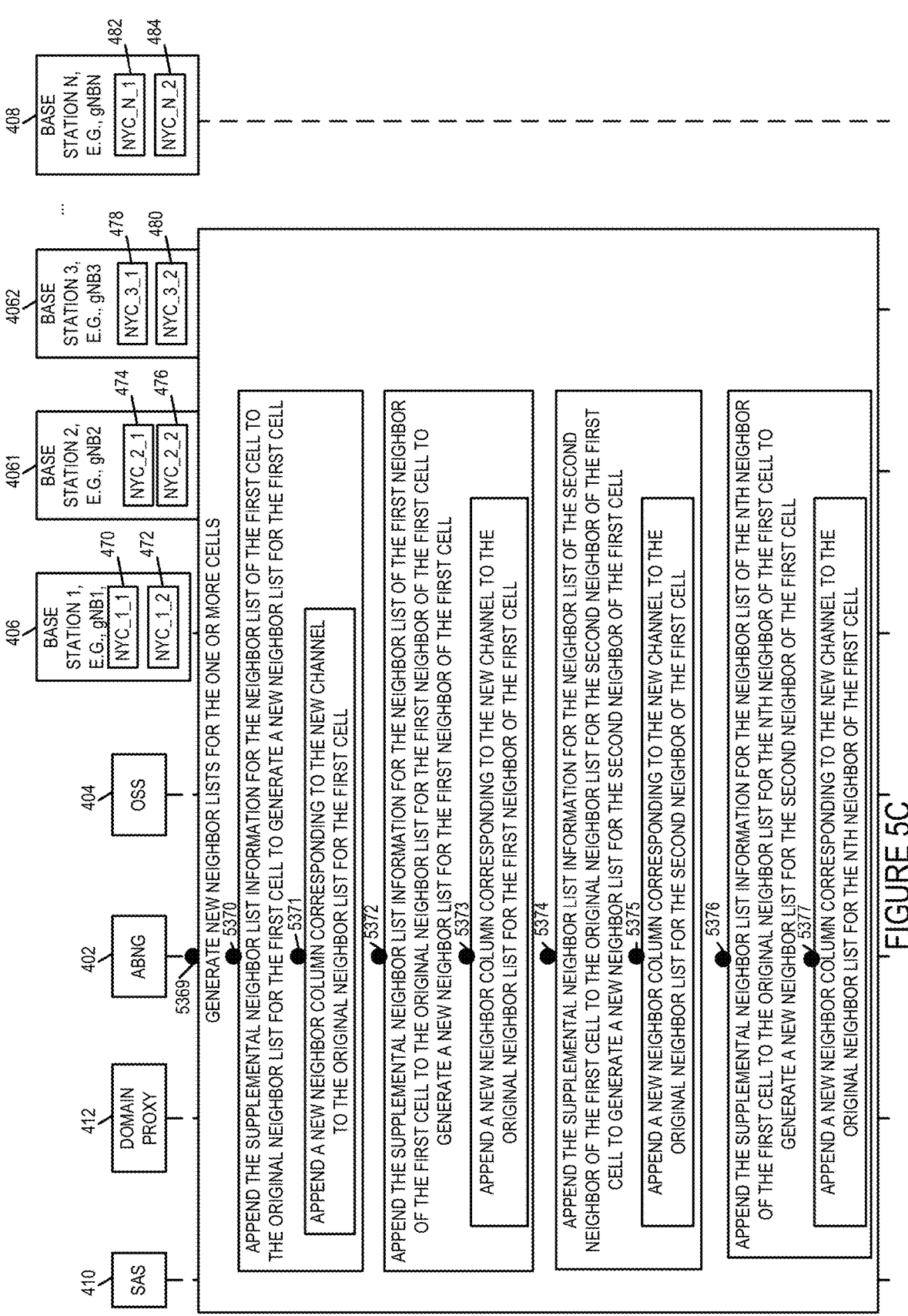
FIG. 5C is a third part of signaling diagram illustrating an exemplary method of operating a communications system in accordance with an exemplary embodiment, said exemplary method including operations supporting spectrum allocations including dissimilar channel assignments.
Figure 5D:
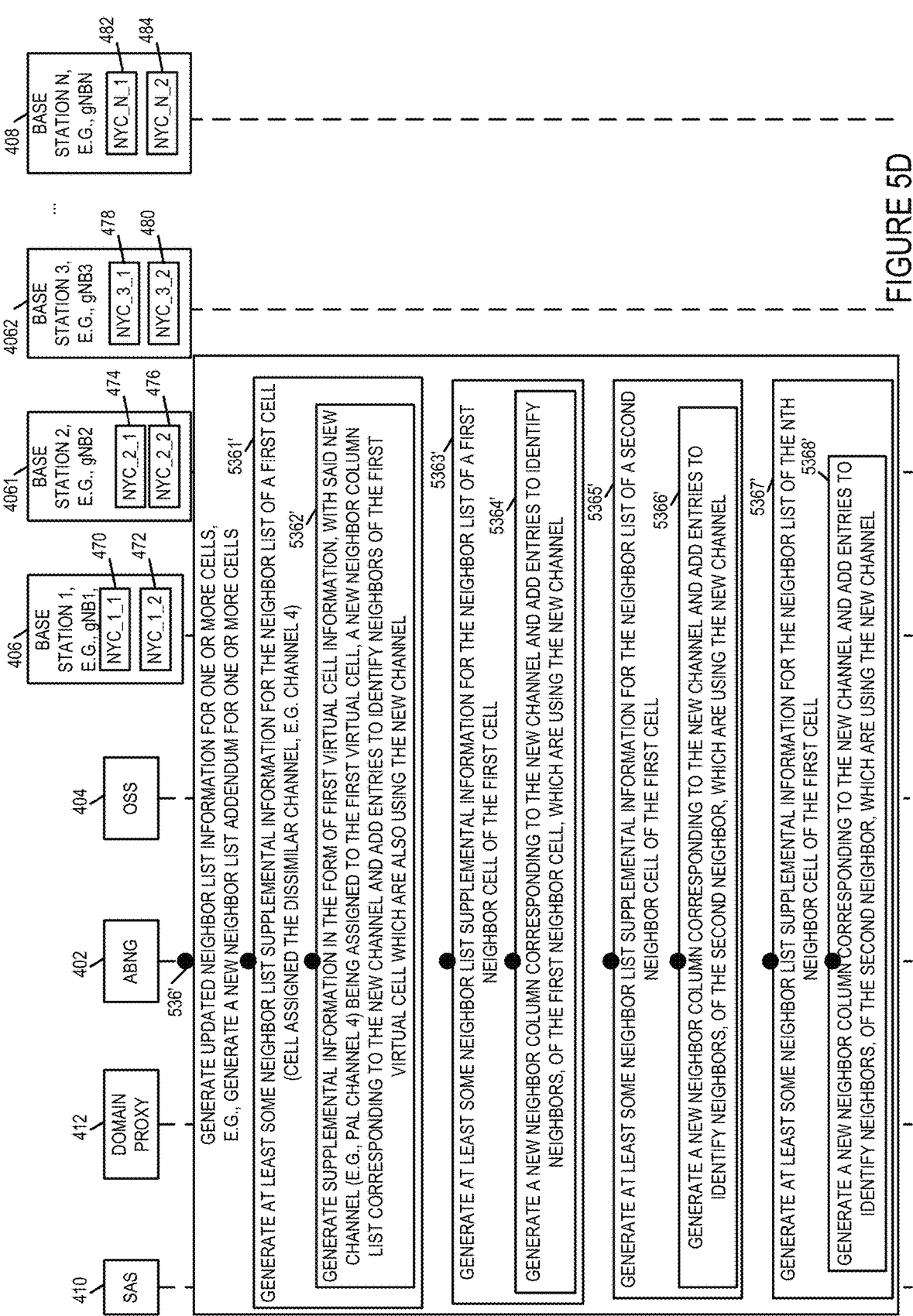
FIG. 5D is a fourth part of signaling diagram illustrating an exemplary method of operating a communications system in accordance with an exemplary embodiment, said exemplary method including operations supporting spectrum allocations including dissimilar channel assignments.
Figure 5E:
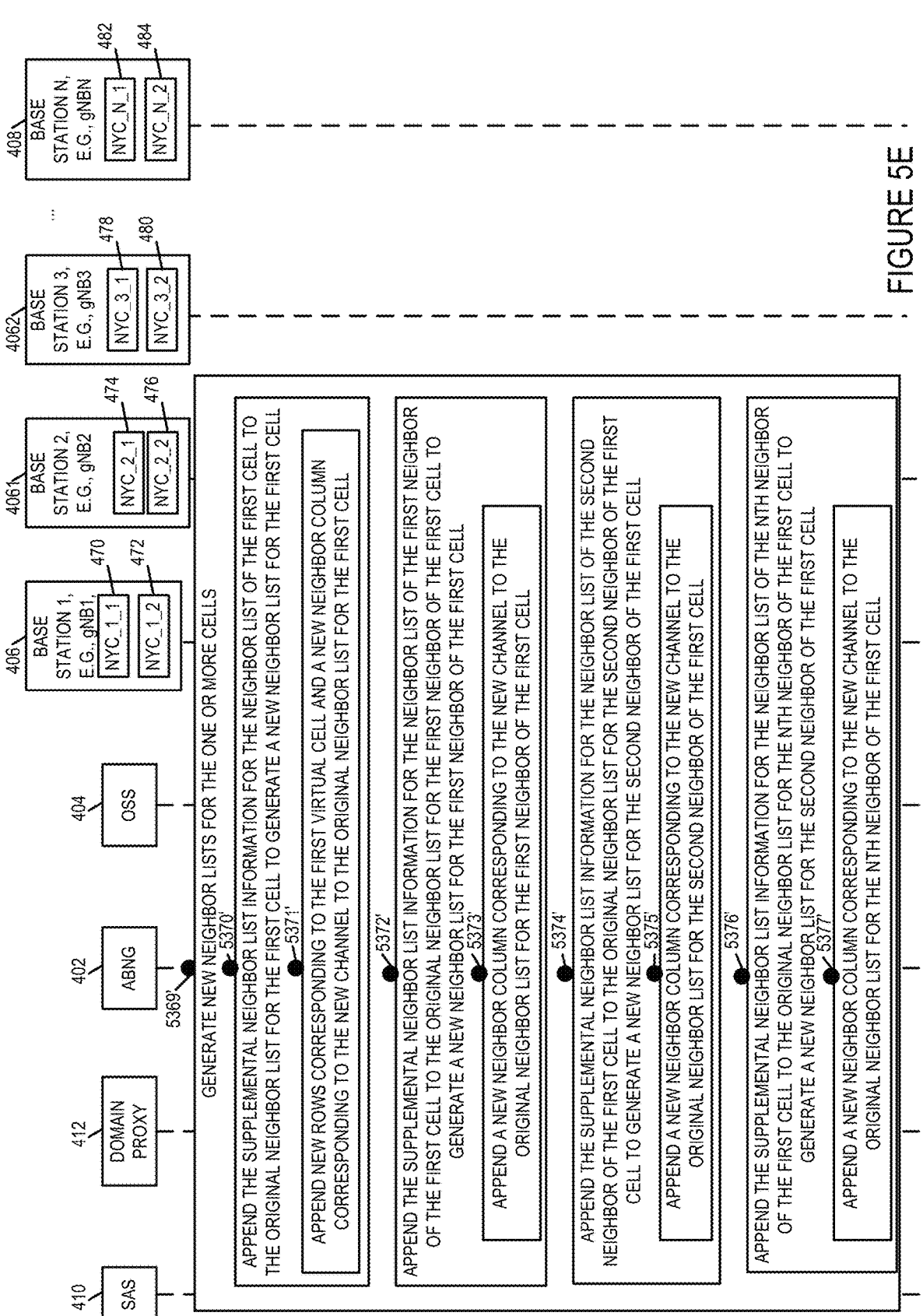
FIG. 5E is a fifth part of signaling diagram illustrating an exemplary method of operating a communications system in accordance with an exemplary embodiment, said exemplary method including operations supporting spectrum allocations including dissimilar channel assignments.
Figure 5F:
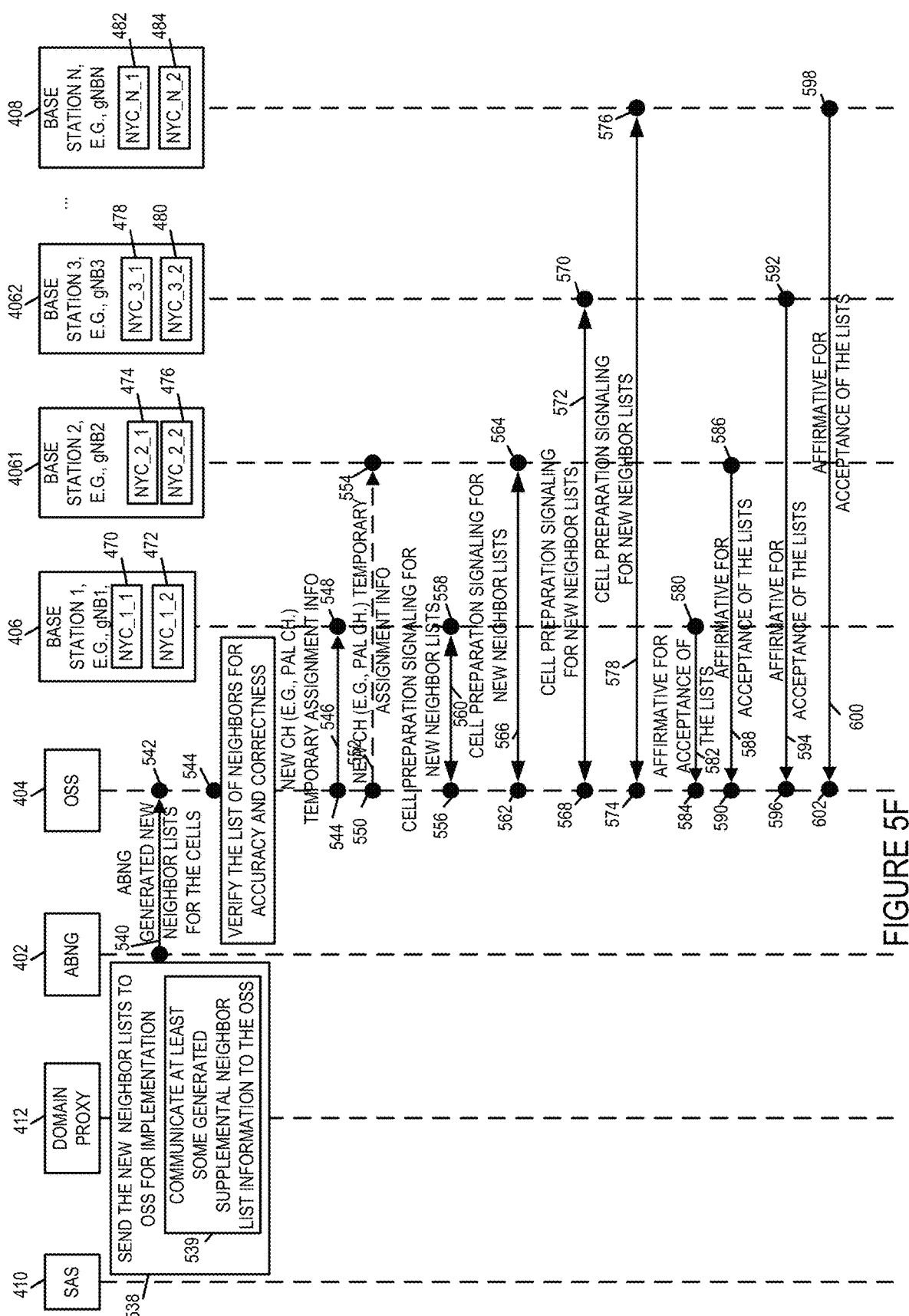
FIG. 5F is a sixth part of signaling diagram illustrating an exemplary method of operating a communications system in accordance with an exemplary embodiment, said exemplary method including operations supporting spectrum allocations including dissimilar channel assignments.
Figure 5G:
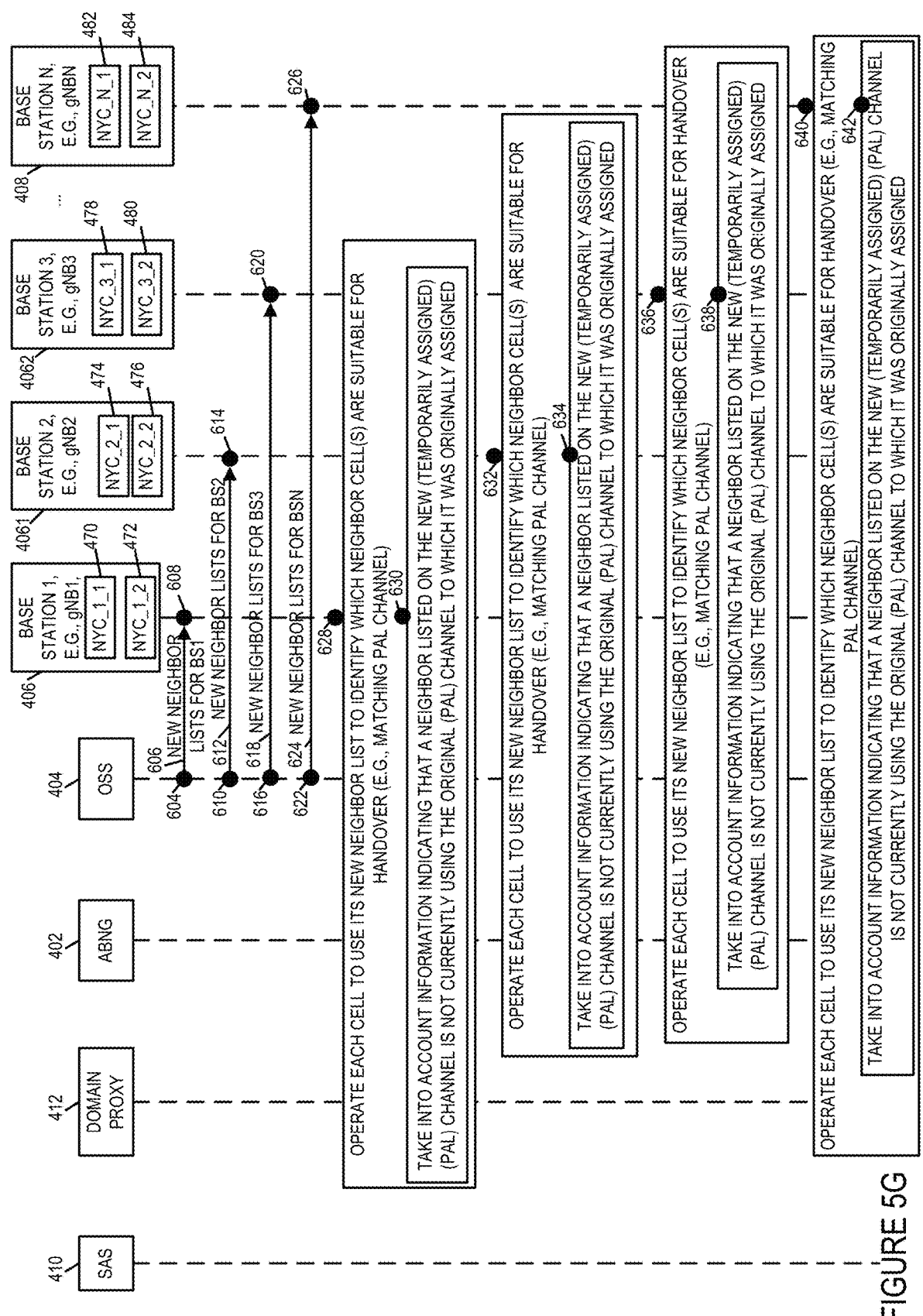
FIG. 5G is a seventh part of signaling diagram illustrating an exemplary method of operating a communications system in accordance with an exemplary embodiment, said exemplary method including operations supporting spectrum allocations including dissimilar channel assignments.
Figure 5H:
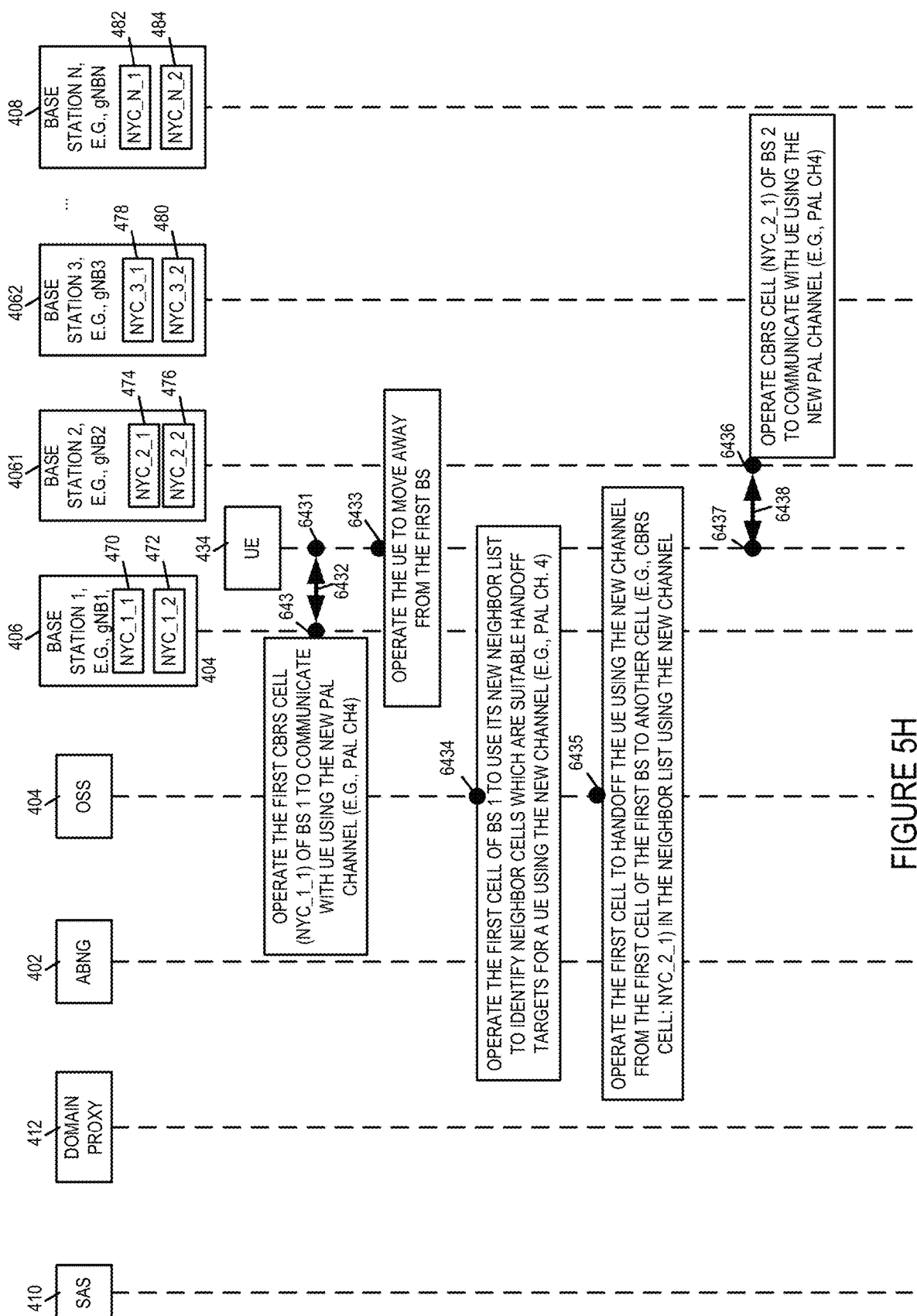
FIG. 5H is a eighth part of signaling diagram illustrating an exemplary method of operating a communications system in accordance with an exemplary embodiment, said exemplary method including operations supporting spectrum allocations including dissimilar channel assignments.
Figure 5I:
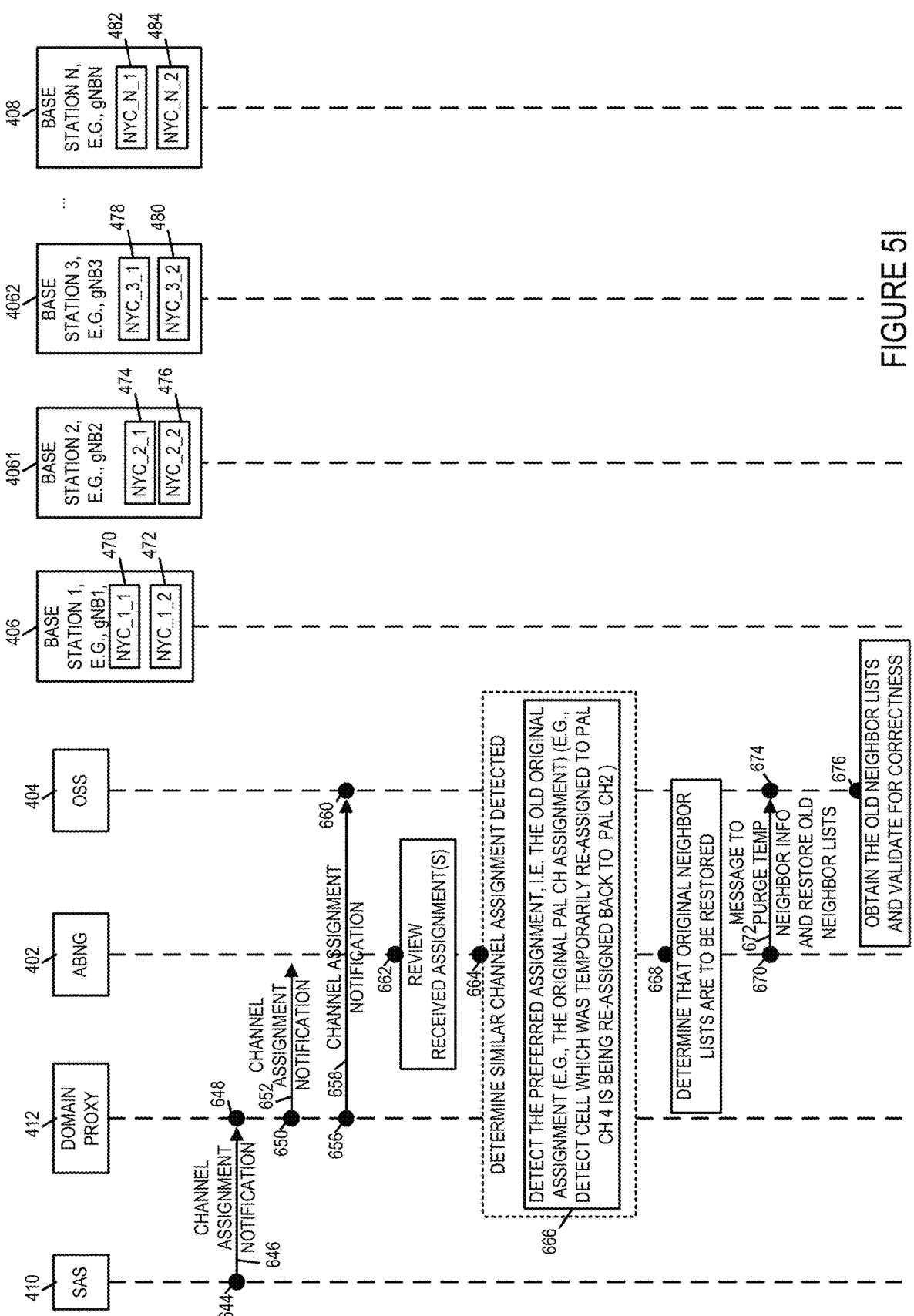
FIG. 5I is a ninth part of signaling diagram illustrating an exemplary method of operating a communications system in accordance with an exemplary embodiment, said exemplary method including operations supporting spectrum allocations including dissimilar channel assignments.
Figure 5J:
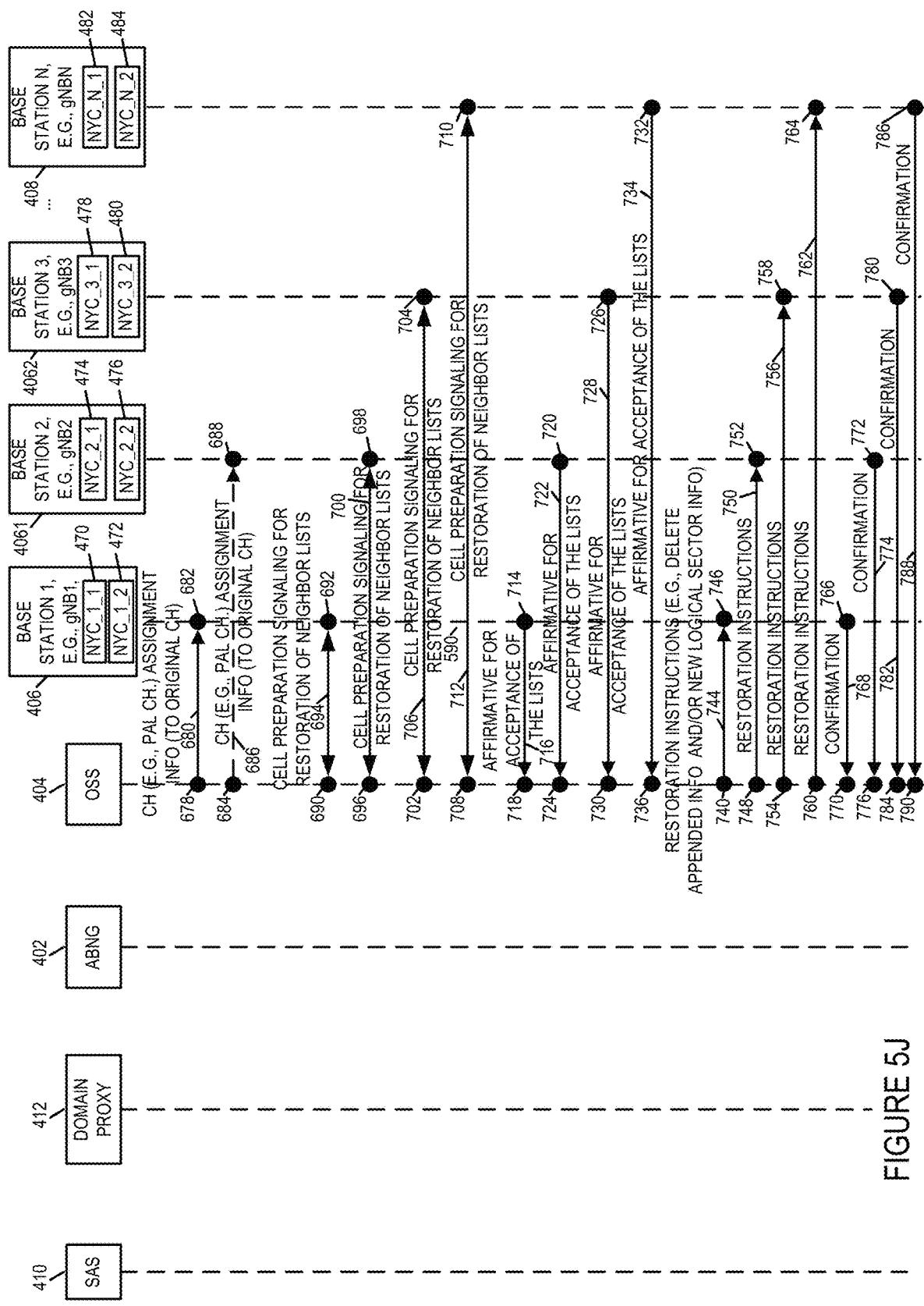
FIG. 5J is a tenth part of signaling diagram illustrating an exemplary method of operating a communications system in accordance with an exemplary embodiment, said exemplary method including operations supporting spectrum allocations including dissimilar channel assignments.

FIG. 4 is a drawing of an exemplary communications system 400 in accordance with an exemplary embodiment.

Exemplary communications system 400 includes a spectrum access system (SAS) 410, a domain proxy 412, an asymmetric bandwidth neighbor generator (ABNG) 402, an operations support systems (OSS) 404, a communications network 401, and a plurality of user equipments (UEs) including 5G UE 434. Communications network 401 is, e.g., a communications network including Citizens Broadband Radio Services (CBRS) base stations. Communications network 401 includes an authentication server function (AUSF) 414, a unified data management (UDM) 416, an access and mobility management function (AMF) 418, a session management function (SMF) 420, a policy control function (PCF) 422, an application function (AF) 424, a user plane function (UPF) 426, a data network (DN) 428, a non-3GPP interworking function (N3IWF) 430, a plurality of base stations (base station 1 406, e.g., gNB1, . . . , base station N 408, e.g., gNB N), and a WiFi access point (AP) 432 coupled together as shown.

SAS 410 is coupled to domain proxy 412 via communications link 411. Domain proxy 412 is coupled to ABNG 402 via communications link 403. Domain proxy 412 is also coupled to OSS 404 via communications link 403. ABNG 402 is coupled to OSS 404 via communications link 405. OSS 404 is coupled to communications network 401 via communications link 457. The OSS 404 is coupled to base station 1 406 via communications link 457 and communications link 437. The OSS 404 is coupled to base station N 408 via communications link 457 and communications link 435. The OSS 404 is coupled to AUSF 414 via communications link 457 and communications link 459. The OSS 404 is coupled to UDM 416 via communications link 457 and communications link 461. In FIG. 4, the OSS 404 is shown as being coupled to AUSF 414, UDM 416, base station 1 406 and base station N 408; however, the OSS 404 may be, and sometimes is, also coupled to any of the other devices/ functions of communications network 410. AUSF 414 is coupled to UDM 416 via N13 connection 415. AUSF 414 is coupled to AMF 418 via N12 connection 417. AMF 418 is coupled to UDM 416 via N8 connection 419. UDM 416 is coupled to SMF 420 via N10 connection 421. SMF 420 is coupled to PCF 422 via N7 connection 423. AMF 418 is coupled to PCF 422 via N15 connection 445. PCF 422 is coupled to AF 424 via N5 connection 425. SMF 420 is coupled to UPF 426 via N4 connection 447. UPF 426 is coupled to DN 428 via N6 connection 427. Base station 1 406 is coupled to AMF 418 via N2 connection 449. Base station N 408 is coupled to AMF 418 via N2 connection 431. Base station 1 406 is coupled to UPF 426 via N3 connection 429. Base station N 408 is coupled to UPF 426 via N3 connection 451. Base station 1 406 is coupled UE 434 via N1 connection 443. N3IWF 430 is coupled to AMF 418 via N2 connection 433. N3IWF 430 is coupled to WIFI AP 432 via communications link 441. Base station 1 406, e.g., gNB 1, includes a plurality of antennas or antenna segments (451, . . . , 453). Base station N 408, e.g., gNB N, includes a plurality of antennas or antenna segments (454, . . . , 455). There is an X2 connection 439 between base station 1 406 and base station N 408. In some embodiments, each of the base stations (406, . . . 408) are CBRS base stations. In some such embodiments, each of the CBRS base stations are muti-sector base stations, e.g., 2 sector base stations. In some such embodiments, each sector is treated as an individual cell from the perspective of the SAS 410, which assigns spectrum, e.g., a PAL channel and GAA spectrum to be used by the sector. In some embodiments, originally each individual CBRS cell (sector) of base stations (406, . . . 408) of network 401 is assigned the same PAL channel (with same carrier and same bandwidth), e.g., to facilitate handover between different CBRS cells (sectors) of the network. However, due to DPA activity, the SAS 410 may, and sometimes assign (on a temporary basis) one or more of the CBRS cells (sectors) to a different PAL channel, e.g., a PAL channel with a different carrier frequency and/or a different bandwidth than the original assignment. The UE 434 communicates with the base stations (406, . . . , 408) via, e.g., new radio (NR) mm wave wireless signals.

In accordance with a feature of the present invention the ABNG function device 402 monitors for and detects a dissimilar channel assignment (different carrier frequency and/or different bandwidth than original assignment), and in response generates supplemental neighbor table information, which is distributed to the affected cells (sector base stations), e.g., via OSS 404. The base stations use the supplemental neighbor table information to identify neighbors which are using the same PAL channel, when making handover decisions. Thus, during the time intervals of temporary PAL reassignment of some or all of the CBRS cells (sector base stations) to dissimilar channels (e.g., dissimilar in one or both of carrier frequency and bandwidth from original assignment) due to DPA, the CBRS cells (sector base stations) are provided with supplemental neighbor table information, facilitating handover decisions. When the ABNG 402 detects that the dissimilar channel assignment has ended, the ABNG 402 signals the affected CBRS cells (sector base stations), via OSS 404, to return to their original neighbor tables.

SAS 410 assigns spectrum to the base stations, e.g., on a per sector basis. SAS 410 assignments include original (static) PAL channel assignments, e.g., each individual sector base station (CBRS cell) of the network is assigned the same PAL channel. SAS 410 assignments also include dynamic channel assignments, e.g., in response to DPA activity one or more sector base stations (CBRS cells) may be, and sometimes are, assigned to use a different PAL channel (e.g., with a different carrier frequency and/or different bandwidth).

ABNG function 402 is a new function, in accordance with the present invention, which will monitor to detect all dissimilar channel assignments by the SAS. The domain proxy 412, which allows registration and assignment of channels on SAS's behalf is connected to OSS 404 as well as being connected to ABNG 402.

Each of the channel assignments goes to ABNG 402 as well as goes to OSS 404.

Whenever there is a dissimilar channel assigned by the SAS 410, the ABNG 402 will look at each of the neighbors of that cell and add another set of neighbors for the new carrier while quarantining the old neighbors for the duration of the SAS's channel assignment.

When SAS 410 goes back to similar channel assignment, the ABNG 402 initiates operations to quarantine/remove the temporary neighbors from the neighbor lists of the cell.

With this approach described above, the neighbor lists for each temporary carrier (temporary PAL channel assigned to one or more CBRS cells (sector base stations)) stays while the temporary carrier is in operation, and the UE's can freely handover without service interruption during the implementation of the temporary carrier (e.g., due to DPA activity).

In some embodiments, the ABNG function 402 is implemented as part of the OSS 404. In other embodiments, the ABNG function 402 is implemented separately as a service that OSS can integrate into. In the later case, the ABNG function can either be based on APIs or service based, i.e., request when there is a dissimilar channel assignment and ask for neighbor assignment. For instance, the ABNG function could be hosted by a service provider operator or could be a service sold by the service provider operator to other vendors/operators.

FIG. 5, comprising the combination of FIG. 5A, FIG. 5B, FIG. 5C, FIG. 5D, FIG. 5E, FIG. 5F and FIG. 5G, is a signaling diagram 500 illustrating an exemplary method of operating a communications system, e.g., communications system 400 of FIG. 4, in accordance with an exemplary embodiment.

The exemplary method of signaling diagram 500 includes supporting spectrum allocations (bandwidth/carrier allocation) in the communications system. The exemplary communications system implementing the method of FIG. 5 includes SAS 410, domain proxy 412, ABNG 402, OSS 404, base station 1 406, e.g., gNB1, base station 2 4061, e.g., gNB2, base station 3 4062, e.g., gNB3 and base station N 408, e.g., gNB N. Base station 1 406, e.g., a two-sector CBRS base station, includes cell NYC_1_1 and cell NYC_1_2. Base station 2 4061, e.g., a two-sector CBRS base station, includes cell NYC_2_1 and cell NYC_2_2. Base station 3 4062, e.g., a two-sector CBRS base station, includes cell NYC_3_1 and cell NYC_3_2. Base station N 408, e.g., a two-sector CBRS base station, includes cell NYC_N_1 and cell NYC_N_2.

In step 502 the SAS 410 generates and sends a channel assignment notification 504 to domain proxy 412, which receives the notification in step 506. In some embodiments, step 502 is initiated in response to DPA activity, and the channel assignment notification is a notification instructing one or more cells to switch to a new PAL channel. In step 508 the domain proxy 412, sends, e.g., forwards, the received channel assignment notification 504, as channel assignment notification 510 to ABNG 402. In step 512 the ABNG 402 receives channel assignments notification 510 and recovers the communicated information. For example, in step 512 the ABNG 402 receives first channel assignment information indicating a first channel assignment to a first cell, e.g., CBRS cell: NYC_1_1, said first channel assignment being a channel assignment to a new channel (e.g., PAL channel 4).

In some embodiments, the first channel assignment information communicates a temporary PAL channel assignment which assigns: i) different bandwidth than a previous PAL channel assignment to the first cell, ii) a different carrier to the first cell than was assigned in the previous PAL channel assignment to the first cell or iii) both a different bandwidth and different carrier than was assigned in the previous PAL channel assignment to the first cell. In some embodiments, the first channel assignment assigns a different PAL channel (e.g., a different PAL channel ID number) than was assigned in the previous PAL channel assignment (e.g., each PAL channel ID number corresponds to a particular bandwidth (e.g., one of 10 MHz, 20 MHz or 30 MHz), and a particular carrier frequency (e.g., center frequency for the channel)). In some embodiments, the first channel assignment information assigns a different bandwidth than was assigned by the previous PAL channel assignment, said bandwidth assigned by the first channel assignment information being one of to a 10 MHz, 20 MHz or 30 MHz bandwidth.

In step 514 the domain proxy 412, sends, e.g., forwards, the received channel assignment notification 504, as channel assignment notification 516 to OSS 404. In step 518 the OSS receives channel assignment notification 516 and recovers the communicated information.

In step 520 the ABNG 402 reviews the received channel assignment(s), e.g., the ABNG checks received channel assignment information to determine if the received channel assignment is a dissimilar channel assignment which differs from a previous channel assignment (e.g., an assignment to PAL channel 2 which in some cases is the original PAL channel being used by the CBRS cells of the network including the first cell (e.g., CBRS cell: NYC_1_1) in at least one or bandwidth or carrier frequency (e.g., a disproportional amount of bandwidth is assigned to the first cell and/or a different carrier is assigned to the first cell). In step 522 the ABNG 402 determines that a dissimilar channel assignment has been detected. In step 524, the ABNG 402 generates and sends a request 526 to the OSS 404 for the neighbor list of the cell with the dissimilar channel assignment and for the neighbor lists of the neighbor cells of the cell with the dissimilar channel assignment (e.g., the request is for the neighbor list of the first cell (e.g., cell NYC_1_1) and for the neighbor lists for the neighbors (e.g., NYC_2_1, NYC_1_2, etc.) of the first cell). In step 528 the OSS 404 receives the request 526. In step 530 the OSS retrieves the neighbor list of the cell with dissimilar channel assignment, retrieves the neighbor lists of the neighbor cells of the cell with dissimilar channel assignment, and sends the neighbor lists 530 for the requested cells to ABNG 402. In step 534 the ABNG 402 receives and recovers the neighbor lists for the cells (original neighbor lists for the requested cells). For example, in step 534 the ABNG 402 receives the neighbor list of said first cell (e.g., CBRS cell: NYC_1_1); the ABNG 402 receives the neighbor list of a first neighbor (e.g., CBRS cell: NYC_2_1) of said first cell; and the ABNG 402 receives the neighbor list of a second neighbor (e.g., CBRS cell: NYC_1_2) of said first cell. Operation proceeds from step 534 to step 536 or step 536', depending upon the particular embodiment implemented for new neighbor list generation.

In step 536, the ABNG 402 generates updated neighbor list information for one or more cells, e.g., the ABNG 402 generates a new neighbor list addendum for one or more cells. Step 536 includes steps 5361, step 5363, step 5365 and step 5367.

In step 5361 the ABNG 402 generates at least some neighbor list supplemental information for the neighbor list of a first cell (a cell, e.g., CBRS cell NYC_1_1, assigned the new dissimilar channel, e.g., PAL channel 4). Step 5361 includes step 5362 in which the ABNG 402 generates a new neighbor column corresponding to the new channel (e.g., PAL channel 4) and adds entries to identify neighbors of the first cell which are using the new channel (e.g., PAL channel 4).

In I step 5363 the ABNG 402 generates at least some neighbor list supplemental information for the neighbor list of a first neighbor (e.g., CBRS cell: NYC_2_1) of the first cell.

In some embodiments, said neighbor list supplemental information for the neighbor list of the first neighbor of the first cell is in the form of a new channel neighbor column (e.g., to supplement the neighbor list of the first neighbor of the first cell), said new channel neighbor column including an entry identifying the first cell as using the new channel. In some such embodiments, said new channel neighbor column entry identifying the first cell as using the new channel (e.g., PAL channel 4) supersedes a channel neighbor column entry of the neighbor list of the first neighbor of the first cell for the previously assigned PAL channel (e.g., PAL channel 2), said first cell being temporarily prohibited from using the previously assigned PAL channel.

Step 5363 includes step 5364 in which the ABNG 402 generates a new neighbor column corresponding to the new channel (e.g., PAL channel 4) and adds entries to identify neighbors of the first neighbor (e.g., CBRS cell: NYC_2_1), which are using the new channel (e.g., PAL channel 4).

In step 5365 the ABNG 402 generates at least some neighbor list supplemental information for the neighbor list of a second neighbor (e.g., CBRS cell: NYC_1_2) of the first cell. In some embodiments, said neighbor list supplemental information for the neighbor list of the second neighbor of the first cell is in the form of a new channel neighbor column (e.g., to supplement the neighbor list of the second neighbor of the first cell), said new channel neighbor column including an entry identifying the first cell as using the new channel. In some such embodiments, said new channel neighbor column entry identifying the first cell as using the new channel (e.g., PAL channel 4) supersedes a channel neighbor column entry of the neighbor list of the second neighbor of the first cell for the previously assigned PAL channel (e.g., PAL channel 2), said first cell being temporarily prohibited from using the previously assigned PAL channel.

Step 5365 includes step 5366 in which the ABNG 402 generates a new neighbor column corresponding to the new channel (e.g., PAL channel 4) and adds entries to identify neighbors of the second neighbor (e.g., CBRS cell: NYC_1_2), which are using the new channel (e.g., PAL channel 4).

In step 5367 the ABNG 402 generates at least some neighbor list supplemental information for the neighbor list of a Nth neighbor of the first cell. Step 5367 includes step 5368 in which the ABNG 402 generates a new neighbor column corresponding to the new channel (e.g., PAL channel 4) and adds entries to identify neighbors of the Nth neighbor, which are using the new channel (e.g., PAL channel 4). Operation proceeds from step 536 to step 5369.

In step 5369 the ABNG 402 generates new (updated) neighbor lists for the one or more cells using the generated supplemental neighbor list information from step 536. Step 5369 includes steps 5370, 5372, 5374 and 5376. In step 5370 the ABNG 402 appends the supplemental neighbor list information for the neighbor list of the first cell to the original neighbor list for the first cell to generate a new neighbor list for the first cell. Step 5370 includes step 5371, in which the ABNG 402 appends a new neighbor column (from step 5362) corresponding to the new channel, e.g., PAL channel 4, to the original neighbor list for the first cell.

In step 5372 the ABNG 402 appends the supplemental neighbor list information for the neighbor list of the first neighbor (e.g., CBRS cell: NYC_2_1) of the first cell to the original neighbor list for the first neighbor of the first cell to generate a new neighbor list for the first neighbor of the first cell. Step 5372 includes step 5373, in which the ABNG 402 appends a new neighbor column (from step 5364) corresponding to the new channel, e.g., PAL channel 4, to the original neighbor list for the first neighbor of the first cell.

In step 5374 the ABNG 402 appends the supplemental neighbor list information for the neighbor list of the second neighbor (e.g., CBRS cell: NYC_1_2) of the first cell to the original neighbor list for the second neighbor of the first cell to generate a new neighbor list for the second neighbor of the first cell. Step 5374 includes step 5375, in which the ABNG 402 appends a new neighbor column (from step 5366) corresponding to the new channel, e.g., PAL channel 4, to the original neighbor list for the second neighbor of the first cell.

In step 5376 the ABNG 402 appends the supplemental neighbor list information for the neighbor list of the Nth neighbor of the first cell to the original neighbor list for the Nth neighbor of the first cell to generate a new neighbor list for the Nth neighbor of the first cell. Step 5376 includes step 5377, in which the ABNG 402 appends a new neighbor column (from step 5368) corresponding to the new channel, e.g., PAL channel 4, to the original neighbor list for the Nth neighbor of the first cell.

In step 536', the ABNG 402 generates updated neighbor list information for one or more cells, e.g., the ABNG 402 generates a new neighbor list addendum for one or more cells. Step 536' includes steps 5361', step 5363', step 5365' and step 5367".

In step 5361' the ABNG 402 generates at least some neighbor list supplemental information for the neighbor list of a first cell (a cell, e.g., CBRS cell NYC_1_1, assigned the new dissimilar channel, e.g., PAL channel 4). In some embodiments, the neighbor list supplemental information is in the form of first virtual cell information, with said new channel (e.g., PAL channel 4) being assigned to a first virtual cell (e.g., CBRS cell: NYC_1_3(1)). In some embodiments, the first virtual cell (e.g., NYC_1_3(1)) is viewed as a CBRS cell corresponding to a third logical sector of two-sector base station BS 1 406. In some such embodiments, the first cell (e.g., NYC_1_1) and the first virtual cell (e.g., NYC_1_3(1)) correspond to the same base station, e.g., BS 1 406, said first cell information being superseded by the said first virtual cell information, and said first virtual cell information being used during a period of time in which the previously (originally) assigned PAL channel (e.g., PA L channel 2) corresponding to first cell having been suspended and the new assignment (e.g., PAL channel 4) being in effect.

Step 5361' includes step 5362' in which the ABNG 402 generates supplemental information in the form of first virtual cell information (e.g., CBRS cell: NYC_1_3(1) information) with said new channel (e.g., PAL channel 4) being assigned to the first virtual cell, a new neighbor column corresponding to the new channel (e.g., PAL channel 4) and adds entries to identify neighbors of the first virtual cell (CBRS cell: NYC_1_3(1) which are also using the new channel (e.g., PAL channel 4).

In step 5363' the ABNG 402 generates at least some neighbor list supplemental information for the neighbor list of a first neighbor (e.g., CBRS cell: NYC_2_1) of the first cell. Step 5363' includes step 5364' in which the ABNG 402 generates a new neighbor column corresponding to the new channel (e.g., PAL channel 4) and adds entries to identify neighbors of the first neighbor (e.g., CBRS cell: NYC_2_1), which are using the new channel (e.g., PAL channel 4).

In step 5365' the ABNG 402 generates at least some neighbor list supplemental information for the neighbor list of a second neighbor (e.g., CBRS cell: NYC_1_2) of the first cell. Step 5365' includes step 5366' in which the ABNG 402 generates a new neighbor column corresponding to the new channel (e.g., PAL channel 4) and adds entries to identify neighbors of the second neighbor (e.g., CBRS cell: NYC_1_2), which are using the new channel (e.g., PAL channel 4).

In step 5367' the ABNG 402 generates at least some neighbor list supplemental information for the neighbor list of a Nth neighbor of the first cell. Step 5367' includes step 5368' in which the ABNG 402 generates a new neighbor column corresponding to the new channel (e.g., PAL channel 4) and adds entries to identify neighbors of the Nth neighbor, which are using the new channel (e.g., PAL channel 4). Operation proceeds from step 536' to step 5369'.

In step 5369' the ABNG 402 generates new (updated) neighbor lists for the one or more cells using the generated supplemental neighbor list information from step 536'. Step 5369' includes steps 5370', 5372', 5374' and 5376'. In step 5370' the ABNG 402 appends the supplemental neighbor list information for the neighbor list of the first cell to the original neighbor list for the first cell to generate a new neighbor list for the first cell. Step 5370' includes step 5371', in which the ABNG 402 appends new rows corresponding to the first virtual cell (e.g., CBRS cell: (NYC_1_3(1)) (from step 5362') and a new neighbor column (from step 5362') corresponding to the new channel, e.g., PAL channel 4, to the original neighbor list for the first cell.

In step 5372' the ABNG 402 appends the supplemental neighbor list information for the neighbor list of the first neighbor (e.g., CBRS cell: NYC_2_1) of the first cell to the original neighbor list for the first neighbor of the first cell to generate a new neighbor list for the first neighbor of the first cell. Step 5372' includes step 5373', in which the ABNG 402 appends a new neighbor column (from step 5364') corresponding to the new channel, e.g., PAL channel 4, to the original neighbor list for the first neighbor of the first cell.

In step 5374' the ABNG 402 appends the supplemental neighbor list information for the neighbor list of the second neighbor (e.g., CBRS cell: NYC_1_2) of the first cell to the original neighbor list for the second neighbor of the first cell to generate a new neighbor list for the second neighbor of the first cell. Step 5374' includes step 5375', in which the ABNG 402 appends a new neighbor column (from step 5366') corresponding to the new channel, e.g., PAL channel 4, to the original neighbor list for the second neighbor of the first cell.

In step 5376' the ABNG 402 appends the supplemental neighbor list information for the neighbor list of the Nth neighbor of the first cell to the original neighbor list for the Nth neighbor of the first cell to generate a new neighbor list for the Nth neighbor of the first cell. Step 5376' includes step 5377', in which the ABNG 402 appends a new neighbor column (from step 5368) corresponding to the new channel, e.g., PAL channel 4, to the original neighbor list for the Nth neighbor of the first cell.

Operation proceeds from step 5377 or step 5377', depending upon the implemented embodiment, to step 538.

In step 538 the ABNG sends the ABNG generated new neighbor lists 540 to the OSS for implementation. Step 538 includes step 539 in which the ABNG 402 communicates at least some generated supplemental neighbor list information (e.g., with the supplemental neighbor list information being part of the new neighbor lists that are sent to the OSS or as supplemental information which the OSS or a base station can combine with previous neighbor list information to generate a new neighbor list) to the OSS 404. In step 542 the OSS receives the ABNG generated new neighbor lists 540 including the supplemental neighbor list information. In step 544 the OSS 404 verifies the received neighbor lists for accuracy and correctness.

In step 544 the OSS 404 sends new channel (e.g., new PAL channel) temporary assignment information 546 to base station 1 406, which includes a cell, e.g., cell designated NYC_1_1, which is being assigned a new PAL channel, e.g., PAL channel 4, by the SAS 410. In step 406 base station 1 406 receives the new channel assignment information, e.g., which it subsequently uses to reconfigure the cell, e.g., NYC_1_1, being temporarily reassigned to the new PAL channel.

In some embodiments, step 550 is also performed. In step 550 the OSS 404 sends new channel (e.g., new PAL channel) temporary assignment information 552 to base station 2 4061, which includes a cell, e.g., cell designated NYC_2_1, which is also being assigned the new PAL channel, e.g., PAL channel 4, by the SAS 410. In step 406 base station 1 406 receives the new channel assignment information, e.g., which it subsequently uses to reconfigure the cell, e.g., NYC_2_1, being temporarily reassigned to the new PAL channel.

In steps 556 and 558 the OSS 404 and base station 1 406 are operated to exchange channel preparation signaling for new neighbor lists 560. In steps 562 and 564 the OSS 404 and base station 2 4061 are operated to exchange channel preparation signaling for new neighbor lists 566. In steps 568 and 570 the OSS 404 and base station 3 4062 are operated to exchange channel preparation signaling for new neighbor lists 572. In steps 574 and 576 the OSS 404 and base station N 408 are operated to exchange channel preparation signaling for new neighbor lists 578.

In step 580 base station 1 406 generates and sends signal 582 communicating affirmative for acceptance of the new neighbor lists. In step 584 OSS 404 receives the affirmative response 582, indicating that base station 1 406 is ready to receive new neighbor lists. In step 586 base station 2 4061 generates and sends signal 588 communicating affirmative for acceptance of the new neighbor lists. In step 590 OSS 404 receives the affirmative response 588, indicating that base station 2 4061 is ready to receive new neighbor lists. In step 592 base station 3 4062 generates and sends signal 594 communicating affirmative for acceptance of the new neighbor lists. In step 596 OSS 404 receives the affirmative response 594, indicating that base station 3 4062 is ready to receive new neighbor lists. In step 598 base station N 408 generates and sends signal 600 communicating affirmative for acceptance of the new neighbor lists. In step 602 OSS 404 receives the affirmative response 600, indicating that base station N 408 is ready to receive new neighbor lists.

In step 604 OSS 404 generates and sends new neighbor lists 606 for BS 1 406, e.g., a new neighbor list for cell NYC_1_1 and a new neighbor list for cell 1_2, for BS1, to base station 1 406. Thus, in step 604 the OSS 404 communicates new neighbor list information for the first cell to the base station in which the first cell is located for use in controlling the first cell, said new neighbor list information for the first cell including neighbor list supplemental information for the neighbor list of the first cell. Also, in step 604 the OSS communicates new neighbor list information for the first neighbor of the first cell to the base station in which the first neighbor of the first cell is located for using in controlling the first neighbor, said first new neighbor list information including neighbor list supplemental information for the neighbor list of the first neighbor of the first cell. In step 608 base station 1 406 receives the new neighbor lists, recovers the communicated information including supplemental neighbor list information, and stores the received information, e.g., to be used in making handover decisions.

In step 610 OSS 404 generates and sends new neighbor lists 612 for BS2 4061, e.g., a new neighbor list for cell: NYC_2_1 and a new neighbor list for cell: NYC_2_2, for BS2 4061, to base station 2 4061. Thus, in step 610 the OSS communicates second new neighbor list information for the second neighbor of the first cell to the base station in which the second neighbor of the first cell is located for use in controlling the second neighbor, said second new neighbor list information including neighbor list supplemental information for the neighbor list of the second neighbor of the first cell. Also, in step 610 the OSS communicates third new neighbor list information for the third neighbor of the first cell to the base station in which the third neighbor of the first cell is located for use in controlling the third neighbor, said third new neighbor list information including neighbor list supplemental information for the neighbor list of the third neighbor of the first cell. In step 614 base station 2 4061 receives the new neighbor lists, recovers the communicated information including supplemental neighbor list information, and stores the received information, e.g., to be used in making handover decisions.

In step 616 OSS 404 generates and sends new neighbor lists 618 for BS3 4062, e.g., a new neighbor list for cell NYC_3_1 and a new neighbor list for cell 3_2, for BS3 4062, to base station 3 4062. In step 620 base station 3 4062 receives the new neighbor lists, recovers the communicated information including supplemental neighbor list information, and stores the received information, e.g., to be used in making handover decisions.

In step 622 OSS 404 generates and sends new neighbor lists 624 for BSN 408, e.g., a new neighbor list for cell NYC_N_1 and a new neighbor list for cell N_2, for BSN 408, to base station N 408. In step 626 base station N 408 receives the new neighbor lists, recovers the communicated information including supplemental neighbor list information, and stores the received information, e.g., to be used in making handover decisions.

In step 628 base station 1 406 operates each of its cells (NYC_1_1 and NYC_1_2) to use its new neighbor list to identify which neighbor cell(s) are suitable for handover (e.g., matching PAL channel indicates suitability for handover). Step 628 includes step 630 in which the cell of the base station 406 takes into account information indicating that a neighbor listed on the new (temporarily assigned) (PAL) channel is not currently using the original (PAL) channel to which it was initially assigned, e.g., a supplemental neighbor list information entry replaces an original neighbor list information entry.

In step 632 base station 2 4061 operates each of its cells (NYC_2_1 and NYC_2_2) to use its new neighbor list to identify which neighbor cell(s) are suitable for handover (e.g., matching PAL channel indicates suitability for handover). Step 632 includes step 634 in which the cell of the base station 4061 takes into account information indicating that a neighbor listed on the new (temporarily assigned) (PAL) channel is not currently using the original (PAL) channel to which it was initially assigned, e.g., a supplemental neighbor list information entry replaces an original neighbor list information entry.

In step 636 base station 3 4062 operates each of its cells (NYC_3_1 and NYC_3_2) to use its new neighbor list to identify which neighbor cell(s) are suitable for handover (e.g., matching PAL channel indicates suitability for handover). Step 636 includes step 638 in which the cell of the base station 4062 takes into account information indicating that a neighbor listed on the new (temporarily assigned) (PAL) channel is not currently using the original (PAL) channel to which it was initially assigned, e.g., a supplemental neighbor list information entry replaces an original neighbor list information entry.

In step 640 base station N 408 operates each of its cells (NYC_N_1 and NYC_N_2) to use its new neighbor list to identify which neighbor cell(s) are suitable for handover (e.g., matching PAL channel indicates suitability for handover). Step 640 includes step 642 in which the cell of the base station 408 takes into account information indicating that a neighbor listed on the new (temporarily assigned) (PAL) channel is not currently using the original (PAL) channel to which it was initially assigned, e.g., a supplemental neighbor list information entry replaces an original neighbor list information entry.

In step 643 the first CBRS cell (NYC_1_1) of base station 1 406 is operated to communicate (transmit and/or receive wireless signals 6432) with UE 434 using the new (temporarily assigned) PAL channel (e.g., PAL channel 4). In step 6431 UE 434 is operated to communicate (receive and/or transmit wireless signals 642) with the first cell (NYC_1_1) of base station 1 406 using the new (temporarily assigned) PAL channel (e.g., PAL channel 4).

In step 6433 the UE moves away from base station 1 406 and closer to other base stations. In step 6434 the first cell (NYC_1_1) of base station 1 406 is operated to use it new neighbor list (e.g., new neighbor table 1352 of FIG. 9 or new neighbor table 1952 of FIG. 17) to identify neighbor cell(s) which are suitable handoff targets for using the new channel (e.g., PAL channel 4). In this example neighbor CBRS cell: NYC_2_1 is identified as a suitable candidate for handover, since it is also operating on PAL channel 4. In step 6435 the first cell of the BS 1 hands off the UE 434 to another cell, e.g., CBRS cell: NYC_2_1, which is on its new neighbor list and which is also using the new channel (e.g., PAL channel 4).

In step 6436 CBRS cell (NYC_2_1) of base station 2 4061 is operated to communicate (transmit and/or receive wireless signals 6438) with UE 434 using the new (temporarily assigned) PAL channel (e.g., PAL channel 4). In step 6437 UE 434 is operated to communicate (receive and/or transmit wireless signals 6438) with the cell (NYC_2_1) of base station 2 4061 using the new (temporarily assigned) PAL channel (e.g., PAL channel 4).

In step 644 the SAS 410 generates and sends a channel assignment notification 646 to domain proxy 412, which receives the notification in step 648. In some embodiments, step 646 is initiated in response to a determination that DPA activity has ceased, and the channel assignment notification is a notification instructing one or more cells to switch back to the original PAL channel. In step 650 the domain proxy 412, sends, e.g., forwards, the received channel assignment notification 646, as channel assignment notification 652 to ABNG 402. In step 654 the ABNG receives channel assignments notification 652 and recovers the communicated information. In step 656 the domain proxy 412, sends, e.g., forwards, the received channel assignment notification 646, as channel assignment notification 658 to OSS 404. In step 660 the OSS receives channel assignment notification 658 and recovers the communicated information.

In step 662 the ABNG 402 reviews the received channel assignment(s), e.g., the ABNG checks received channel assignment information to determine if the received channel assignment is a dissimilar channel assignment which differs from the original channel assignment in at least one or bandwidth or carrier frequency. In step 664 the ABNG 402 determines that a similar channel assignment has been detected. Step 664 includes step 666 in which the ABNG 402 detects the preferred channel assignment, i.e., the received channel assignment matches the old original channel assignment (e.g., the original PAL channel assignment, e.g., PAL channel 2). For example, in step 666 the ABNG 402 detects a channel assignment to the first cell (NYC_1_1) which assigns the previously assigned channel (e.g., PAL channel 2), use of which was suspended (e.g., in response to detected DPA activity), to the first cell (NYC_1_1).

In step 668, the ABNG 402 determines that one or more original neighbor lists, which were supplemented by neighbor list supplemental information, are to be restored. In step 670 the ABNG 402 sends message 672 to OSS 404, wherein message 672 is a command or instruction to purge the temporary neighbor information (e.g., the supplemental neighbor information in the new neighbor lists), and restore the old neighbor lists. In step 676 the OSS obtains the old neighbor lists and validates the lists for correctness.

In step 678 the OSS 404 sends channel assignment information 680 to base station 1 406, said channel assignment information 680 specifying a channel assignment to an original channel. For example, the channel assignment information 680 specifies that cell NYC_1_1 470 (which was temporarily assigned to PAL channel 4) is being re-assigned to its original PAL channel, e.g., PAL channel 2. In step 682 base station 1 406 receives the channel assignment information 680 and recovers the communicated information, e.g. which is to be used to reconfigure cell NYC_1_1 to subsequently operate on PAL channel 2.

In some embodiments, e.g., an embodiment in which NYC_2_1 was temporarily assigned to PAL channel 4, step 684 is performed. In step 684 the OSS 404 sends channel assignment information 686 to base station 2 4061, said channel assignment information 686 specifying a channel assignment to an original channel. For example, the channel assignment information 684 specifies that cell NYC_2_1 474 (which was temporarily assigned to PAL channel 4) is being re-assigned to its original PAL channel, e.g., PAL channel 2. In step 688 base station 2 4061 receives the channel assignment information 686 and recovers the communicated information, e.g., which is to be used to reconfigure cell NYC_2_1 to subsequently operate on PAL channel 4.

In steps 690 and 692 the OSS 404 and base station 1 406 are operated to exchange cell preparation signaling 694 for restoration of neighbor lists. In steps 696 and 698 the OSS 404 and base station 2 4061 are operated to exchange cell preparation signaling 700 for restoration of neighbor lists. In steps 702 and 704 the OSS 404 and base station 3 4062 are operated to exchange cell preparation signaling 706 for restoration of neighbor lists. In steps 708 and 710 the OSS 404 and base station N 408 are operated to exchange cell preparation signaling 712 for restoration of neighbor lists.

In step 714 base station 1 406 generates and sends signal 716 communicating affirmative for acceptance of the lists. In step 718 OSS 404 receives the affirmative response 716, indicating that base station 1 406 is ready to start restoration of the original neighbor lists. In step 720 base station 2 4061 generates and sends signal 722 communicating affirmative for acceptance of the lists. In step 722 OSS 404 receives the affirmative response 722, indicating that base station 2 4061 is ready to start restoration of the original neighbor lists. In step 724 base station 3 4062 generates and sends signal 726 communicating affirmative for acceptance of the lists. In step 728 OSS 404 receives the affirmative response 726, indicating that base station 2 4062 is ready to start restoration of the original neighbor lists. In step 728 base station N 408 generates and sends signal 730 communicating affirmative for acceptance of the lists. In step 732 OSS 404 receives the affirmative response 730, indicating that base station N 408 is ready to start restoration of the original neighbor lists.

In step 740 OSS 404 generates and sends restoration instructions 744 (e.g., delete appended supplemental information and/or logical sector information from the neighbor tables) to base station 1 406. Thus, in step 744 the OSS 404 controls the first base station 406 to purge temporary neighbor list information relating to the first cell and to return to using previously used original neighbor lists. In step 746, base station 1 406 receives the restoration instructions 744 and executes the restoration instructions, e.g., deleting previously appended columns of neighbors corresponding to the temporary channel, e.g., PAL channel 4, and/or deleting appended information corresponding to the previously added logical sectors (e.g., NYC_1_3(1), NYC_2_3(1)) corresponding to the temporary channel, e.g., PAL channel 4, for each of the neighbor tables of the cells NYC_1_1 and NYC_1_2 of base station 1, thus restoring the original neighbor tables.

In step 748 OSS 404 generates and sends restoration instructions 750 (e.g., delete appended supplemental information and/or logical sector information from the neighbor tables) to base station 2 4061. Thus, in step 748 the OSS 404 controls the second base station 4061 to purge temporary neighbor list information relating to the first cell and to return to using previously used original neighbor lists. In step 752, base station 2 4061 receives the restoration instructions 750 and executes the restoration instructions, e.g., deleting previously appended columns of neighbors corresponding to the temporary channel, e.g., PAL channel 4, and/or deleting appended information corresponding to the previously added logical sectors (e.g., NYC_1_3(1), NYC_2_3(1)) corresponding to the temporary channel, e.g., PAL channel 4, for each of the neighbor tables of the cells NYC_2_1 and NYC_2_2 of base station 2, thus restoring the original neighbor tables.

In step 754 OSS 404 generates and sends restoration instructions 756 (e.g., delete appended supplemental information and/or logical sector information from the neighbor tables) to base station 3 4062. In step 758, base station 3 4062 receives the restoration instructions 756 and executes the restoration instructions, e.g., deleting previously appended columns of neighbors corresponding to the temporary channel, e.g., PAL channel 4, and/or deleting appended information corresponding to the previously added logical sectors (e.g., NYC_1_3(1), NYC_2_3(1)) corresponding to the temporary channel, e.g., PAL channel 4, for each of the neighbor tables of the cells NYC_3_1 and NYC_3_2 of base station 3, thus restoring the original neighbor tables.

In step 760 OSS 404 generates and sends restoration instructions 762 (e.g., delete appended supplemental information and/or logical sector information from the neighbor tables) to base station N 408. In step 764, base station N 408 receives the restoration instructions 762 and executes the restoration instructions, e.g., deleting previously appended columns of neighbors corresponding to the temporary channel, e.g., PAL channel 4, and/or deleting appended information corresponding to the previously added logical sectors (e.g., NYC_1_3(1), NYC_2_3(1)) corresponding to the temporary channel, e.g., PAL channel 4, for each of the neighbor tables of the cells NYC_N_1 and NYC_N_2 of base station N, thus restoring the original neighbor tables.

In step 766 base station 1 406 generates and sends a confirmation signal 768 to OSS 404, indicating that base station 1 406 has restored its original neighbor tables (one neighbor table for cell NYC_1_1 and one neighbor table for cell NYC_1_2), and in step 770 the OSS 404 receives the confirmation signal 768. In step 772 base station 2 4061 generates and sends a confirmation signal 774 to OSS 404, indicating that base station 2 4061 has restored its original neighbor tables (one neighbor table for cell NYC_2_1 and one neighbor table for cell NYC_2_2), and in step 776 the OSS 404 receives the confirmation signal 774. In step 780 base station 3 4062 generates and sends a confirmation signal 782 to OSS 404, indicating that base station 3 406 has restored its original neighbor tables (one neighbor table for cell NYC_3_1 and one neighbor table for cell NYC_3_2), and in step 784 the OSS 404 receives the confirmation signal

744. In step 786 base station N 408 generates and sends a confirmation signal 788 to OSS 404, indicating that base station N 408 has restored its original neighbor tables (one neighbor table for cell NYC_N_1 and one neighbor table for cell NYC_N_2), and in step 790 the OSS 404 receives the confirmation signal 788.

Figure 7:
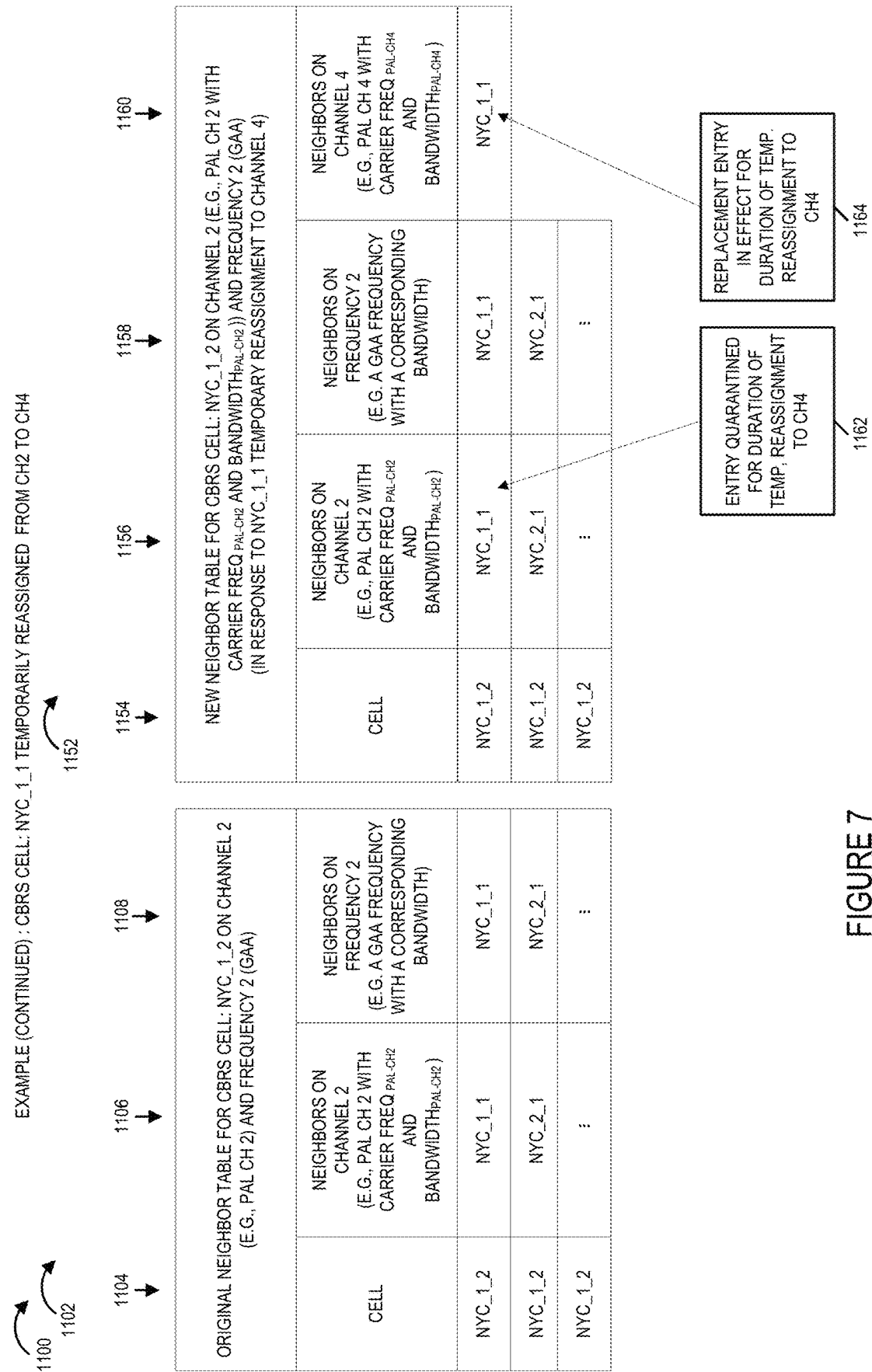
FIG. 7 is a drawing of an exemplary original neighbor table for CBRS cell: NYC_1_2 and an exemplary new neighbor table for CBRS cell: NYC_1_2, in accordance with an exemplary embodiment, for an example in which an exemplary CBRS cell: NYC_1_1 is temporarily reassigned from channel 2 to channel 4.
Figure 8:
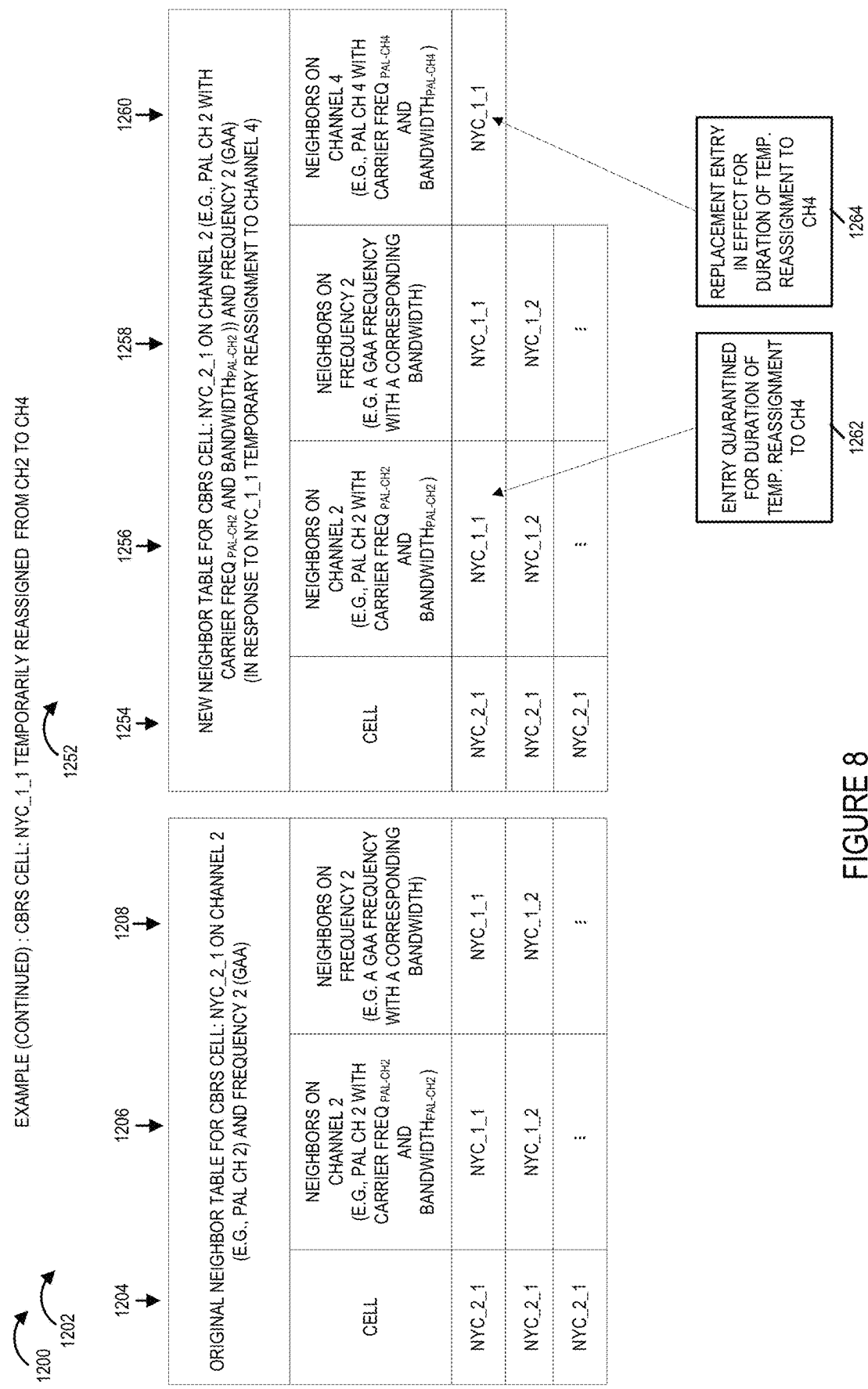
FIG. 8 is a drawing of an exemplary original neighbor table for CBRS cell: NYC_2_1 and an exemplary new neighbor table for CBRS cell: NYC_2_1, in accordance with an exemplary embodiment, for an example in which an exemplary CBRS cell: NYC_1_1 is temporarily reassigned from channel 2 to channel 4.

FIGS. 6-8 illustrate exemplary neighbor tables for an example in which the ABNG 402 detects a dissimilar channel assignment (CBRS cell: NYC_1_1 470 of base station 1 406 is temporarily reassigned by the SAS 410 from its original channel, which is channel 2 (e.g., PAL channel) to channel 4 (e.g., PAL channel 4)) and, in response, the ABNG 402 generates supplementary neighbor table information used to generate new neighbor tables. The supplementary information or the new neighbor tables including the supplementary information are communicated to the base stations to be used by the cells of the base stations for subsequent handover decisions, while the temporary channel reassignment is in effect.

Drawing 1000 of FIG. 6 includes original neighbor table 1002 for CBRS cell: NYC_1_1 and a new neighbor table 1052 for CBRS cell: NYC_1_1. Original neighbor table 1002 for CBRS cell: NYC_1_1 on channel 2 (e.g., PAL channel 2) and frequency 2 (GAA) includes: a first column 1004 identifying the cell, which is cell: NYC_1_1, a second column 1006 identifying neighbors on channel 2 (e.g., PAL channel 2 with carrier frequency PAL-CH2 and bandwidth PAL-CH2), and a third column 1008 identifying neighbors on frequency 2 (e.g., a GAA frequency with a corresponding bandwidth). In this example cell NYC_1_1 has the following neighbors of channel 2: NYC 2_1, NYC 1_2, NYC_3_1, NYC4_2, NYC_4_1, NYC_5_1, NYC_5_2, NYC_6_2, as indicated by column 1006. In this example cell NYC_1_1 has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1008.

New neighbor table 1052 for CBRS cell: NYC_1_1 on temporarily assigned channel 4 (e.g., PAL channel 4 with carrier frequency PAL-CH4 and bandwidth PAL-CH4) and frequency 2 (GAA) (e.g., where at least one of the carrier frequency or the bandwidth are different between CH 2 and CH4) includes: a first column 1054 identifying the cell, which is cell: NYC_1_1, a second column identifying neighbors on channel 2 (e.g., PAL channel 2 with carrier frequency PAL-CH2 and bandwidth PAL-CH2), and a third column 1058 identifying neighbors on frequency 2 (e.g., a GAA frequency with a corresponding bandwidth), and a fourth column 1060 identifying neighbors on channel 4 (e.g., PAL channel 4 with carrier frequency PAL-CH4 and bandwidth PAL-CH4). In this example cell NYC_1_1 has the following neighbors of channel 2: NYC 2_1, NYC 1_2, NYC_3_1, NYC4_2, NYC_4_1, NYC_5_1, NYC_5_2, NYC_6_2, as indicated by column 1006. In this example cell NYC_1_1 has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1008. No neighbors of cell NYC_1_1 are shown on channel 4, as indicated by blank column 1060.

Drawing 1100 of FIG. 7 includes original neighbor table 1102 for CBRS cell: NYC_1_2 and a new neighbor table 1152 for CBRS cell: NYC_1_2. Original neighbor table 1102 for CBRS cell: NYC_1_2 on channel 2 (e.g., PAL channel 2) and frequency 2 (GAA) includes: a first column 1104 identifying the cell, which is cell: NYC_1_2, a second column 1106 identifying neighbors on channel 2 (e.g., PAL channel 2 with carrier frequency PAL-CH2 and bandwidth PAL-CH2), and a third column 1108 identifying neighbors on frequency 2 (e.g., a GAA frequency with a corresponding bandwidth). In this example cell NYC_1_2 has the following neighbors of channel 2: NYC_1_1 and NYC_2_1 as indicated by column 1106. In this example cell NYC_2_1 has the following neighbors of frequency 2 (e.g., a GAA freq.): NYC_1_1, NYC_2_1, as indicated by column 1008.

New neighbor table 1152 for CBRS cell: NYC_1_2 on channel 2 (e.g., PAL channel 2 with carrier frequency PAL-CH2 and bandwidth PAL-CH2) and frequency 2 (GAA), generated in response to NYC_1_1 being temporarily reassigned to channel 4, includes: a first column 1154 identifying the cell, which is cell: NYC_1_2, a second column 1156 identifying neighbors on channel 2 (e.g., PAL channel 2 with carrier frequency PAL-CH2 and bandwidth PAL-CH2), a third column 1158 identifying neighbors on frequency 2 (e.g., a GAA frequency with a corresponding bandwidth), and a fourth column 1160 identifying neighbors on channel 4 (e.g., PAL channel 4 with carrier frequency PAL-CH4 and bandwidth PAL-CH4). In this example cell NYC_1_2 has the following neighbors of channel 2: NYC_1_1, NYC_2_1, as indicated by column 1156. In this example cell NYC_1_2 has the following neighbors of frequency 2 (e.g., a GAA freq.): NYC 1_1, NYC 2_1, as indicated by column 1158. In this example, cell NYC_1_1 has the following neighbors of channel 4 (e.g., PAL channel 4 with carrier frequency PAL-CH4 and bandwidth PAL-CH4): NYC_1_1, as indicated by column 1160.

Column 1156 neighbor entry: NYC_1_1 will be quarantined for the duration of the temporary reassignment to channel 4, as indicated by block 1162. Column 1160 new entry: NYC_1_1, is a replacement entry that will be in effect for the duration of the temporary reassignment to channel 4, as indicated by block 1164.

Drawing 1200 of FIG. 8 includes original neighbor table 1202 for CBRS cell: NYC_2_1 and a new neighbor table 1252 for CBRS cell: NYC_2_1. Original neighbor table 1202 for CBRS cell: NYC_2_1 on channel 2 (e.g., PAL channel 2) and frequency 2 (GAA) includes: a first column 1204 identifying the cell, which is cell: NYC_2_2, a second column 1206 identifying neighbors on channel 2 (e.g., PAL channel 2 with carrier frequency PAL-CH2 and bandwidth PAL-CH2), and a third column 1008 identifying neighbors on frequency 2 (e.g., a GAA frequency with a corresponding bandwidth). In this example cell NYC_2_1 has the following neighbors of channel 2: NYC_1_1 and NYC_1_2 as indicated by column 1206. In this example cell NYC_1_2 has the following neighbors of frequency 2 (e.g., a GAA freq.): NYC_1_1, NYC_1_2, as indicated by column 1208.

New neighbor table 1252 for CBRS cell: NYC_2_1 on channel 2 (e.g., PAL channel 2 with carrier frequency PAL-CH2 and bandwidth PAL-CH2) and frequency 2 (GAA), generated in response to NYC_1_1 being temporarily reassigned to channel 4, includes: a first column 1254 identifying the cell, which is cell: NYC_2_1, a second column 1256 identifying neighbors on channel 2 (e.g., PAL channel 2 with carrier frequency PAL-CH2 and bandwidth PAL-CH2), a third column 1258 identifying neighbors on frequency 2 (e.g., a GAA frequency with a corresponding bandwidth), and a fourth column 1260 identifying neighbors on channel 4 (e.g., PAL channel 4 with carrier frequency PAL-CH4 and bandwidth PAL-CH4). In this example cell NYC_2_1 has the following neighbors of channel 2: NYC_1_1, NYC_1_2, as indicated by column 1156. In this example cell NYC_2_1 has the following neighbors of frequency 2 (e.g., a GAA freq.): NYC 1_1, NYC 1_2, as indicated by column 1258. In this example, cell NYC_2_1 has the following neighbors of channel 4 (e.g., PAL channel 4 with carrier frequency PAL-CH4 and bandwidth PAL-CH4): NYC_1_1, as indicated by column 1260.

Column 1256 neighbor entry: NYC_1_1 will be quarantined for the duration of the temporary reassignment to channel 4, as indicated by block 1262. Column 1260 new entry: NYC_1_1, is a replacement entry that will be in effect for the duration of the temporary reassignment to channel 4, as indicated by block 1264.

Figure 9:
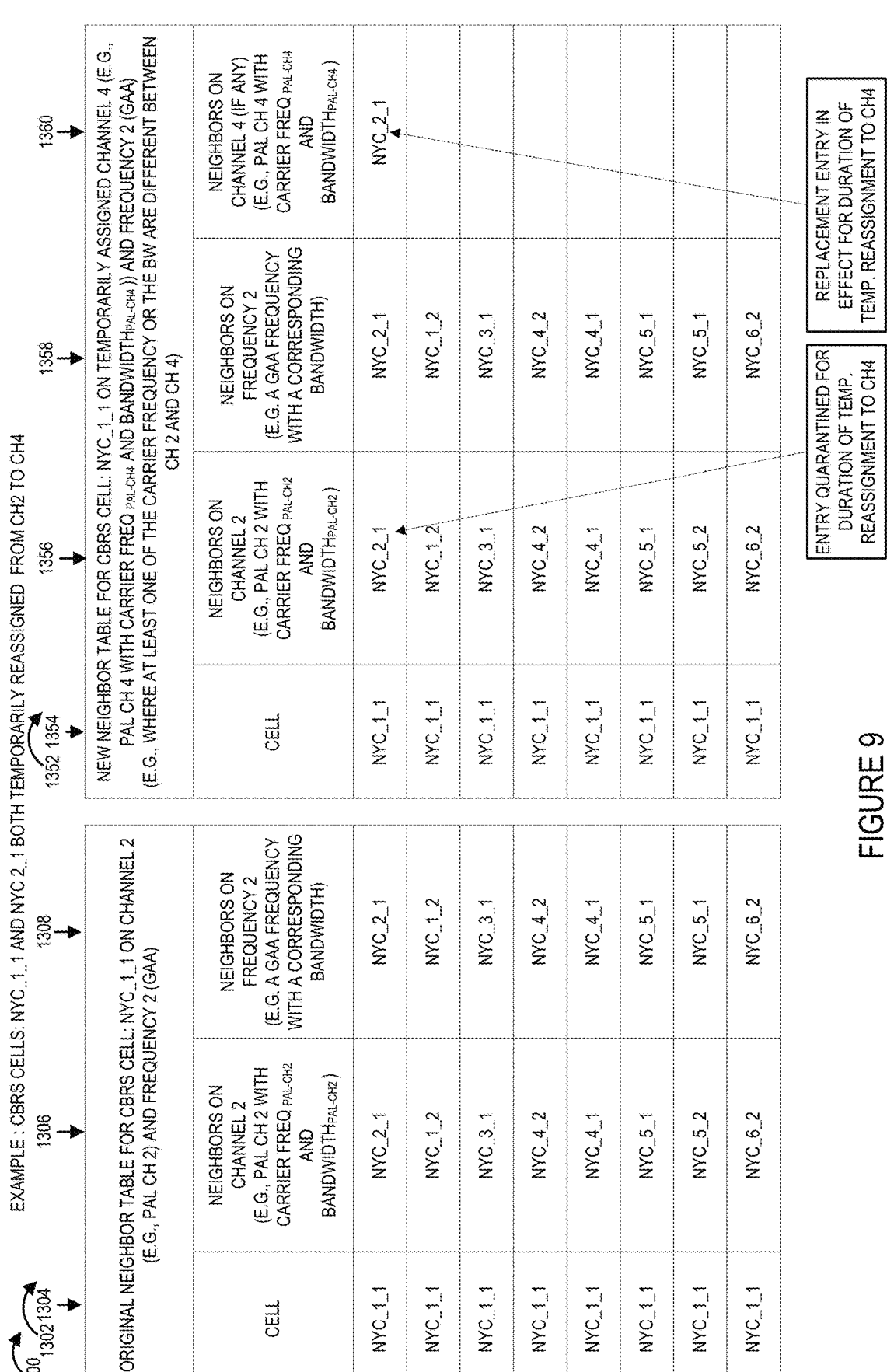
FIG. 9 is a drawing of an exemplary original neighbor table for CBRS cell: NYC_1_1 and an exemplary new neighbor table for CBRS cell: NYC_1_1, in accordance with an exemplary embodiment, for an example in which exemplary CBRS cell: NYC_1_1 and exemplary CBRS cell: NYC_2_1 are both temporarily reassigned from channel 2 to channel 4.
Figure 10:
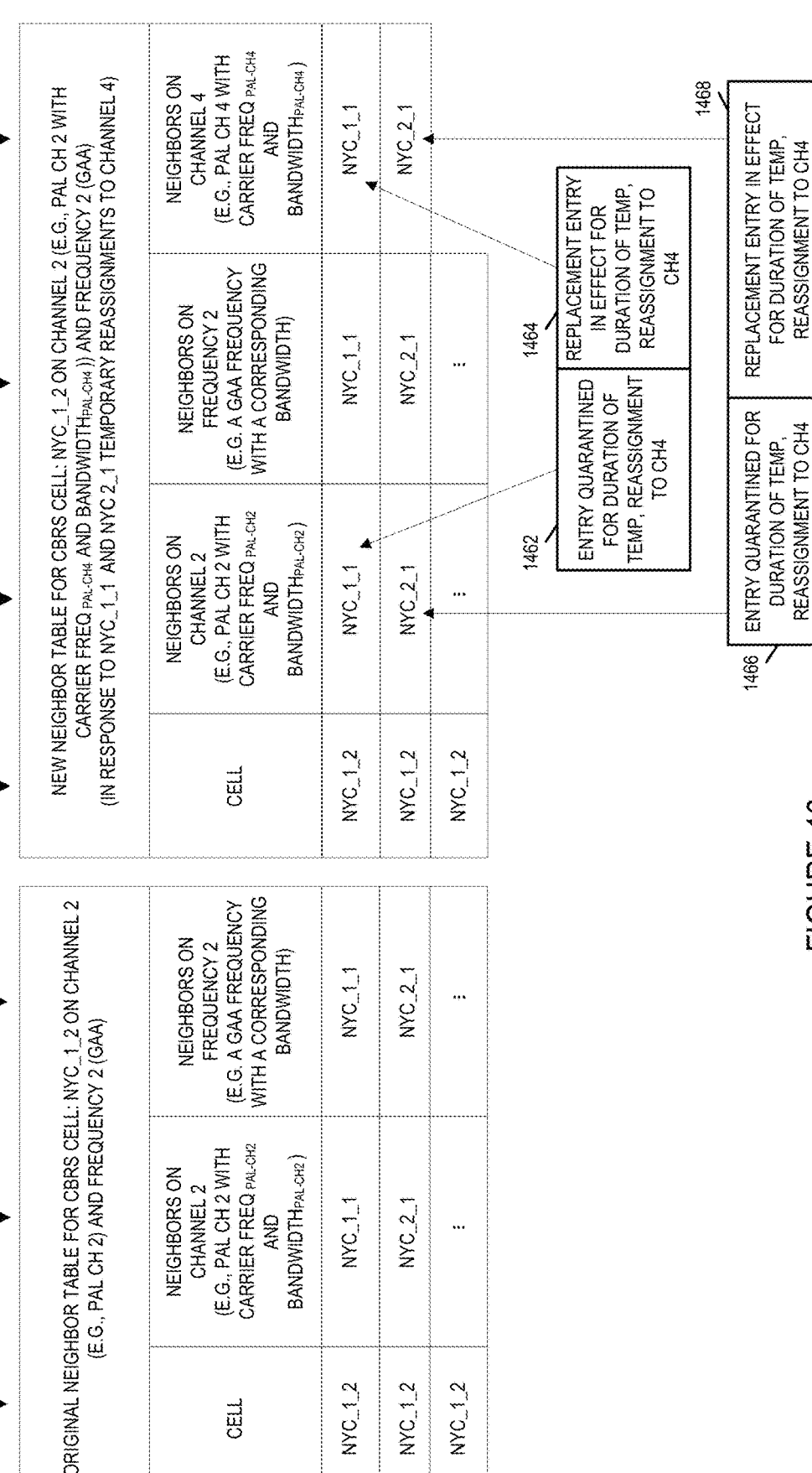
FIG. 10 is a drawing of an exemplary original neighbor table for CBRS cell: NYC_1_2 and an exemplary new neighbor table for CBRS cell: NYC_1_2, in accordance with an exemplary embodiment, for an example in which exemplary CBRS cell: NYC_1_1 and exemplary CBRS cell: NYC_2_1 are both temporarily reassigned from channel 2 to channel 4.
Figure 11:
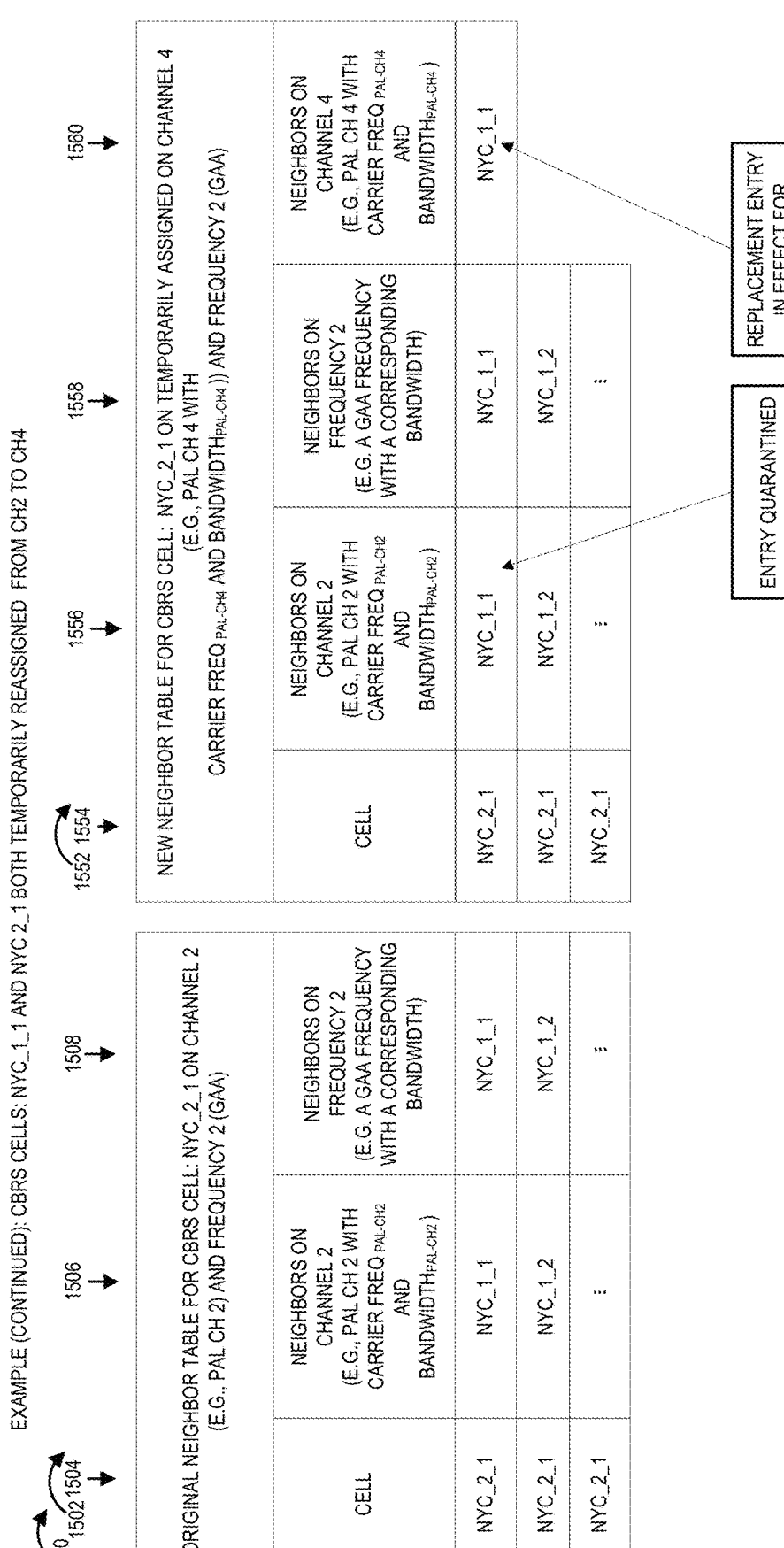
FIG. 11 is a drawing of an exemplary original neighbor table for CBRS cell: NYC_2_1 and an exemplary new neighbor table for CBRS cell: NYC_2_1, in accordance with an exemplary embodiment, for an example in which exemplary CBRS cell: NYC_1_1 and CBRS cell: NYC_2_1 are both temporarily reassigned from channel 2 to channel 4.

FIGS. 9-11 illustrate exemplary neighbor tables for an example in which the ABNG 402 detects a dissimilar channel assignment (CBRS cell: NYC_1_1 470 of base station 1 406 and CBRS cell: NYC_2_1 are both temporarily reassigned by the SAS 410 from its original channel, which is channel 2 (e.g., PAL channel) to channel 4 (e.g., PAL channel 4)) and, in response, the ABNG 402 generates supplementary neighbor table information used to generate new neighbor tables. The supplementary information or the new neighbor tables including the supplementary information are communicated to the base stations to be used by the cells of the base stations for subsequent handover decisions, while the temporary channel reassignment is in effect.

Drawing 1300 of FIG. 9 includes original neighbor table 1202 for CBRS cell: NYC_1_1 and a new neighbor table 1352 for CBRS cell: NYC_1_1. Original neighbor table 1302 for CBRS cell: NYC_1_1 on channel 2 (e.g., PAL channel 2) and frequency 2 (GAA) includes: a first column 1304 identifying the cell, which is cell: NYC_1_1, a second column 1306 identifying neighbors on channel 2 (e.g., PAL channel 2 with carrier frequency PAL-CH2 and bandwidth PAL-CH2), and a third column 1308 identifying neighbors on frequency 2 (e.g., a GAA frequency with a corresponding bandwidth). In this example cell NYC_1_1 has the following neighbors of channel 2: NYC 2_1, NYC_1_2, NYC_3_1, NYC_4_2, NYC_4_1, NYC_5_1, NYC_5_2, NYC_6_2, as indicated by column 1306. In this example cell NYC_1_1 has the following neighbors of frequency 2 (e.g., a GAA freq.): NYC 2_1, NYC 1_2, NYC_3_1, NYC_4_2, NYC_4_1, NYC_5_1, NYC_5_2, NYC_6_2, as indicated by column 1308.

New neighbor table 1352 for CBRS cell: NYC_1_1 on temporarily assigned channel 4 (e.g., PAL channel 4 with carrier frequency PAL-CH4 and bandwidth PAL-CH4) and frequency 2 (GAA) (e.g., where at least one of the carrier frequency or the bandwidth are different between CH 2 and CH4) includes: a first column 1354 identifying the cell, which is cell: NYC_1_1, a second column 1356 identifying neighbors on channel 2 (e.g., PAL channel 2 with carrier frequency PAL-CH2 and bandwidth PAL-CH2), a third column 1358 identifying neighbors on frequency 2 (e.g., a GAA frequency with a corresponding bandwidth), and a fourth column 1060 identifying neighbors on channel 4 (e.g., PAL channel 4 with carrier frequency PAL-CH4 and bandwidth PAL-CH4). In this example cell NYC_1_1 has the following neighbors of channel 2: NYC 2_1, NYC_1_2, NYC_3_1, NYC_4_2, NYC_4_1, NYC_5_1, NYC_5_2, NYC_6_2, as indicated by column 1306. In this example cell NYC_1_1 has the following neighbors of frequency 2 (e.g., a GAA freq.): NYC 2_1, NYC_1_2, NYC_3_1, NYC_4_2, NYC_4_1, NYC_5_1, NYC_5_2, NYC_6_2, as indicated by column 1358. In this example cell NYC_1_1 has the following neighbors of channel 4 (e.g., PAL channel 4 with carrier frequency PAL-CH4 and bandwidth PAL-CH4): NYC 2_1, as indicated by column 1360. Column 1356 neighbor entry: NYC_2_1 will be quarantined for the duration of the temporary reassignment to channel 4, as indicated by block 1362. Column 1360 new entry:

NYC_2_1, is a replacement entry that will be in effect for the duration of the temporary reassignment to channel 4, as indicated by block 1364.

Drawing 1400 of FIG. 10 includes original neighbor table 1402 for CBRS cell: NYC_1_2 and a new neighbor table 1452 for CBRS cell: NYC_1_2. Original neighbor table 1402 for CBRS cell: NYC_1_2 on channel 2 (e.g., PAL channel 2) and frequency 2 (GAA) includes: a first column 1404 identifying the cell, which is cell: NYC_1_2, a second column 1406 identifying neighbors on channel 2 (e.g., PAL channel 2 with carrier frequency PAL-CH2 and bandwidth PAL-CH2), and a third column 1408 identifying neighbors on frequency 2 (e.g., a GAA frequency with a corresponding bandwidth). In this example cell NYC_1_2 has the following neighbors of channel 2: NYC_1_1 and NYC_2_1 as indicated by column 1406. In this example cell NYC_1_2 has the following neighbors on frequency 2 (e.g., a GAA freq.): NYC_1_1, NYC_2_1, as indicated by column 1408.

New neighbor table 1452 for CBRS cell: NYC_1_2 on channel 2 (e.g., PAL channel 2 with carrier frequency PAL-CH2 and bandwidth PAL-CH2) and frequency 2 (GAA), generated in response to NYC_1_1 and NYC_2_1 being temporarily reassigned to channel 4, includes: a first column 1454 identifying the cell, which is cell: NYC_1_2, a second column 1456 identifying neighbors on channel 2 (e.g., PAL channel 2 with carrier frequency PAL-CH2 and bandwidth PAL-CH2), a third column 1458 identifying neighbors on frequency 2 (e.g., a GAA frequency with a corresponding bandwidth), and a fourth column 1460 identifying neighbors on channel 4 (e.g., PAL channel 4 with carrier frequency PAL-CH4 and bandwidth PAL-CH4). In this example cell NYC_1_2 has the following neighbors of channel 2: NYC_1_1, NYC_2_1, as indicated by column 1456. In this example cell NYC_1_2 has the following neighbors of frequency 2 (e.g., a GAA freq.): NYC 1_1, NYC 2_1, as indicated by column 1458. In this example, cell NYC_1_2 has the following neighbors of channel 4 (e.g., PAL channel 4 with carrier frequency PAL-CH4 and bandwidth PAL-CH4): NYC_1_1 and NYC_2_1, as indicated by column 1460.

Column 1456 neighbor entry: NYC_1_1 will be quarantined for the duration of the temporary reassignment to channel 4, as indicated by block 1462. Column 1460 new entry: NYC_1_1, is a replacement entry that will be in effect for the duration of the temporary reassignment to channel 4, as indicated by block 1464.

Column 1456 neighbor entry: NYC_2_1 will be quarantined for the duration of the temporary reassignment to channel 4, as indicated by block 1466. Column 1460 new entry: NYC_2_1, is a replacement entry that will be in effect for the duration of the temporary reassignment to channel 4, as indicated by block 1468.

Drawing 1500 of FIG. 11 includes original neighbor table 1502 for CBRS cell: NYC_2_1 and a new neighbor table 1552 for CBRS cell: NYC_2_1. Original neighbor table 1502 for CBRS cell: NYC_2_1 on channel 2 (e.g., PAL channel 2) and frequency 2 (GAA) includes: a first column 1504 identifying the cell, which is cell: NYC_2_1, a second column 1506 identifying neighbors on channel 2 (e.g., PAL channel 2 with carrier frequency PAL-CH2 and bandwidth PAL-CH2), and a third column 1508 identifying neighbors on frequency 2 (e.g., a GAA frequency with a corresponding bandwidth). In this example cell NYC_2_1 has the following neighbors of channel 2: NYC_1_1 and NYC_1_2 as indicated by column 1506. In this example cell NYC_2_1 has the following neighbors of frequency 2 (e.g., a GAA freq.): NYC_1_1, NYC_1_2, as indicated by column 1508.

New neighbor table 1552 for CBRS cell: NYC_2_1 on temporarily assigned channel 4 (e.g., PAL channel 4 with carrier frequency PAL-CH4 and bandwidth PAL-CH4) and frequency 2 (GAA), generated in response to NYC_1_1 and NYC_2_1 being temporarily reassigned to channel 4, includes: a first column 1554 identifying the cell, which is cell: NYC_2_1, a second column 1556 identifying neighbors on channel 2 (e.g., PAL channel 2 with carrier frequency PAL-CH2 and bandwidth PAL-CH2), a third column 1558 identifying neighbors on frequency 2 (e.g., a GAA frequency with a corresponding bandwidth), and a fourth column 1560 identifying neighbors on channel 4 (e.g., PAL channel 4 with carrier frequency PAL-CH4 and bandwidth PAL-CH4). In this example cell NYC_2_1 has the following neighbors of channel 2: NYC_1_1, NYC_1_2, as indicated by column 1556. In this example cell NYC_2_1 has the following neighbors of frequency 2 (e.g., a GAA freq.): NYC 1_1, NYC 1_2, as indicated by column 1558. In this example, cell NYC_2_1 has the following neighbors of channel 4 (e.g., PAL channel 4 with carrier frequency PAL-CH4 and bandwidth PAL-CH4): NYC_1_1, as indicated by column 1560.

Column 1556 neighbor entry: NYC_1_1 will be quarantined for the duration of the temporary reassignment to channel 4, as indicated by block 1562. Column 1560 new entry: NYC_1_1, is a replacement entry that will be in effect for the duration of the temporary reassignment to channel 4, as indicated by block 1564.

FIGS. 12-15 illustrate exemplary neighbor tables for an example in which the ABNG 402 detects a dissimilar channel assignment (CBRS cell: NYC_1_1 470) of base station 1 406 is temporarily reassigned by the SAS 410 from its original channel, which is channel 2 (e.g., PAL channel) to channel 4 (e.g., PAL channel 4)) and, in response, the ABNG 402 generates supplementary neighbor table information used to generate new neighbor tables. The supplementary information or the new neighbor tables including the supplementary information are communicated to the base stations to be used by the cells of the base stations for subsequent handover decisions, while the temporary channel reassignment is in effect.

Drawing 1600 of FIG. 12 includes original neighbor table 1602 for CBRS cell: NYC_1_1 on channel 2 (e.g., PAL channel 2) and frequency 2 (GAA). Original neighbor table 1602 for CBRS cell: NYC_1_1 on channel 2 (e.g., PAL channel 2) and frequency 2 (GAA) includes: a first column 1604 identifying the cell, which is cell: NYC_1_1, a second column 1606 identifying neighbors on channel 2 (e.g., PAL channel 2 with carrier frequency PAL-CH2 and bandwidth PAL-CH2), and a third column 1608 identifying neighbors on frequency 2 (e.g., a GAA frequency with a corresponding bandwidth). In this example cell NYC_1_1 has the following neighbors of channel 2: NYC 2_1, NYC 1_2, NYC_3_1, NYC_4_2, NYC_4_1, NYC_5_1, NYC_5_2, NYC_6_2, as indicated by column 1606. In this example cell NYC_1_1 has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1608.

Drawing 1652 of FIG. 13 includes new neighbor table 1602 for CBRS cell: NYC_1_1 on channel 4 (e.g., PAL channel 4) and frequency 2 (GAA). New neighbor table 1652 for CBRS cell: NYC_1_1 on temporarily assigned channel 4 (e.g., PAL channel 4 with carrier frequency PAL-CH4 and bandwidth PAL-CH4) and frequency 2 (GAA) (e.g., where at least one of the carrier frequency or the bandwidth are different between CH 2 and CH4)

includes: a first column 1654 identifying the cell, which is cell: NYC_1_1 or cell NYC_1_3(1), where NYC_1_3(1) is a third logical sector for BS 1 406 which replaces NYC_1_1, a second column 1656 identifying neighbors on channel 2 (e.g., PAL channel 2 with carrier frequency PAL-CH2 and bandwidth PAL-CH2), and a third column 1658 identifying neighbors on frequency 2 (e.g., a GAA frequency with a corresponding bandwidth), and a fourth column 1660 identifying neighbors on channel 4 (e.g., PAL channel 4 with carrier frequency PAL-CH4 and bandwidth PAL-CH4).

In this example cell NYC_1_1 has the following neighbors of channel 2: NYC_2_1, NYC_1_2, NYC_3_1, NYC4_2, NYC_4_1, NYC_5_1, NYC_5_2, NYC_6_2, as indicated by column 1656. In this example cell NYC_1_1 has the following neighbors of frequency 2 (e.g., a GAA freq.): NYC_2_1, NYC_1_2, NYC_3_1, NYC4_2, NYC_4_1, NYC_5_1, NYC_5_2, NYC_6_2, as indicated by column 1658. No neighbors of cell NYC_1_1 are shown on channel 4, as indicated by blank column 1660.

In this example cell NYC_1_3(1) has the following neighbors of channel 2: NYC_2_1, NYC_1_2, NYC_3_1, NYC4_2, NYC_4_1, NYC_5_1, NYC_5_2, NYC_6_2, as indicated by column 1656. In this example cell NYC_1_3(1) has the following neighbors of frequency 2 (e.g., a GAA freq.): NYC_2_1, NYC_1_2, NYC_3_1, NYC4_2, NYC_4_1, NYC_5_1, NYC_5_2, NYC_6_2, as indicated by column 1658. No neighbors of cell NYC_1_3(1) are shown on channel 4, as indicated by blank column 1660.

First dashed block 1661 of information including a copy of the original neighbor list is quarantined for the duration of the temporary reassignment to channel 4, as indicated by block 1662. Second dashed block 1663 of information includes replacement information which is in effect for the duration of the temporary reassignment to channel 4, as indicated by block 1664.

Drawing 1700 of FIG. 7 includes original neighbor table 1702 for CBRS cell: NYC_1_2 and a new neighbor table 1752 for CBRS cell: NYC_1_2. Original neighbor table 1702 for CBRS cell: NYC_1_2 on channel 2 (e.g., PAL channel 2) and frequency 2 (GAA) includes: a first column 1704 identifying the cell, which is cell: NYC_1_2, a second column 1706 identifying neighbors on channel 2 (e.g., PAL channel 2 with carrier frequency PAL-CH2 and bandwidth PAL-CH2), and a third column 1708 identifying neighbors on frequency 2 (e.g., a GAA frequency with a corresponding bandwidth). In this example cell NYC_1_2 has the following neighbors of channel 2: NYC_1_1 and NYC_2_1 as indicated by column 1706. In this example cell NYC_1_2 has the following neighbors of frequency 2 (e.g., a GAA freq.): NYC_1_1, NYC_2_1, as indicated by column 1708.

New neighbor table 1152 for CBRS cell: NYC_1_2 on channel 2 (e.g., PAL channel 2 with carrier frequency PAL-CH2 and bandwidth PAL-CH2) and frequency 2 (GAA), generated in response to NYC_1_1 being temporarily reassigned to channel 4, includes: a first column 1754 identifying the cell, which is cell: NYC_1_2, a second column 1756 identifying neighbors on channel 2 (e.g., PAL channel 2 with carrier frequency PAL-CH2 and bandwidth PAL-CH2), a third column 1758 identifying neighbors on frequency 2 (e.g., a GAA frequency with a corresponding bandwidth), and a fourth column 1760 identifying neighbors on channel 4 (e.g., PAL channel 4 with carrier frequency PAL-CH4 and bandwidth PAL-CH4). In this example cell NYC_1_2 has the following neighbors of channel 2: NYC_1_1, NYC_2_1, as indicated by column 1756. In this example cell NYC_1_2 has the following neighbors of frequency 2 (e.g., a GAA freq.): NYC 1_1, NYC 2_1, as indicated by column 1758. In this example, cell NYC_1_1 has the following neighbors of channel 4 (e.g., PAL channel 4 with carrier frequency PAL-CH4 and bandwidth PAL-CH4): NYC_1_3(1), as indicated by column 1760.

Column 1756 neighbor entry: NYC_1_1 will be quarantined for the duration of the temporary reassignment to channel 4, as indicated by block 1762. Column 1760 new entry: NYC_1_3(1), is a replacement entry that will be in effect for the duration of the temporary reassignment to channel 4, as indicated by block 1764.

Figure 15:
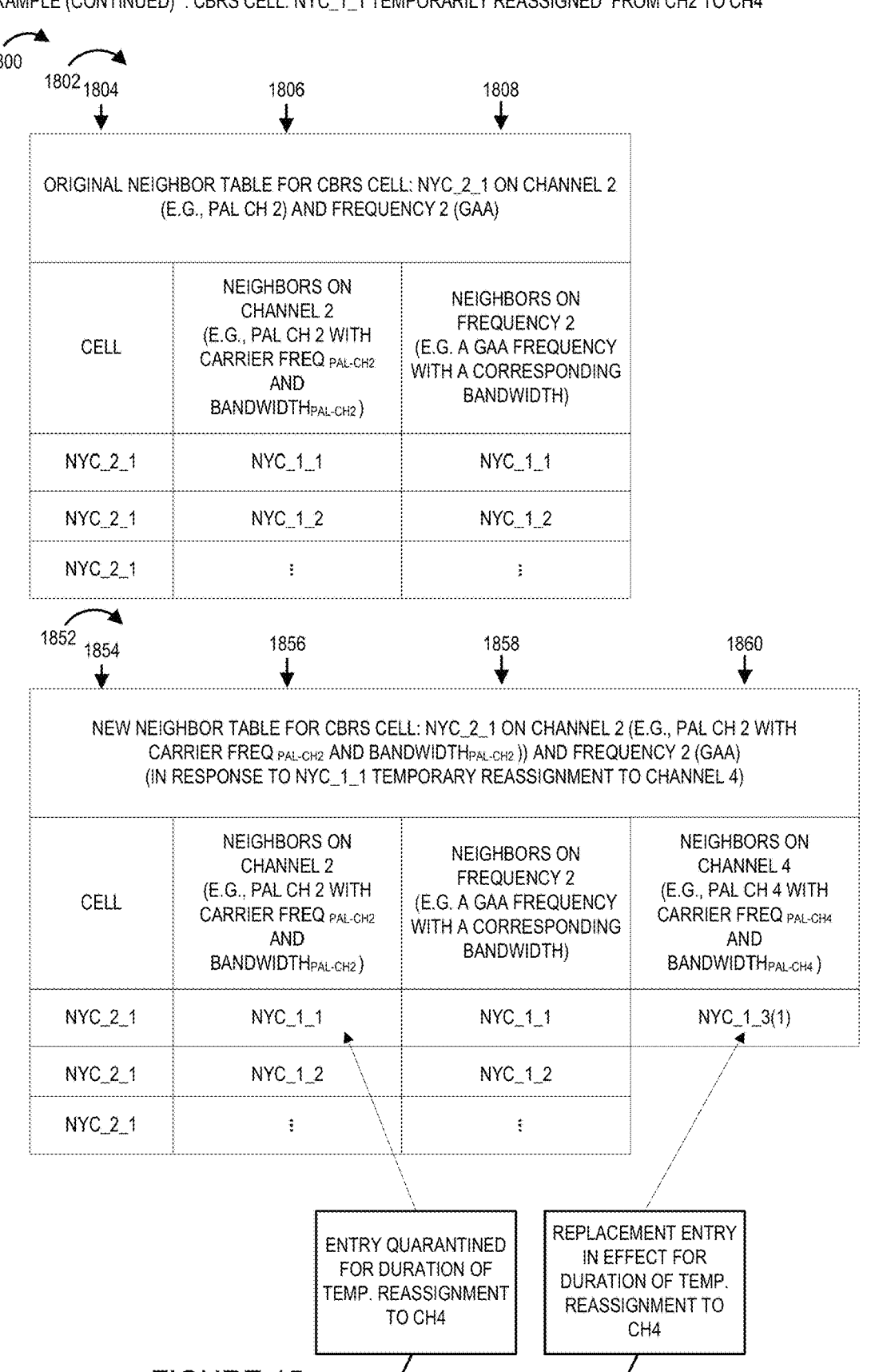
FIG. 15 is a drawing of an exemplary original neighbor table for CBRS cell: NYC_2_1 and an exemplary new neighbor table for CBRS cell: NYC_2_1, in accordance with an exemplary embodiment, for an example in which an exemplary CBRS cell: NYC_1_1 is temporarily reassigned from channel 2 to channel 4.

Drawing 1800 of FIG. 15 includes original neighbor table 1502 for CBRS cell: NYC_2_1 and a new neighbor table 1852 for CBRS cell: NYC_2_1. Original neighbor table 1802 for CBRS cell: NYC_2_1 on channel 2 (e.g., PAL channel 2) and frequency 2 (GAA) includes: a first column 1804 identifying the cell, which is cell: NYC_2_1, a second column 1806 identifying neighbors on channel 2 (e.g., PAL channel 2 with carrier frequency PAL-CH2 and bandwidth PAL-CH2), and a third column 1808 identifying neighbors on frequency 2 (e.g., a GAA frequency with a corresponding bandwidth). In this example cell NYC_2_1 has the following neighbors of channel 2: NYC_1_1 and NYC_1_2 as indicated by column 1806. In this example cell NYC_2_1 has the following neighbors of frequency 2 (e.g., a GAA freq.): NYC_1_1, NYC_1_2, as indicated by column 1808.

New neighbor table 1852 for CBRS cell: NYC_2_1 on channel 2 (e.g., PAL channel 2 with carrier frequency PAL-CH2 and bandwidth PAL-CH2) and frequency 2 (GAA), generated in response to NYC_1_1 being temporarily reassigned to channel 4, includes: a first column 1854 identifying the cell, which is cell: NYC_2_1, a second column 1856 identifying neighbors on channel 2 (e.g., PAL channel 2 with carrier frequency PAL-CH2 and bandwidth PAL-CH2), a third column 1858 identifying neighbors on frequency 2 (e.g., a GAA frequency with a corresponding bandwidth), and a fourth column 1860 identifying neighbors on channel 4 (e.g., PAL channel 4 with carrier frequency PAL-CH4 and bandwidth PAL-CH4). In this example cell NYC_2_1 has the following neighbors of channel 2: NYC_1_1, NYC_1_2, as indicated by column 1856. In this example cell NYC_2_1 has the following neighbors of frequency 2 (e.g., a GAA freq.): NYC 1_1, NYC 1_2, as indicated by column 1858. In this example, cell NYC_2_1 has the following neighbors of channel 4 (e.g., PAL channel 4 with carrier frequency PAL-CH4 and bandwidth PAL-CH4): NYC_1_3(1), as indicated by column 1860.

Column 1856 neighbor entry: NYC_1_1 will be quarantined for the duration of the temporary reassignment to channel 4, as indicated by block 1862. Column 1860 new entry: NYC_1_3(1), is a replacement entry that will be in effect for the duration of the temporary reassignment to channel 4, as indicated by block 1864.

FIGS. 16-19 illustrate exemplary neighbor tables for an example in which the ABNG 402 detects a dissimilar channel assignment (CBRS cell: NYC_1_1 470) of base station 1 406 and CBRS cell: NYC_2_1 of base station 2 4061 are temporarily reassigned by the SAS 410 from their original channel, which is channel 2 (e.g., PAL channel) to channel 4 (e.g., PAL channel 4)) and, in response, the ABNG 402 generates supplementary neighbor table information used to generate new neighbor tables. The supplementary information or the new neighbor tables including the supplementary information are communicated to the base stations to be used by the cells of the base stations for subsequent handover decisions, while the temporary channel reassignment is in effect.

Drawing 1902 of FIG. 19 includes original neighbor table 902 for CBRS cell: NYC_1_1 on channel 2 (e.g., PAL channel 2) and frequency 2 (GAA). Original neighbor table 1902 for CBRS cell: NYC_1_1 on channel 2 (e.g., PAL channel 2) and frequency 2 (GAA) includes: a first column 1904 identifying the cell, which is cell: NYC_1_1, a second column 1906 identifying neighbors on channel 2 (e.g., PAL channel 2 with carrier frequency PAL-CH2 and bandwidth PAL-CH2), and a third column 1908 identifying neighbors on frequency 2 (e.g., a GAA frequency with a corresponding bandwidth). In this example cell NYC_1_1 has the following neighbors of channel 2: NYC 2_1, NYC 1_2, NYC_3_1, NYC_4_2, NYC_4_1, NYC_5_1, NYC_5_2, NYC_6_2, as indicated by column 1906. In this example cell NYC_1_1 has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1908.

FIG. 17 includes new neighbor table 1952 for CBRS cell: NYC_1_1 on channel 4 (e.g., PAL channel 4) and frequency 2 (GAA). New neighbor table 1952 for CBRS cell: NYC_1_1 on temporarily assigned channel 4 (e.g., PAL channel 4 with carrier frequency PAL-CH4 and bandwidth PAL-CH4) and frequency 2 (GAA) (e.g., where at least one of the carrier frequency or the bandwidth are different between CH 2 and CH4) includes: a first column 1954 identifying the cell, which is cell: NYC_1_1 or cell NYC_1_3(1), where NYC_1_3(1) is a third logical sector for BS 1 406 which replaces NYC_1_1, a second column 1956 identifying neighbors on channel 2 (e.g., PAL channel 2 with carrier frequency PAL-CH2 and bandwidth PAL-CH2), and a third column 1958 identifying neighbors on frequency 2 (e.g., a GAA frequency with a corresponding bandwidth), and a fourth column 1960 identifying neighbors on channel 4 (e.g., PAL channel 4 with carrier frequency PAL-CH4 and bandwidth PAL-CH4).

In this example cell NYC_1_1 has the following neighbors of channel 2: NYC 2_1, NYC 1_2, NYC_3_1, NYC4_2, NYC_4_1, NYC_5_1, NYC_5_2, NYC_6_2, as indicated by column 1956. In this example cell NYC_1_1 has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1958. No neighbors of cell NYC_1_1 are shown on channel 4, as indicated by column 1960.

In this example cell NYC_1_3(1) has the following neighbors of channel 2: NYC 1_2, NYC_3_1, NYC4_2, NYC_4_1, NYC_5_1, NYC_5_2, NYC_6_2, as indicated by column 1956. In this example cell NYC_1_3(1) has the following neighbors of frequency 2 (e.g., a GAA freq.): NYC 2_1, NYC 1_2, NYC_3_1, NYC4_2, NYC_4_1, NYC_5_1, NYC_5_2, NYC_6_2, as indicated by column 1958. In this example cell NYC_1_3(1) has the following neighbors on channel 4 (e.g., PAL channel 4 with carrier frequency PAL-CH4 and bandwidth PAL-CH4): NYC_2_3 (1), as indicated by column 1960.

First dashed block 1961 of information including a copy of the original neighbor list is quarantined for the duration of the temporary reassignment to channel 4, as indicated by block 1962. Second dashed block 1963 of information includes replacement information which is in effect for the duration of the temporary reassignment to channel 4, as indicated by block 1964.

Figure 18:
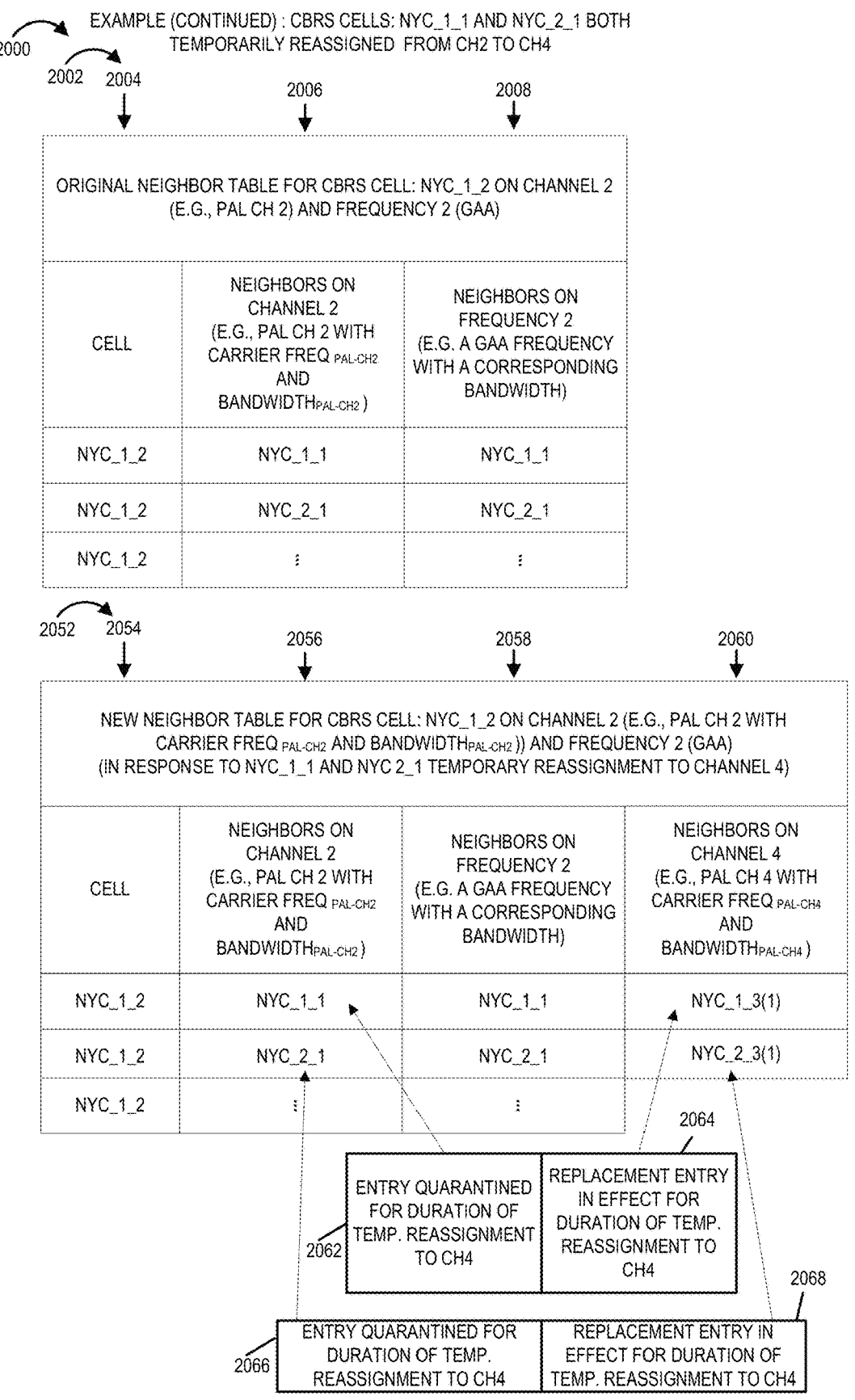
FIG. 18 is a drawing of an exemplary original neighbor table for CBRS cell: NYC_1_2 and an exemplary new neighbor table for CBRS cell: NYC_1_2, in accordance with an exemplary embodiment, for an example in which exemplary CBRS cell: NYC_1_1 and exemplary CBRS cell_2_1 are both temporarily reassigned from channel 2 to channel 4.

Drawing 2000 of FIG. 18 includes original neighbor table 2002 for CBRS cell: NYC_1_2 and a new neighbor table 2052 for CBRS cell: NYC_1_2. Original neighbor table 2002 for CBRS cell: NYC_1_2 on channel 2 (e.g., PAL channel 2) and frequency 2 (GAA) includes: a first column 2004 identifying the cell, which is cell: NYC_1_2, a second column 2006 identifying neighbors on channel 2 (e.g., PAL channel 2 with carrier frequency PAL-CH2 and bandwidth PAL-CH2), and a third column 2008 identifying neighbors on frequency 2 (e.g., a GAA frequency with a corresponding bandwidth). In this example cell NYC_1_2 has the following neighbors of channel 2: NYC_1_1 and NYC_2_1 as indicated by column 2006. In this example cell NYC_1_2 has the following neighbors of frequency 2 (e.g., a GAA freq.): NYC_1_1, NYC_2_1, as indicated by column 2008.

New neighbor table 2052 for CBRS cell: NYC_1_2 on channel 2 (e.g., PAL channel 2 with carrier frequency PAL-CH2 and bandwidth PAL-CH2) and frequency 2 (GAA), generated in response to NYC_1_1 and NYC_2_1 both being temporarily reassigned to channel 4, includes: a first column 2054 identifying the cell, which is cell: NYC_1_2, a second column 2056 identifying neighbors on channel 2 (e.g., PAL channel 2 with carrier frequency PAL-CH2 and bandwidth PAL-CH2), a third column 2058 identifying neighbors on frequency 2 (e.g., a GAA frequency with a corresponding bandwidth), and a fourth column 2060 identifying neighbors on channel 4 (e.g., PAL channel 4 with carrier frequency PAL-CH4 and bandwidth PAL-CH4). In this example cell NYC_1_2 has the following neighbors on channel 2: NYC_1_1. NYC_2_1, as indicated by column 2056. In this example cell NYC_1_2 has the following neighbors of frequency 2 (e.g., a GAA freq.): NYC 1_1, NYC 2_1, as indicated by column 2058. In this example, cell NYC_1_2 has the following neighbors on channel 4 (e.g., PAL channel 4 with carrier frequency PAL-CH4 and bandwidth PAL-CH4): NYC_1_3(1) and NYC_2_3(1), as indicated by column 2060.

Column 2056 neighbor entry: NYC_1_1 will be quarantined for the duration of the temporary reassignment to channel 4, as indicated by block 2062. Column 2060 new entry: NYC_1_3(1), is a replacement entry that will be in effect for the duration of the temporary reassignment to channel 4, as indicated by block 2064.

Column 2056 neighbor entry: NYC_2_1 will be quarantined for the duration of the temporary reassignment to channel 4, as indicated by block 2066. Column 2060 new entry: NYC_2_3(1), is a replacement entry that will be in effect for the duration of the temporary reassignment to channel 4, as indicated by block 2068.

Drawing 2100 of FIG. 19 includes original neighbor table 2102 for CBRS cell: NYC_2_1 and a new neighbor table 2152 for CBRS cell: NYC_2_1. Original neighbor table 2102 for CBRS cell: NYC_2_1 on channel 2 (e.g., PAL channel 2) and frequency 2 (GAA) includes: a first column 2104 identifying the cell, which is cell: NYC_2_1, a second column 2106 identifying neighbors on channel 2 (e.g., PAL channel 2 with carrier frequency PAL-CH2 and bandwidth PAL-CH2), and a third column 2108 identifying neighbors on frequency 2 (e.g., a GAA frequency with a corresponding bandwidth). In this example cell NYC_2_1 has the following neighbors of channel 2: NYC_1_1 and NYC_1_2 as indicated by column 2106. In this example cell NYC_2_1 has the following neighbors of frequency 2 (e.g., a GAA freq.): NYC_1_1, NYC_1_2, as indicated by column 2108.

New neighbor table 2152 for CBRS cell: NYC_2_1 on channel 4 (e.g., PAL channel 4 with carrier frequency PAL-CH4 and bandwidth PAL-CH4) and frequency 2 (GAA), generated in response to NYC_1_1 and NYC_2_1 being temporarily reassigned to channel 4, includes: a first column 2154 identifying the cell, which is cell: NYC_2_1 or cell: NYC_2_3(1), a second column 2156 identifying neighbors on channel 2 (e.g., PAL channel 2 with carrier frequency PAL-CH2 and bandwidth PAL-CH2), a third column 2158 identifying neighbors on frequency 2 (e.g., a GAA frequency with a corresponding bandwidth), and a fourth column 2160 identifying neighbors on channel 4 (e.g., PAL channel 4 with carrier frequency PAL-CH4 and bandwidth PAL-CH4). In this example cell NYC_2_1 has the following neighbors of channel 2: NYC_1_1, NYC_1_2, as indicated by column 2156. In this example cell NYC_2_3(1) has the following neighbors of channel 2: NYC_1_2, as indicated by column 2156. In this example cell NYC_2_1 has the following neighbors of frequency 2 (e.g., a GAA freq.): NYC_1_1, NYC_1_2, as indicated by column 2158. In this example cell NYC_2_3(1) has the following neighbors of frequency 2 (e.g., a GAA freq.): NYC_1_1, NYC_1_2, as indicated by column 2158. In this example, cell NYC_2_1 does not have any neighbors on channel 4 (e.g., PAL channel 4 with carrier frequency PAL-CH4 and bandwidth PAL-CH4), as indicated by column 2160. In this example, cell NYC_2_3(1) has the following neighbors on channel 4 (e.g., PAL channel 4 with carrier frequency PAL-CH4 and bandwidth PAL-CH4): NYC_1_3(1), as indicated by column 2160.

First dashed block 2161 of information including a copy of the original neighbor list is quarantined for the duration of the temporary reassignment to channel 4, as indicated by block 2162. Second dashed block 2163 of information includes replacement information which is in effect for the duration of the temporary reassignment to channel 4, as indicated by block 2164.

Figure 20:
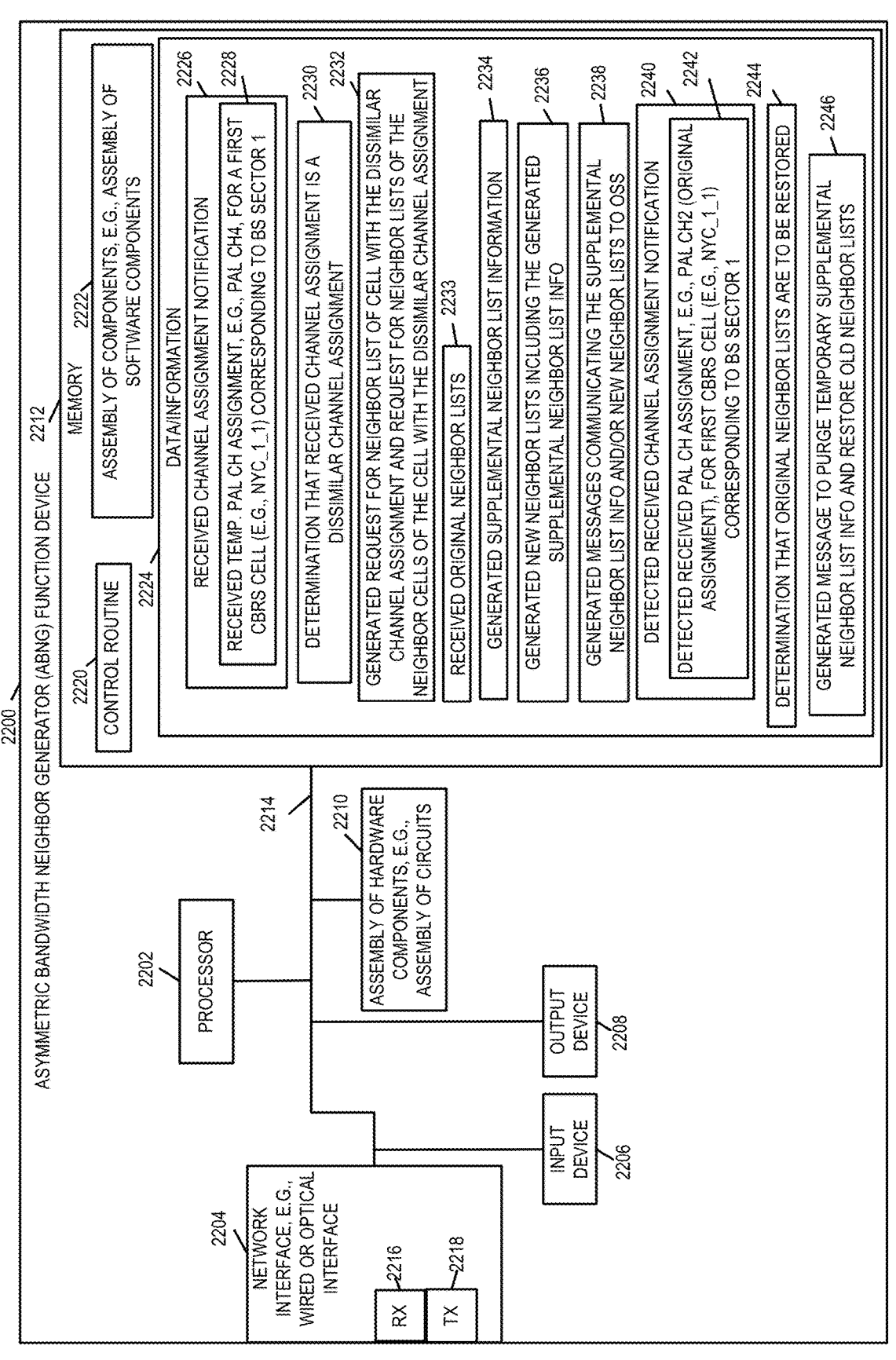
FIG. 20 is a drawing of an exemplary asymmetric bandwidth neighbor generator (ABNG) function device 2200 in accordance with an exemplary embodiment.

FIG. 20 is a drawing of an exemplary asymmetric bandwidth neighbor generator (ABNG) function device 2200 in accordance with an exemplary embodiment. AGNG device 2220 is, e.g., ABNG 402 of FIG. 4 and FIG. 5. ABNG 402 includes a processor 2202, e.g., a CPU, a network interface 2204, e.g., a wired or optical interface, an input device 2206, e.g., a keyboard, an output device 2208, e.g., a display, an assembly of hardware components 2210, e.g., an assembly of circuits, and memory 2212 coupled together via bus 2214 over which the various elements may interchange data and information. Network interface 2204 includes a receiver 2216 and a transmitter 2218. Network interface couples the ABNG 2200 to other devices, e.g., a domain proxy 412, and an OSS 404.

Memory 2212 includes a control routine 2220, an assembly of components 2222, and data/information 2224. Control routine 2220 includes instructions, which when executed by a processor, e.g., processor 2202 control various basic functions of the ABNG 2200, e.g., control an I/O device, operate the network interface 2204, control memory access, etc. Assembly of components 2222, e.g., an assembly of software components, includes, e.g., routines, subroutines, applications, etc. including instructions which when executed by a processor, e.g., processor 2202 cause the ABNG 2200 to implement steps of a method, e.g., steps of the method of FIG. 5 performed by ABNG 402.

Data/information 2224 includes a received channel assignment notification 2226 including a received temporary PAL channel assignment 2228, e.g., PAL channel 4 assignment, for a first CRBS cell, e.g., cell NYC_1_1, e.g., corresponding to a base station 1 sector 1. Data/information 2224 further includes a determination 2230 that the received channel assignment is a dissimilar channel assignment, said dissimilar channel assignment being different from an original channel assignment to the cell in at least one of carrier frequency and bandwidth. Data/information 2224 further includes a generated request for the neighbor list of the cell to which the dissimilar channel assignment is directed and a request for the neighbor lists of each of the neighbor cells of the cell with the dissimilar channel assignment 2232, received original neighbor lists 2233, generated supplemental neighbor list information 2234, generated new neighbor lists including the generated supplemental neighbor list information 2236, generated messages 2238 communicating the supplemental neighbor list information and/or the generated new neighbors lists to an OSS, a detected received channel notification 2240 including a detected received PAL channel assignment to the original PAL channel for the cell 2242, e.g., an assignment to PAL channel 2, which was the originally assigned PAL channel being used for first CBRS cell (e.g., cell NYC_1_1) corresponding to BS 1 sector 1, a determination 2242 that the original neighbor lists are to be restored, and a generated message 2246 to purge the temporary supplemental neighbor list information and restore the old neighbor lists.

Figure 21:
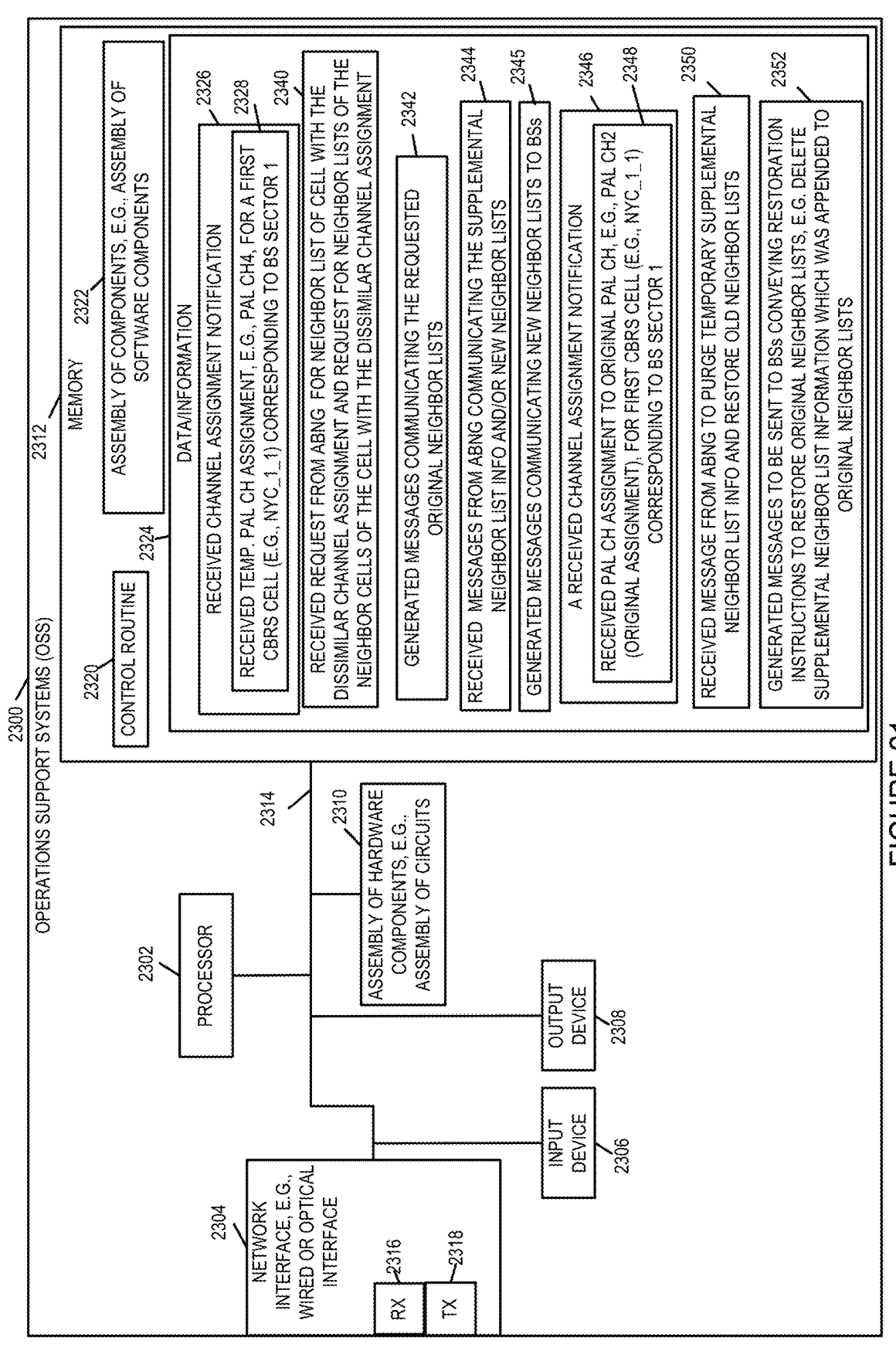
FIG. 21 is a drawing of an exemplary operations support systems (OSS) in accordance with an exemplary embodiment.

FIG. 21 is a drawing of an exemplary operations support systems (OSS) 2300 in accordance with an exemplary embodiment. OSS 2300 is, e.g., OSS 404 of FIG. 4 and FIG. 5. OSS 404 includes a processor 2302, e.g., a CPU, a network interface 2304, e.g., a wired or optical interface, an input device 2306, e.g., a keyboard, an output device 2308, e.g., a display; an assembly of hardware components 2310, e.g., an assembly of circuits, and memory 2312 coupled together via bus 2314 over which the various elements may interchange data and information. Network interface 2304 includes a receiver 2316 and a transmitter 2318. Network interface couples the OSS 2300 to other devices, e.g., a domain proxy 412, an ABNG 402, and base stations BS1 406, BS2 4061, BS3 4062 and BSN 408.

Memory 2212 includes a control routine 2320, an assembly of components 2322, and data/information 2324. Control routine 2320) includes instructions, which when executed by a processor, e.g., processor 2302 control various basic functions of the OSS 2300, e.g., control I/O devices, operate the network interface 2304, control memory access, etc. Assembly of components 2322, e.g., an assembly of software components, includes, e.g., routines, subroutines, applications, etc. including instructions which when executed by a processor, e.g., processor 2302 cause the OSS 2300 to implement steps of a method, e.g., steps of the method of FIG. 5 performed by OSS 404.

Data/information 2324 includes a received channel assignment notification 2326 (from a SAS via a domain proxy) including a received temporary PAL channel assignment 2328, e.g., PAL channel 4 assignment, for a first CRBS cell, e.g., cell NYC_1_1, e.g., corresponding to a base station 1 sector 1. Data/information 2324 further includes a received request from ABNG for the neighbor list of the cell to which the dissimilar channel assignment is directed and a request for the neighbor lists of each of the neighbor cells of the cell with the dissimilar channel assignment 2340, generated messages 2342 communicating the requested original neighbor lists, received messages 2344 from ABNG communicating the supplemental neighbor list information and/or the generated new neighbors lists to an OSS, generated messages 2345 communicating the new neighbor lists to base stations, a received channel notification 2346 including a received PAL channel assignment 2348 to the original PAL channel for the cell, e.g., an assignment to PAL channel 2, which was the originally assigned PAL channel being used for first CBRS cell (e.g., cell NYC_1_1) corresponding to BS 1 sector 1, a received message 2350 from ABNG to purge the temporary supplemental neighbor list information and restore the old neighbor lists, and generated messages

2352 to be sent to BSs conveying restoration instructions to restore original neighbor lists, e.g. delete supplemental neighbor list information (e.g., neighbor columns for PAL channel 4 and/or virtual cell information) which was appended to the original neighbor lists.

Figure 22:
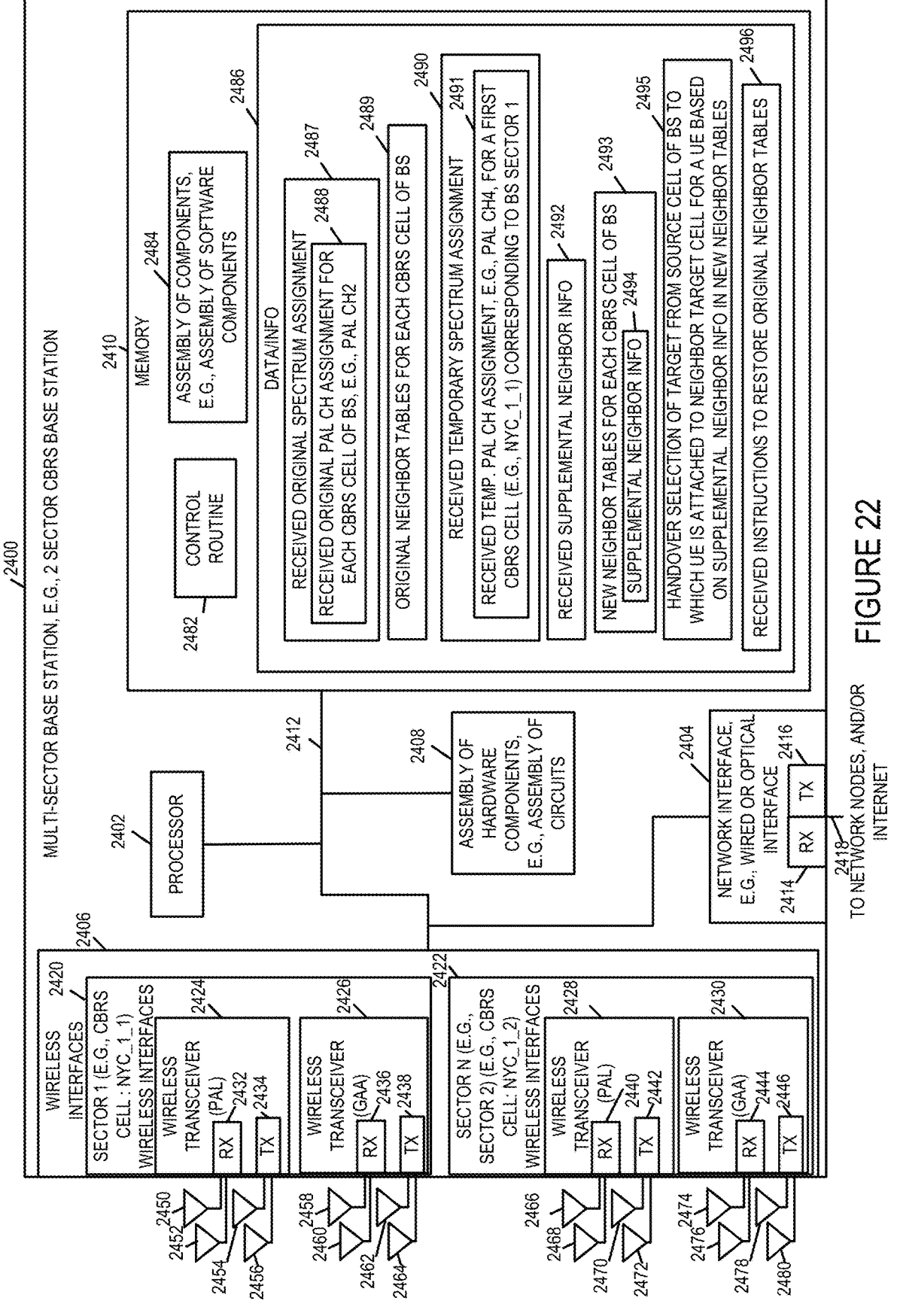
FIG. 22 is a drawing of an exemplary multi-sector base station, e.g., a two sector CBRS base station, in accordance with an exemplary embodiment.

FIG. 22 is a drawing of an exemplary multi-sector base station 2400, e.g., a two sector CBRS base station, in accordance with an exemplary embodiment. Base station 2400 is, e.g., any of the base stations (BS 1 406, BS 2 4061, BS 3 4062 . . . . BS N 408) of FIG. 4 and/or FIG. 5. Base station 2400 includes a processor 2402, e.g., a CPU, a network interface 2404, wireless interfaces 2406, an assembly of hardware components 2408, e.g., an assembly of circuits, and memory 2410 coupled together via bus 2412 over which the various elements may interchange data and information.

Network interface 2404, e.g., a wired or optical interface, includes a receiver 2414, a transmitter 2416 and interface connector 2418. The network interface 2404 couples the base station 2400 to other network nodes, devices, systems, and/or networks, e.g., an OSS 404, other base stations, and/or the Internet.

Wireless interfaces 2406 includes wireless interface(s) for each sector of the base station (sector 1 (e.g., CBRS cell: NYC_1_1) wireless interfaces 2420, . . . , sector N (e.g., sector 2) (e.g., CBRS cell: NYC_1_2) wireless interfaces 2422). Sector 1 wireless interfaces 2406, e.g., also referred to as CBRS cell: NYC_1_2 wireless interfaces, includes a wireless transceiver for PAL 2424 and a wireless transceiver for GAA 2426. Wireless transceiver (for PAL) 2424 includes a wireless receiver 2432 coupled to one or more receive antennas or antenna elements (2450, 2452) and a wireless transmitter 2434 coupled to one or more transmit antennas or antenna elements (2454, . . . 2456). Wireless transceiver (for GAA) 2426 includes a wireless receiver 2436 coupled to one or more receive antennas or antenna elements (2458, . . . , 2460) and a wireless transmitter 2438 coupled to one or more transmit antennas or antenna elements (2462, . . . , 2464).

Sector N (e.g., sector 2) wireless interfaces 2422, e.g., also referred to as CBRS cell: NYC_1_2 wireless interfaces, includes a wireless transceiver for PAL 2428 and a wireless transceiver for GAA 2430. Wireless transceiver (for PAL) 2428 includes a wireless receiver 2440 coupled to one or more receive antennas or antenna elements (2466, . . . , 2468) and a wireless transmitter 2442 coupled to one or more transmit antennas or antenna elements (2470, . . . , 2472). Wireless transceiver (for GAA) 2430 includes a wireless receiver 2444 coupled to one or more receive antennas or antenna elements (2474, . . . , 2476) and a wireless transmitter 2446 coupled to one or more transmit antennas or antenna elements (2478, . . . , 2480).

Each CBRS cell of BS 2400 communicates with UEs via its wireless interfaces. Handover decisions are made by each CBRS cell of the base station, e.g., cell NYC_1_1, based on neighbor tables corresponding to the cell, e.g., original neighbor tables or new neighbor tables based on supplemental neighbor information, e.g., said supplemental neighbor information sourced from an ABNG function, in response to a detected dissimilar channel assignment, e.g., a change from PAL channel 2 to PAL channel 4.

Memory 2410 includes a control routine 2482, an assembly of components 2484, e.g., an assembly of components, and data/information 2486. Control routine 2482 includes instructions, which when executed by a processor, e.g., processor 2402 control various basic functions of the base station 2400, e.g., control I/O devices, operate the network interfaces 2404, 2406 control memory access, etc. Assembly of components 2484, e.g., an assembly of software components, includes, e.g., routines, subroutines, applications, etc. including instructions which when executed by a processor, e.g., processor 2402 cause the base station 2400 to implement steps of a method, e.g., steps of the method of FIG. 5 performed by a base station, e.g., base station 1 406.

Data/information 2486 includes received original spectrum assignments 2487 including a received original PAL channel assignment 2488 for each CBRS cell of the base station 2400, e.g., an original PAL channel assignment to use PAL channel 2 for each CBRS cell of the base 2400. Data/information 2486 also includes original neighbor tables 2489 for each CBRS cell of the base station 2400. Data/information 2486 further includes a received temporary spectrum assignment 2490 including a received temporary PAL channel assignment 2491, e.g., an assignment to use PAL channel 4, for a first CBRS cell (e.g., cell: NYC_1_1) corresponding to BS sector 1, e.g., in response to DPA activity. Data/information 2486 further includes received supplemental neighbor information 2492, new neighbor tables 2493 for each CBRS cell of the base station, including supplemental neighbor information 2494. Data/information 2486 further includes a handover selection result 2495 of a target cell, for a handover operation from a source CBRS cell (e.g., NYC_1_1) of base station 2400 to which a UE is attached to a neighbor target CBRS cell (which may be within base station 2400 or part of a neighbor base station (e.g., NYC_2_1) for a UE, said selection being based on supplemental neighbor information in a new neighbor table for the source cell (e.g., select a target CBRS neighbor cell which is using the same PAL channel (e.g., temporary PAL channel 4) as the source cell. Data/information 2486 further includes received instructions 2496 to restore the original neighbor tables. In various embodiments cells are sector-cells where each sector of a multi-sector base station is treated as a separate cell for channel assignment purposes. Accordingly, from the SAS perspective a channel assignment with its associated assignment of a particular amount of bandwidth, e.g., 10, 20 or 30 MHz of bandwidth, is made to a cell with the cell in some cases actually being a sector of a base station which has multiple sector-cells.

Various aspects and/or features of some embodiments of the present invention are described below:

Various method and apparatus, in accordance with the present invention, address the issue of undefined handoffs for the case of disproportional and un-like channels within the same band. This resolution is dynamic and on the fly. Various methods, in accordance with the present invention, are well suited for supporting communications systems using CBRS spectrum involving SAS (e.g., including SAS re-assignments of one or more CBRS cells in a network to a dissimilar PAL channel, in response to DPA activity): however, the methods can also be applied to other bands.

Channels are assigned by SAS, and the assignments are relayed to an OSS. The OSS may have an internal component or an external component to track this channel assignment information. This is normally carried out with the help of a domain proxy.

Ideally, SAS will allocate the same channel (e.g., a first channel) to each of the different cells within a network. However, due to interference or SAS related exceptions (e.g., DPA activity), it is possible that one or more cells get assigned to a different channel (e.g., a second channel), with more or less spectrum (e.g., the second channel has a different bandwidth than the first channel).

This invention provides a couple of options for a CBRS based network to continue to operate and provide mobility to its users.

An exemplary architecture of a network includes a new asymmetric bandwidth neighbor generator (ABNG) function, in accordance with various embodiment, of the present invention. In some embodiment, the ABNG generates supplemental neighbor list information and/or updated neighbors lists, e.g., in response to a detected dissimilar channel assignment.

In some embodiments, the OSS will interact with cells (e.g., small cells) via a protocol, e.g., NETCONF protocol, i.e., updated neighbor lists will be pushed to the cells (e.g., small cells) via existing protocols such as NETCONF or equivalent. Similarly, when the conditions of resulting in the dissimilar channels are lifted, ABNG will instruct OSS to restore the old (original) neighbor lists, e.g., using NET-CONF. Thus, in some embodiments, new neighbor lists are pushed with the help of NETCONF or a similar protocol, and instructions to restore quarantined neighbor lists are communicated using NETCONF or a similar protocol.

Consider a traditional cell which has a neighbor list such as shown below.

| Cell (Source) | Neighbors on frequency 1 (Target) | Neighbors on frequency 2 (Target) |
|---|---|---|
| NYC_1_1 | NYC_2_1 | NYC_2_1 |
| NYC_1_1 | NYC_1_2 | NYC_1_2 |
| NYC_1_1 | NYC_3_1 | NYC_3_1 |
| NYC_1_1 | NYC_4_2 | NYC_4_2 |
| NYC_1_1 | NYC_4_1 | NYC_4_1 |
| NYC_1_1 | NYC_5_1 | NYC_5_1 |
| NYC_1_1 | NYC_5_2 | NYC_5_2 |
| NYC_1_1 | NYC_6_2 | NYC_6_2 |

Assume that a cell named "1" with its sector 1 has neighbors as given in the table above. In reality there will typically be a lot more neighbors. For example, assume the sector is operating on two frequencies, for example, frequency 1 AWS (advanced wireless services) and frequency 2 PCS (personal communications services). This is what current technology supports.

This technology can work for CBRS to an extent, i.e., if there is a fixed PAL (Priority Access License) and fixed GAA (General Authorized Access), i.e., fixed channels that never change. Under that assumption the neighbor list above will be the neighbor list.

However, when the dissimilar channel assignment happens, e.g., due to DPA (Dynamic Protection Area) activity, this neighbor table (intended for static channels) will no longer be valid and, if used, calls will drop.

In accordance with a feature of the present invention, the ABNG will detect the channel assignment (e.g., a dissimilar PAL channel assignment) and determine the impacting neighbors, create supplemental neighbor list information and/or new neighbor lists, and pass the created supplemental neighbor list information and/or new neighbor lists to OSS. The OSS will quarantine the existing (old original) neighbor lists until SAS reassigns the old (original) frequencies, e.g., original PAL channel.

Depending on the vendor's implementation of neighbor list, and architecture, there are two possibilities (approaches) which will be explained below:

A first option (approach) will now be described. When a cell (e.g., CBRS cell: NYC_1_1) is assigned a dissimilar frequency, e.g., PAL channel 4, while other cells (e.g., CBRS cells: NYC_2_1, NYC_1_2, . . . etc.) which are neighbors with the cell (NYC_1_1) are still on PAL channel 2, the ABNG will perform the following.

ABNG will detect this channel assignment (e.g., PAL channel 4) assignment, obtain neighbors from the OSS for the cell (NYC_1_1) and its neighbors and their neighbor lists.

ABNG will recreate neighbor lists internally by using the neighbor tables. New neighbors for the new carrier (e.g., corresponding to PAL channel 4) will be added (appended) to the neighbor table (e.g., for NYC_1_1) and old values will be quarantined. This is done because there is usually a limit on how many neighbors per carrier can be defined.

Similarly, the corresponding entries in each of the other tables (e.g., neighbor table for CBRS cells: NYC_2_1, NYC_1_2, . . . etc.) which are affected by the NYC_1_1 channel change (e.g., to PAL channel 4) will be changed. For example, the neighbor lists of the neighbors of NYC_1_1 will add an extra column (for PAL channel 4 neighbors) and include NYC_1_1 as an entry in the new column.

These new tables will be sent, e.g., via NETCONF and these operations will be done on the fly. In this way the cells can immediately switch their neighbor lists out in line with the SAS related changes.

Set of FIGS. 6-8 illustrates exemplary original and exemplary updates neighbor tables in accordance with the first option (approach), for an example in which CBRS cell: NYC_1_1 is temporarily reassigned from PAL channel 2 to PAL channel 4.

Set of FIGS. 9-11 illustrates exemplary original and exemplary updates neighbor tables in accordance with the first option (approach), for an example in which CBRS cell: NYC_1_1 and CBRS cell: NYC_2_1 are both temporarily reassigned from PAL channel 2 to PAL channel 4.

A second option (approach) will now be described. In this approach a set of logical neighbors are created. This solution creates a logical $3^{rd}$ sector for a given cell. For the example of a 2-sector site (2 sector base station), a $3^{rd}$ logical sector, assumed to have the new carrier (e.g., corresponding to PAL channel 4) is added to the neighbor list. For instance, for NYC_1_1 another sector NYC_1_3 is logically created which is on transmission channel 4.

Logical entities with a logical sector are added. In this example, it is still sector 1, but for the purpose of addition of neighbors, it is to be assumed that the cell has a $3^{rd}$ sector which is logical in nature but its still physically the same sector.

NYC_1_3(1) is a $3^{rd}$ logical sector operating on PAL channel 4, where as NYC_1_1 is still assumed to be operating on PAL channel 2. However, there is no transmission on NYC_1_1 PAL channel 2, but it is kept in the neighbor list anyway.

OSS will combine the two logical sectors at all other layers, i.e., for reporting of statistics, call flow, etc. There is no change at other layers, i.e., the cell treats the frequency change as a new logical sector of the same physical sector and adds new neighbors corresponding to this new frequency. These neighbors (added for the temporary dissimilar channel assignment to PAL channel 4), when no longer in use, are removed from the system, after the like-to-like channels are reassigned (e.g., after the channel(s) temporarily reassigned to PAL channel 4 are reassigned back to the original channel being used by the network (e.g., PAL channel 2). In some embodiments, a timer is used to purge these neighbors, as this is additional work for the system.

Similarly, this logical sector (e.g., NYC_1_3(1)) is added as an entry in a new column (for PAL channel 4) in neighbor tables of other cells which are neighbors to CBRS cell: NYC_1_1. The neighbor cells can be intra-site (as is the case with CBRS cell NYC_1_2) or can be inter-site (as is the case with CBRS cell NYC_2_1).

Set of FIGS. 13-16 illustrates exemplary original and exemplary updates neighbor tables in accordance with the second option (approach), for an example in which CBRS cell: NYC_1_1 is temporarily reassigned from PAL channel 2 to PAL channel 4.

Set of FIGS. 17-19 illustrates exemplary original and exemplary updates neighbor tables in accordance with the second option (approach), for an example in which CBRS cell: NYC_1_1 and CBRS cell: NYC_2_1 are both temporarily reassigned from PAL channel 2 to PAL channel 4.

Numbered List of Exemplary Method Embodiments

Method Embodiment 1. A method of supporting spectrum allocations (bandwidth/carrier allocation) in a communications system, the method comprising: receiving (512) first channel assignment information indicating a first channel assignment to a first cell, said first channel assignment being an assignment to a new channel (e.g., PAL channel 4): checking (520) the first channel assignment information to determine if the first channel assignment is a dissimilar channel assignment which differs from a previous channel assignment (e.g. an assignment to PAL channel 2 which in some cases is the original PAL channel being used) in at least one of bandwidth or carrier frequency (e.g., a disproportional amount of bandwidth assigned to the first cell and/or a different carrier assigned to the first cell); and in response to said checking determining (522) that the first channel assignment is a dissimilar channel assignment, requesting (524) existing neighbor list information corresponding to the first cell with the dissimilar channel assignment (e.g., request the neighbor list of the first cell and request the neighbor lists for neighbors of the first cell).

Method Embodiment 2. The method of Method Embodiment 1, wherein said receiving (512), checking (520), and requesting (524) steps are performed by an asymmetric bandwidth neighbor generator (ABNG) function: wherein said first channel assignment information is received (e.g., via a domain proxy) from a spectrum access system (SAS); and wherein said requesting (524) existing neighbor list information includes sending a neighbor list request to an operational support system (OSS).

Method Embodiment 3. The method of Method Embodiment 2, wherein said neighbor list request requests the neighbor list of the first cell and the neighbor lists of cells which are neighbors of the first cell.

Method Embodiment 4. The method of Method Embodiment 1, wherein the first channel assignment information communicates a temporary PAL channel assignment which assigns: i) different bandwidth than a previous PAL channel assignment to the first cell, ii) a different carrier to the first cell than was assigned in the previous PAL channel assignment to the first cell or iii) both a different bandwidth and different carrier than was assigned in the previous PAL channel assignment to the first cell.

Method Embodiment 5. The method of Method Embodiment 4, wherein the first channel assignment assigns a different PAL channel (e.g., a different PAL channel ID number) than was assigned in the previous PAL channel assignment (e.g., each PAL channel ID number corresponds to a particular bandwidth (e.g., one of 10 MHz, 20 MHz or 30 MHz), and a particular carrier frequency (e.g., center frequency for the channel)).

Method Embodiment 6. The method of Method Embodiment 4, wherein the first channel assignment information assigns a different bandwidth than was assigned by the previous PAL channel assignment, said bandwidth assigned by the first channel assignment information being one of to a 10 MHz, 20 MHz or 30 MHz bandwidth.

Method Embodiment 7. The method of Method Embodiment 1, further comprising: receiving (534) neighbor list information, said neighbor list information including at least a neighbor list of a first neighbor of said first cell.

Method Embodiment 8. The method of Method Embodiment 7, wherein receiving (534) neighbor list information includes receiving a neighbor list of a second neighbor of said first cell.

Method Embodiment 9. The method of Method Embodiment 7, wherein receiving (534) neighbor list information includes receiving a neighbor list of said first cell.

Method Embodiment 10. The method of Method Embodiment 7, further comprising generating (536 or 536') updated neighbor list information for one or more cells, said step of generating (536 or 536') updated neighbor list information for one or more cells including generating (5363 or 5363') at least some neighbor list supplemental information for the neighbor list of the first neighbor of the first cell.

Method Embodiment 11. The method of Method Embodiment 10, wherein said neighbor list supplemental information for the neighbor list of the first neighbor of the first cell is in the form of a new channel neighbor column (e.g., of the neighbor list of the first neighbor of the first cell), said new channel neighbor column including an entry identifying the first cell as using the new channel.

Method Embodiment 12. The method of Method Embodiment 11, wherein said new channel neighbor column entry identifying the first cell as using the new channel supersedes a channel neighbor column entry of the neighbor list of the first neighbor of the first cell for the previously assigned PAL channel, said first cell being temporarily prohibited from using the previously assigned PAL channel.

Method Embodiment 13. The method of Method Embodiment 10, wherein said neighbor list supplemental information is in the form of first virtual cell information, with said new channel being assigned to a first virtual cell.

Method Embodiment 14. The method of Method Embodiment 13, wherein said first cell and said first virtual cell correspond to the same base station, said first cell information being superseded by said first virtual cell information and being used during a period of time in which use of the previously assigned PAL channel corresponding to the first cell has been temporarily suspended.

Method Embodiment 15. The method of Method Embodiment 10, wherein said received neighbor list information further includes a neighbor list of a second neighbor of said first cell.

Method Embodiment 16. The method of Method Embodiment 10, wherein said received neighbor list information further includes a neighbor list of the said first cell.

Method Embodiment 17. The method of Method Embodiment 15, wherein said step (536 or 536') of generating updated neighbor list information for one or more cells includes generating (5365 or 5365') at least some neighbor list supplemental information for the neighbor list of the second neighbor of the first cell.

Method Embodiment 18. The method of Method Embodiment 17, wherein said neighbor list supplemental information for the neighbor list of the second neighbor of the first cell is in the form of a new channel neighbor column (e.g., of the neighbor list of the second neighbor of the first cell), said new channel neighbor column including an entry identifying the first cell as using the new channel.

Method Embodiment 19. The method of Method Embodiment 15, further comprising: communicating (539) at least some generated supplemental neighbor list information (e.g., with the supplemental neighbor list information being part of new neighbor lists that are sent to the OSS or as supplemental information which the OSS or a base station can combine with previously neighbor list information to generate a new neighbor list) to the OSS.

Method Embodiment 20. The method of Method Embodiment 19 further comprising: operating (604) the OSS to communicate first new neighbor list information for the first neighbor of the first cell to the base station in which the first neighbor of the first cell is located for use in controlling the first neighbor, said first new neighbor list information including neighbor list supplemental information for the neighbor list of the first neighbor of the first cell.

Method Embodiment 21. The method of Method Embodiment 20, further comprising: operating (610) the OSS to communicate second new neighbor list information for the second neighbor of the first cell to the base station in which the second neighbor of the first cell is located for use in controlling the second neighbor, said second new neighbor list information including neighbor list supplemental information for the neighbor list of the second neighbor of the first cell.

Method Embodiment 22. The method of Method Embodiment 20, further comprising: operating (604) the OSS to communicate new neighbor list information for first cell to the base station in which the first cell is located for use in controlling the first cell, said new neighbor list information for the first cell including neighbor list supplemental information for the neighbor list of the first cell.

Method Embodiment 23. The method of Method Embodiment 19, further comprising: detecting (666) (e.g., at the ABNG) a channel assignment to the first cell which assigns the previously assigned channel, use of which was suspended, to the first cell: determining (668) that one or more original neighbor lists which were supplemented by neighbor list supplemental information should be restored; and signaling (670) to the OSS that temporary neighbor list information is to be purged and the original one or more neighbor lists are to be restored.

Method Embodiment 24. The method of Method Embodiment 23, further comprising: operating (748, 750) the OSS to control first and second base stations to purge temporary neighbor list information relating to the first cell and to return to using previously used original neighbor lists.

Method Embodiment 25. The method of Method Embodiment 11, further comprising: operating (6434) the first cell to use the new neighbor list of the first cell to identify neighbor cells which are suitable handoff targets for user equipment (UE) using the new channel (e.g., PAL channel 4); and operating (6435) the first cell to handoff the UE using the new channel from the first cell to another cell in the new neighbor list, said another cell using the new channel (e.g., PAL channel 4).

Numbered List of Exemplary System Embodiments

System Embodiment 1. A communications system (400) comprising: a first device (e.g., an asymmetric bandwidth neighbor generator (ABNG) function device (402 or 2200)) including: a first receiver (2216); and a first processor (2202) configured to: operate the first device to receive (512) (e.g., via the first receiver) first channel assignment information indicating a first channel assignment to a first cell, said first channel assignment being an assignment to a new channel (e.g., PAL channel 4): check (520) the first channel assignment information to determine if the first channel assignment is a dissimilar channel assignment which differs from a previous channel assignment (e.g. an assignment to PAL channel 2 which in some cases is the original PAL channel being used) in at least one of bandwidth or carrier frequency (e.g., a disproportional amount of bandwidth assigned to the first cell and/or a different carrier assigned to the first cell); and in response to said checking determining (522) that the first channel assignment is a dissimilar channel assignment, operate the first device to request (524) existing neighbor list information corresponding to the first cell with the dissimilar channel assignment (e.g., request the neighbor list of the first cell and request the neighbor lists for neighbors of the first cell).

System Embodiment 2. The communications system (400) of System Embodiment 1, wherein said first device (402 or 2200) includes a first transmitter (2218): wherein said first device (402 or 2200) is an asymmetric bandwidth neighbor generator (ABNG) function device: wherein said first channel assignment information is received (e.g., via a domain proxy) from a spectrum access system (SAS); and wherein said first processor (2202) is configured to operate said first device (402 or 2200) to: send (via said first transmitter (2218)) a neighbor list request to an operational support system (OSS) (404 or 2300), as part of being configured to operate the first device to request (524) existing neighbor list information includes sending a neighbor list request to an operational support system (OSS).

System Embodiment 3. The communications system (400) of System Embodiment 2, wherein said neighbor list request requests the neighbor list of the first cell and the neighbor lists of cells which are neighbors of the first cell.

System Embodiment 4. The communications system (400) of System Embodiment 1, wherein the first channel assignment information communicates a temporary PAL channel assignment which assigns: i) different bandwidth than a previous PAL channel assignment to the first cell, ii) a different carrier to the first cell than was assigned in the previous PAL channel assignment to the first cell or iii) both a different bandwidth and different carrier than was assigned in the previous PAL channel assignment to the first cell.

System Embodiment 5. The communications system (400) of System Embodiment 4, wherein the first channel assignment assigns a different PAL channel (e.g., a different PAL channel ID number) than was assigned in the previous PAL channel assignment (e.g., each PAL channel ID number corresponds to a particular bandwidth (e.g., one of 10 MHz, 20 MHz or 30 MHz), and a particular carrier frequency (e.g., center frequency for the channel)).

System Embodiment 6. The communications system (400) of System Embodiment 4, wherein the first channel assignment information assigns a different bandwidth than was assigned by the previous PAL channel assignment, said bandwidth assigned by the first channel assignment information being one of to a 10 MHz, 20 MHz or 30 MHz bandwidth.

System Embodiment 7. The communications system (400) of System Embodiment 1, wherein said first processor (2202) is further configured to operate the first device to receive (534) (via said first receiver) neighbor list information, said neighbor list information including at least a neighbor list of a first neighbor of said first cell.

System Embodiment 8. The communications system (400) of System Embodiment 7, wherein receiving (534)

neighbor list information includes receiving a neighbor list of a second neighbor of said first cell.

System Embodiment 9. The communications system (400) of System Embodiment 7, wherein receiving (534) neighbor list information includes receiving a neighbor list of said first cell.

System Embodiment 10. The communications system (400) of System Embodiment 7, wherein said first processor (2202) is further configured to: generate (536 or 536') updated neighbor list information for one or more cells, said step of generating (5363 or 5363') updated neighbor list information for one or more cells including generating at least some neighbor list supplemental information for the neighbor list of the first neighbor of the first cell.

System Embodiment 11. The communications system (400) of System Embodiment 10, wherein said neighbor list supplemental information for the neighbor list of the first neighbor of the first cell is in the form of a new channel neighbor column (e.g., to supplement the neighbor list of the first neighbor of the first cell), said new channel neighbor column including an entry identifying the first cell as using the new channel.

System Embodiment 12. The communications system (400) of System Embodiment 11, wherein said new channel neighbor column entry identifying the first cell as using the new channel (e.g., PAL channel 4) supersedes a channel neighbor column entry of the neighbor list of the first neighbor of the first cell for the previously assigned PAL channel (e.g., PAL channel 2), said first cell being temporarily prohibited from using the previously assigned PAL channel.

System Embodiment 13. The communications system (400) of System Embodiment 10, wherein said neighbor list supplemental information is in the form of first virtual cell information, with said new channel being assigned to a first virtual cell (e.g., cell NYC_1_3(1)).

System Embodiment 14. The communications system (400) of System Embodiment 13, wherein said first cell (e.g., cell NYC_1_1) and said first virtual cell (e.g., cell NYC_1_3(1)) correspond to the same base station (e.g., BS 1 406), said first cell information being superseded by said first virtual cell information and being used during a period of time in which use of the previously assigned PAL channel corresponding to the first cell has been temporarily suspended.

System Embodiment 15. The communications system (400) of System Embodiment 10, wherein said received neighbor list information further includes a neighbor list of a second neighbor of said first cell.

System Embodiment 16. The communications system (400) of System Embodiment 10, wherein said received neighbor list information further includes a neighbor list of the said first cell.

System Embodiment 17. The communications system (400) of System Embodiment 15, wherein said first processor (2202) is configured to generate (5363 or 5363') at least some neighbor list supplemental information for the neighbor list of the second neighbor of the first cell, as part of being configured to generate (536 or 536') updated neighbor list information for one or more cells.

System Embodiment 18. The communications system (400) of System Embodiment 17, wherein said neighbor list supplemental information for the neighbor list of the second neighbor of the first cell is in the form of a new channel neighbor column (e.g., of the neighbor list of the second neighbor of the first cell), said new channel neighbor column including an entry identifying the first cell as using the new channel.

System Embodiment 19. The communications system (400) of System Embodiment 15, wherein said first processor (2202) is further configured to operate the first device to: communicate (539) (via first transmitter) at least some generated supplemental neighbor list information (e.g., with the supplemental neighbor list information being part of new neighbor lists that are sent to the OSS or as supplemental information which the OSS or a base station can combine with previously neighbor list information to generate a new neighbor list) to the OSS.

System Embodiment 20. The communications system (400) of System Embodiment 19 further comprising: said OSS (404 or 2300) including a second transmitter (2318) and a second processor (2302); and wherein said second processor (2302) is configured to: operate (604) the OSS (404 or 2300) to communicate (via the second transmitter (2318) first new neighbor list information for the first neighbor of the first cell to the base station (e.g., BS 1 406) in which the first neighbor (e.g., NYC_1_2) of the first cell (e.g., NYC_1_1) is located for use in controlling the first neighbor, said first new neighbor list information including neighbor list supplemental information for the neighbor list of the first neighbor of the first cell.

System Embodiment 21. The communications system (400) of System Embodiment 20, wherein said second processor (2302) is further configured to: operate (610) the OSS (404 or 2300) to communicate (via said second transmitter (2318)) second new neighbor list information for the second neighbor (e.g., NYC_2_1) of the first cell (NYC_1_1) to the base station (e.g., BS2 4061) in which the second neighbor of the first cell is located for use in controlling the second neighbor, said second new neighbor list information including neighbor list supplemental information for the neighbor list of the second neighbor of the first cell.

System Embodiment 22. The communications system (400) of System Embodiment 20, wherein said second processor (2302) is further configured to: operate (604) the OSS (404 or 2300) to communicate (via said second transmitter (2318)) new neighbor list information for first cell (e.g., NYC_1_1) to the base station (e.g., BS1 406) in which the first cell is located for use in controlling the first cell, said new neighbor list information for the first cell including neighbor list supplemental information for the neighbor list of the first cell.

System Embodiment 23. The communications system (400) of System Embodiment 19, wherein said first processor (2202) is further configured to: detect (666) (e.g., at the ABNG (402 or 2200) a channel assignment to the first cell which assigns the previously assigned channel, use of which was suspended, to the first cell: determine (668) that one or more original neighbor lists which were supplemented by neighbor list supplemental information should be restored; and operate the first device (e.g., the ABNG) to signal (670) (via the first transmitter 2218) to the OSS (404 or 2300) that temporary neighbor list information is to be purged and the original one or more neighbor lists are to be restored.

System Embodiment 24. The communications system (400) of System Embodiment 23, wherein said second processor (2302) is further configured to: operate (748, 750) the OSS (404 or 2300) to control (e.g., send instruction to) first and second base stations (e.g., BS1 406, BS2 4061) to purge temporary neighbor list information relating to the first cell (NYC_1_1) and to return to using previously used original neighbor lists.

System Embodiment 25. The communications system (400) of System Embodiment 11, further comprising: a first base station (406 or 2400) (e.g., a CBRS base station) including a first cell (e.g., cell NYC_1_1 470) and a third processor (2402): wherein said third processor (2402) is configured to: operate (6434) the first cell (e.g., NYC_1_1 470) to use the new neighbor list (e.g., table 1352 or table 1952) of the first cell to identify neighbor cells which are suitable handoff targets for user equipment (UE) using the new channel (e.g., PAL channel 4); and operate (6435) the first cell (e.g., cell NYC_1_1 470) to handoff a UE (e.g., UE 434) using the new channel (e.g., PAL channel 4) from the first cell (e.g., cell NYC_1_1 470) to another cell (e.g., cell NYC_2_1_in the new neighbor list, said another cell (e.g., cell NYC_2_1_using the new channel (e.g., PAL channel 4).

Numbered List of Exemplary Non-Transitory Computer Readable Medium Embodiments Non-Transitory Computer Readable Medium Embodiment 1. A non-transitory computer readable medium (2212) including machine executable instruction which when executed by a processor (2202) of a first device (e.g., ABNG device 402 or ABNG device 2200), control the first device (402 or 2200) to perform the steps of: receiving (512) first channel assignment information indicating a first channel assignment to a first cell, said first channel assignment being an assignment to a new channel (e.g., PAL channel 4): checking (520) the first channel assignment information to determine if the first channel assignment is a dissimilar channel assignment which differs from a previous channel assignment (e.g. an assignment to PAL channel 2 which in some cases is the original PAL channel being used) in at least one of bandwidth or carrier frequency (e.g., a disproportional amount of bandwidth assigned to the first cell and/or a different carrier assigned to the first cell); and in response to said checking determining (522) that the first channel assignment is a dissimilar channel assignment, requesting (524) existing neighbor list information corresponding to the first cell with the dissimilar channel assignment (e.g., request the neighbor list of the first cell and request the neighbor lists for neighbors of the first cell).

Various embodiments are directed to apparatus, e.g., an asymmetric bandwidth neighbor generator (ABNG) function device, an operations support systems (OSS) device, a spectrum allocation system (SAS) device, a domain proxy device, base stations such as multi-sector CBRS base stations, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating an asymmetric bandwidth neighbor generator (ABNG) function device, an operations support systems (OSS) device, a spectrum allocation system (SAS) device, a domain proxy device, base stations such as multi-sector CBRS base stations, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an asymmetric bandwidth neighbor generator (ABNG) function device, an operations support systems (OSS) device, a spectrum allocation system (SAS)

device, a domain proxy device, base stations such as multi-sector CBRS base stations, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, etc., said device including a processor configured to implement one, multiple or all of the steps of one or more methods of the invention.

In some embodiments, the processor or processors, e.g., CPUs, of one or more devices, e.g., an asymmetric bandwidth neighbor generator (ABNG) function device, an operations support systems (OSS) device, a spectrum allocation system (SAS) device, a domain proxy device, base stations such as multi-sector CBRS base stations, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly; some but not all embodiments are directed to a device, e.g., an asymmetric bandwidth neighbor generator (ABNG) function device, an operations support systems (OSS) device, a spectrum allocation system (SAS) device, a domain proxy device, base stations such as multi-sector CBRS base stations, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., an asymmetric bandwidth neighbor generator (ABNG) function device, an operations support systems (OSS) device, a spectrum allocation system (SAS) device, a domain proxy device, base stations such as multi-sector CBRS base stations, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an asymmetric bandwidth neighbor generator (ABNG) function device, an operations support systems (OSS) device, a spectrum allocation system (SAS) device, a domain proxy device, base stations such as multi-sector CBRS base stations, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, MNVO base station, e.g., a CBSD, an MNO cellular base station, e.g., an eNB or a gNB, a HSS server, a UE device, or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow: Such variations are to be considered within the scope of the invention.

What is claimed is:

1. A method of supporting spectrum allocations in a communications system, the method comprising:
    receiving first channel assignment information indicating a first channel assignment to a first cell, said first channel assignment being an assignment to a new channel;
    checking the first channel assignment information to determine if the first channel assignment is a dissimilar channel assignment which differs from a previous channel assignment in at least one of bandwidth or carrier frequency;
    in response to said checking determining that the first channel assignment is a dissimilar channel assignment, requesting existing neighbor list information corresponding to the first cell with the dissimilar channel assignment;
    receiving neighbor list information, said neighbor list information including at least a neighbor list of a first neighbor of said first cell; and
    generating updated neighbor list information for one or more cells, said step of generating updated neighbor list information for one or more cells including generating at least some neighbor list supplemental information for the neighbor list of the first neighbor of the first cell.

2. The method of claim 1, wherein said neighbor list supplemental information for the neighbor list of the first neighbor of the first cell is in a form of a new channel neighbor column, said new channel neighbor column including an entry identifying the first cell as using the new channel.

3. The method of claim 1, wherein said neighbor list supplemental information is in a form of first virtual cell information, with said new channel being assigned to a first virtual cell.

4. The method of claim 1, wherein said received neighbor list information further includes a neighbor list of a second neighbor of said first cell.

5. The method of claim 4, wherein said step of generating updated neighbor list information for one or more cells includes generating at least some neighbor list supplemental information for the neighbor list of the second neighbor of the first cell.

6. The method of claim 4, further comprising:
    communicating at least some generated supplemental neighbor list information to an operations support systems (OSS).

7. The method of claim 6, further comprising:
    detecting a channel assignment to the first cell which assigns a previously assigned channel, use of which was suspended, to the first cell;
    determining that one or more original neighbor lists which were supplemented by neighbor list supplemental information should be restored; and
    signaling to the OSS that temporary neighbor list information is to be purged and the one or more original neighbor lists are to be restored.

8. The method of claim 7, further comprising:
    operating the OSS to control first and second base stations to purge temporary neighbor list information relating to the first cell and to return to using previously used original neighbor lists.

9. The method of claim 2, further comprising:
    operating the first cell to use a new neighbor list of the first cell to identify neighbor cells which are suitable handoff targets for user equipment (UE) using the new channel; and
    operating the first cell to handoff the UE using the new channel from the first cell to another cell in the new neighbor list, said another cell using the new channel.

10. The method of claim 8, wherein said neighbor list supplemental information is in the form of first virtual cell information, with said new channel being assigned to a first virtual cell.

11. The method of claim 10, wherein said first cell and said first virtual cell correspond to the same base station, said first cell information being superseded by said first virtual cell information and being used during a period of time in which use of a previously assigned PAL channel corresponding to the first cell has been temporarily suspended.

12. The method of claim 8, wherein said received neighbor list information further includes a neighbor list of a second neighbor of said first cell.

13. The method of claim 8, wherein said received neighbor list information further includes a neighbor list of the said first cell.

14. A communications system comprising:
    a first device including:
        a first receiver; and
        a first processor configured to:
            operate the first device to receive first channel assignment information indicating a first channel assignment to a first cell, said first channel assignment being an assignment to a new channel;
            check the first channel assignment information to determine if the first channel assignment is a dissimilar channel assignment which differs from a previous channel assignment in at least one of bandwidth or carrier frequency;
            operate the first device to request existing neighbor list information corresponding to the first cell with the dissimilar channel assignment in response to said checking determining that the first channel assignment is a dissimilar channel assignment;
            operate the first device to receive neighbor list information, said neighbor list information including at least a neighbor list of a first neighbor of said first cell; and
            generate updated neighbor list information for one or more cells, said step of generating updated neighbor list information for one or more cells including generating at least some neighbor list supplemental information for the neighbor list of the first neighbor of the first cell.

15. The communications system of claim 14, wherein said neighbor list supplemental information for the neighbor list of the first neighbor of the first cell is in a form of a new channel neighbor column, said new channel neighbor column including an entry identifying the first cell as using the new channel.

16. The communications system of claim 14, wherein said neighbor list supplemental information is in a form of first virtual cell information, with said new channel being assigned to a first virtual cell.

17. The communications system of claim 14, wherein said received neighbor list information further includes a neighbor list of a second neighbor of said first cell.

18. The communications system of claim 17, wherein said first processor is configured to generate at least some neighbor list supplemental information for the neighbor list of the second neighbor of the first cell, as part of being configured to generate updated neighbor list information for one or more cells.

19. The communications system of claim 17, wherein said first processor is further configured to operate the first device to:
    communicate at least some generated supplemental neighbor list information to an operations support systems (OSS).

20. A non-transitory computer readable medium including machine executable instruction which when executed by a processor of a first device, control the first device to perform the steps of:

receiving first channel assignment information indicating a first channel assignment to a first cell, said first channel assignment being an assignment to a new channel;

checking the first channel assignment information to determine if the first channel assignment is a dissimilar channel assignment which differs from a previous channel assignment in at least one of bandwidth or carrier frequency;

in response to said checking determining that the first channel assignment is a dissimilar channel assignment, requesting existing neighbor list information corresponding to the first cell with the dissimilar channel assignment;

receiving neighbor list information, said neighbor list information including at least a neighbor list of a first neighbor of said first cell; and generating updated neighbor list information for one or more cells, said step of generating updated neighbor list information for one or more cells including generating at least some neighbor list supplemental information for the neighbor list of the first neighbor of the first cell.

* * * * *